(12) United States Patent
Lipscomb et al.

(10) Patent No.: US 12,478,034 B2
(45) Date of Patent: Nov. 25, 2025

(54) SYSTEM AND ULTRAHIGH PRESSURE EXTRUSION METHOD FOR MAKING EXTRUDED GRANULAR SORBENT WITH POST-EXTRUSION COLD-PROCESSING OF EXTRUDED GRANULAR ABSORBENT FOR SIZE CONTROL

(71) Applicant: Pioneer Pet Products, LLC, Cedarburg, WI (US)

(72) Inventors: John M. Lipscomb, Cedarburg, WI (US); Omar I. Rodriguez, Cedarburg, WI (US); Chad C. Berge, Menomonee Falls, WI (US)

(73) Assignee: Pioneer Pet Products, LLC., Cedarburg, WI (US)

( * ) Notice: Subject to any disclaimer, the term of this patent is extended or adjusted under 35 U.S.C. 154(b) by 890 days.

(21) Appl. No.: 17/399,040

(22) Filed: Aug. 10, 2021

(65) Prior Publication Data

US 2021/0368732 A1    Dec. 2, 2021

Related U.S. Application Data

(63) Continuation of application No. 15/445,977, filed on Feb. 28, 2017, now Pat. No. 11,083,168, and a
(Continued)

(51) Int. Cl.
*A01K 1/015*    (2006.01)
*B01J 20/24*    (2006.01)
(Continued)

(52) U.S. Cl.
CPC ............. *A01K 1/0155* (2013.01); *B01J 20/24* (2013.01); *B01J 20/2803* (2013.01);
(Continued)

(58) Field of Classification Search
CPC ..... A01K 1/0155; B01J 20/24; B01J 20/2803; B01J 20/3007; B01J 20/3042; B29B 9/06;
(Continued)

(56) References Cited

U.S. PATENT DOCUMENTS

| 2005/0196593 | A1* | 9/2005 | Campbell | A01K 1/0152 |
| | | | | 428/182 |
| 2014/0069344 | A1* | 3/2014 | Lipscomb | B01J 20/12 |
| | | | | 119/171 |
| 2015/0258576 | A1* | 9/2015 | Hagemeier | B02C 23/12 |
| | | | | 241/61 |

FOREIGN PATENT DOCUMENTS

WO    WO-2015113006 A1 *  7/2015  ........... A01K 1/0152

* cited by examiner

*Primary Examiner* — Brian A Mccaig
(74) *Attorney, Agent, or Firm* — Boyle Fredrickson, S.C.

(57) ABSTRACT

A method, system and machine for cold processing extruded starch-containing pellets by cold particle size reducing pellets of a size greater than a particle size reduction setting size enabling particle size reduction to be performed without compacting or compression any size reduced particle while doing so without heating them during particle size reduction thereby preserving their pores, internal liquid absorbing voids and starch matrix optimizing granular sorbent performance. Such a method, system and machine is selectively controllable enabling not only control of how many and a ratio of fines produced relative to the final product providing real time control of fines production but also is able to provide particle size distribution control as well. A preferred particle size reduction machine is a roll granulator that breaks larger size pellets into smaller sized particles and/or fines without compressing or compacting them with the spacing between the rolls selectively variably in a manner that regulates how much of different sized particles and/or particles falling within certain size ranges are produced
(Continued)

advantageously enabling real time control of particle size distribution to be achieved during extruder line operation.

55 Claims, 21 Drawing Sheets

Related U.S. Application Data continuation-in-part of application No. PCT/US2016/069355, filed on Dec. 29, 2016.

(60) Provisional application No. 62/452,981, filed on Jan. 31, 2017, provisional application No. 62/272,352, filed on Dec. 29, 2015.

(51) Int. Cl.
| | | |
|---|---|---|
| *B01J 20/28* | (2006.01) | |
| *B01J 20/30* | (2006.01) | |
| *B29B 9/12* | (2006.01) | |
| *B29B 9/16* | (2006.01) | |
| *B29C 48/00* | (2019.01) | |
| *B29C 48/04* | (2019.01) | |
| *B29C 48/88* | (2019.01) | |
| *B29B 9/06* | (2006.01) | |
| *B29C 48/92* | (2019.01) | |
| *B29K 105/00* | (2006.01) | |

(52) U.S. Cl.
CPC ....... *B01J 20/3007* (2013.01); *B01J 20/3042* (2013.01); *B29B 9/12* (2013.01); *B29B 9/16* (2013.01); *B29C 48/0022* (2019.02); *B29C 48/022* (2019.02); *B29C 48/04* (2019.02); *B29C 48/911* (2019.02); *B29B 9/06* (2013.01); *B29B 2009/166* (2013.01); *B29C 48/92* (2019.02); *B29K 2105/251* (2013.01)

(58) Field of Classification Search
CPC ......... B29B 9/12; B29B 9/16; B29C 48/0022; B29C 48/022; B29C 48/04; B29C 48/911; B29C 48/92
See application file for complete search history.

SYSTEM AND ULTRAHIGH PRESSURE EXTRUSION METHOD FOR MAKING EXTRUDED GRANULAR SORBENT WITH POST-EXTRUSION COLD-PROCESSING OF EXTRUDED GRANULAR ABSORBENT FOR SIZE CONTROL

CROSS-REFERENCE

This application is a continuation of U.S. application Ser. No. 15/445,977, filed Feb. 8, 2017, now U.S. Pat. No. 11,083,168, issued Aug. 10, 2021, which was a continuation-in-part under 35 U.S.C. § 111(a) of International Application No. PCT/2016/069355, filed on Dec. 29, 2016, which claims the benefit under 35 U.S.C. § 119 to U.S. Provisional Application No. 62/272,352, filed on Dec. 29, 2015; the entirety each of which is incorporated herein by reference in their entirety. This application also claims priority and benefit under 35 U.S.C. § 119(e) in U.S. Provisional Application No. 62/272,352, filed Dec. 29, 2015, in U.S. Provisional Application No. 62/452,348, filed Jan. 30, 2017, and in U.S. Provisional Application No. 62/452,981, filed Jan. 31, 2017, the entirety of each of which is hereby expressly incorporated herein by reference.

FIELD

The present invention is directed to a system and method of making extruded granular sorbent that optimizes the characteristics of the same, and more particularly to a system and method of making extruded granular sorbent where post-extrusion processing is employed to retain its optimized characteristics and provide particle size control over the extruded granular sorbent.

BACKGROUND

While many attempts have been made in the past to produce granular absorbent through extrusion of starch-containing material, very few have been commercially successful to date. This includes past efforts to produce an extruded granular absorbent well suited for use as animal, pet or cat litter.

Examples of such prior efforts to make extruded litter are disclosed in Sotillo, U.S. Pat. No. 6,220,206 ("'206 patent"), Fuchshuber, U.S. Patent Application Publication No. US 20100269758 A1 ("'758 publication", and Dixon et al., U.S. Patent Application Publication No. US 20110185977 A1 ("'977 publication"). While each reference discloses a method of making extruded granular absorbent that purports to be suitable for use as cat, pet or animal litter, post-extrusion conditions including post-extrusion processing disclosed in each reference adversely affects one or more characteristics and/or properties of the litter undesirably adversely impacting performance of the litter.

The '206 patent discloses extruding an admixture composed of grain milling byproducts containing enough starch to form at least 30% gelatinized starch in each extruded pellet during extrusion with the gelatinized starch serving as a binder that keeps each extruded pellet from breaking apart. After extrusion, the '206 patent further discloses milling of the extruded pellets using a hammer mill into smaller particles with at least two different particle sizes that have a rough surface to enhance absorption by increasing the amount of the surface area available to absorb animal urine. Milling of the extruded pellets is done prior to drying them to minimize creation of dust. After milling, the '206 patent further teaches drying the extruded particles using heated air having a temperature of greater than 100 degrees Celsius until moisture content is reduced to between about 2% and about 10% by weight.

Unfortunately, even where post-extrusion milling of the extruded pellets is not performed, drying the pellets using heated air having a temperature greater than 100 degrees Celsius relatively rapidly retrogrades starch in the pellets reducing urine absorption capacity. Where hammer milling is performed before drying while the pellets are still moist to minimize dusting, post-extrusion hammer milling of the pellets not only physically modifies starch in a manner that reduces absorption, but hammer milling also simultaneously heats up the pellets thermally modifying starch in a manner causing absorption-reducing retrogradation. Absorption is even further reduced during hot air drying after hammer milling because of additional starch retrogradation taking place. The result is that post-extrusion processing performed in carrying out the litter making method disclosed in the '206 patent intended to enhance absorption actually has the unintended opposite effect of undesirably reducing absorption. The same is true with respect to any alleged or purported ability of litter of the '206 patent to form lumps when wetted.

The '758 publication discloses a somewhat similar litter making method where whole cereal grains are ground before being extruded into spheres which are then cooled using a cooler before being ground up using a roll mill to form an absorbing material purportedly suitable for use as animal litter. Though the spheres are cooled after extrusion before grinding them into absorbing material composed of smaller size particles using a roll mill, the relatively high moisture content of the spheres can lead to post-extrusion retrogradation of starch in the spheres which in turn can adversely impact the absorbing material formed of the ground spheres by reducing absorption and preventing clumping. Despite the spheres being cooled prior to grinding them into absorbing material, the roll mill nonetheless further adversely impacts absorption and clumping properties of the resultant absorbing material by both physically and thermally modifying and retrograding starches in the spheres being ground.

The '977 publication is directed to animal litter extruded from a mixture of starch-containing cereal grain and at least 10% clay producing extruded litter particles having clay throughout that fills in pores in the outer surface of the litter particles producing an outer film of clay and starch that prevents dust from forming. Despite the extruded litter particles containing at least 10% clay, the '977 publication teaches coating them with one or more swelling clays is what imparts a clumping property to the litter particles that enables them to clump when wetted. While the clay and starch film on the outer surface of the extruded litter particles is taught in the '977 publication as beneficial for preventing dust formation, a related counterpart, U.S. Pat. No. 8,733,287, acknowledges the film is undesirable because it decreases the absorption rate of the extruded litter particles and teaches the necessity of grinding the litter particles with a roller-equipped litter fragmenting device in order to fragment them in order to remove the film to increase absorption by exposing the interior of the litter particles.

U.S. Pat. Nos. 9,266,088, 9,266,089, 9,266,090 and 9,491,926 are each directed to an improved extruded granular absorbent well suited for use as litter and improved methods of making extruded granular absorbent where an admixture composed starch-containing material, preferably in the form of one or more cereal grains, is extruded from an extruder under conditions that modify at least some of the starch in the admixture forming a water soluble carbohydrate polymer binder that functions as a clumping agent to self-clump together pellets of the extruded granular absorbent. While the extruded granular absorbent to which these patents are directed has enjoyed substantial commercial success, improvements nonetheless remain desirable.

In this regard, it has been learned that moisture volatilized from pellets of the granular absorbent as the pellets are extruded from the extruder die and condenses on the outer surface of the extruded pellets detrimentally impacting one or more characteristics or properties of the extruded granular absorbent pellets adversely effecting granular absorbent performance, including when used as litter. It has been further learned that the condensed moisture adversely impacts pellet performance by undesirably affecting the state, structure, phase, or matrix of the starches in the extruded pellets in a manner that can cause the freshly extruded wet pellets to undesirably stick together right out of the extruder, can detrimentally reduce pellet absorption capacity, can undesirably increase bulk density, and can adversely impact the ability of the pellets to clump together when wetted with water or urine. It also has been learned that the excessive heat at which the pellets are extruded from the extruder die also can detrimentally affect the state, structure, phase, or matrix of the starches in the extruded pellets in a manner that also can adversely impact one or more such characteristics or properties of the pellets reducing their performance and effectiveness as a granular absorbent, particularly in litter applications. Finally, where any post-extrusion processing of the extruded granular absorbent is performed that involves physical contact, e.g., impact(s), mechanical engagement, e.g., crushing and/or compression, or other physical or thermal modification of the extruded pellets, such as what typically has occurred in the past when particle-size reduction has been performed on extruded pellets, it has been learned that such post-extrusion extruded granular absorbent processing carried out in performing such particle-size reduction can also adversely affect one or more of such properties or characteristics of the pellets even further detrimentally reducing their performance.

What is needed is a system and method for making extruded granular absorbent that reduces and preferably minimizes such adverse moisture, temperature and mechanically induced changes to starch in extruded granular absorbent pellets following extrusion.

SUMMARY

The present invention is directed to a system and method for making extruded granular sorbent pellets from a starch-containing admixture that includes a cold-processing arrangement with an air pellet cooling and drying subsystem that cools and dries pellets upon extrusion and while being pneumatically conveyed in the coolant air stream from the extruder to a post-extrusion pellet processing device of a post-extrusion pellet processing subsystem that preferably is a pellet comminution device or machine that comminutes extruded pellets in a manner that improves at least one property or characteristic thereof that improves extruded granular sorbent pellet performance during use of a finished granular sorbent product composed of the post-extrusion processed pellets. The pellets are extruded from an extruder using a starch-containing mixture at a sufficiently high enough extrusion pressure and extrusion temperature to physically modify starch gelatinized in the extruder during pellet extrusion to form starch-based water soluble binder in the extruded pellets sufficient to function as a pellet clumping agent when the pellets are wetted. The extruded pellets are cold-processed upon extrusion to preserve the structure, phase, and/or starch matrix of the pellets substantially in the as extruded state not only upon extrusion but during transport away from the extruder to the post-extrusion pellet processing device where cold-processing of the pellets helps prevent and preferably minimizes changes to the as-extruded structure, phase and/or starch matrix of the pellets undergoing post-extrusion pellet processing.

In one preferred system embodiment and method implementation, the post-extrusion pellet processing device is a pellet comminution machine that comminutes extruded pellets without pulverizing, crushing or compressing the pellets further helping to prevent and also helping to further minimize changes to the as-extruded structure, phase and/or starch matrix of the pellets undergoing post-extrusion pellet comminution processing. In one such preferred system embodiment and method implementation, the post-extrusion pellet processing device is a pellet or particle size reduction machine that comminutes extruded pellets in a manner that reduces the size of oversized extruded pellets to a pellet or particle size within an acceptable pellet or particle size range while also producing even smaller more finely sized particles formed of portions severed or lopped off of extruded pellets during pellet or particle size reduction. In another such preferred system embodiment and method implementation, the cold-processing pellet air cooling and pellet air drying arrangement further includes a particle size reduction machine cooling subsystem that introduces ambient air into the pellet or particle size reduction machine to cool and/or dry pellets while the pellets are undergoing particle size reduction.

In a preferred pellet comminution machine or device embodiment used for post-extrusion pellet processing that size reduces extruded pellets, a pellet comminuting particle size reducer is employed that preferably is a rotating roll type pellet comminuting mill composed of a pair of generally horizontal side-by-side elongate pellet-comminuting corrugated rolls, preferably LePage rolls, which can be and preferably are generally parallel to one another and which rotate toward one another with the differential in the rotational speeds and spacing between the rotating rolls determining the maximum pellet size or pellet size range to which extruded pellets are particle size reduced thereby during post-extrusion pellet processing. In one such preferred pellet comminution machine or device, the pellet comminuting particle size reducer is a LePage corrugated roll mill or LePage roll granulator having a pair of such corrugated LePage rolls that rotate toward one another during extruded pellet size reduction with one of the LePage rolls being longitudinally corrugated having longitudinally extending corrugations, e.g., longitudinally formed or longitudinally cut corrugations, and the other one of the LePage rolls being circumferentially corrugated having circumferentially spaced apart corrugations extending in a circumferential direction, e.g., circumferentially formed corrugations or circumferentially cut corrugations, with rotation of the corrugated LePage rolls comminuting oversized extruded pellets in a manner that shears, severs or lopped off portions of the oversized extruded pellet without pulverizing, crushing, hammering, or otherwise compressing the pellets during particle size reduction. Performing such non-compression induced particle size reduction using such a particle size reduction roller mill equipped with such horizontally and circumferentially corrugated LePage rollers advantageously minimizes and preferably substantially completely prevents physically and thermally modifying extruded pellets contacting the rolls, being comminuted by the rolls, and/or being particle size reduced by the rolls during particle size reduction operation.

Various other features, advantages, and objects of the present invention will be made apparent from the following detailed description and any appended drawings.

DRAWING DESCRIPTION

One or more preferred exemplary embodiments of the invention are illustrated in the accompanying drawings in which like reference numerals represent like parts throughout and in which:

FIG. 1 is a schematic diagram of a first preferred but exemplary embodiment of an extruded granular sorbent manufacturing system constructed in accordance with the present invention equipped with post-extrusion processing system that includes a first extruded granular sorbent pellet size control commination device for extruded granular sorbent pellet or particle size control that includes a cold-processing arrangement for post-extrusion drying and cooling the extruded granular sorbent in a manner that optimizes extruded granular sorbent performance; and FIG. 2 is a schematic diagram of a second preferred but exemplary embodiment of an extruded granular sorbent manufacturing system constructed in accordance with the present invention equipped with post-extrusion processing system that includes a second extruded granular sorbent pellet size control commination device for extruded granular sorbent pellet or particle size control that includes a cold-processing arrangement for post-extrusion drying and cooling the extruded granular sorbent in a manner that optimizes extruded granular sorbent performance.

Figure 1:
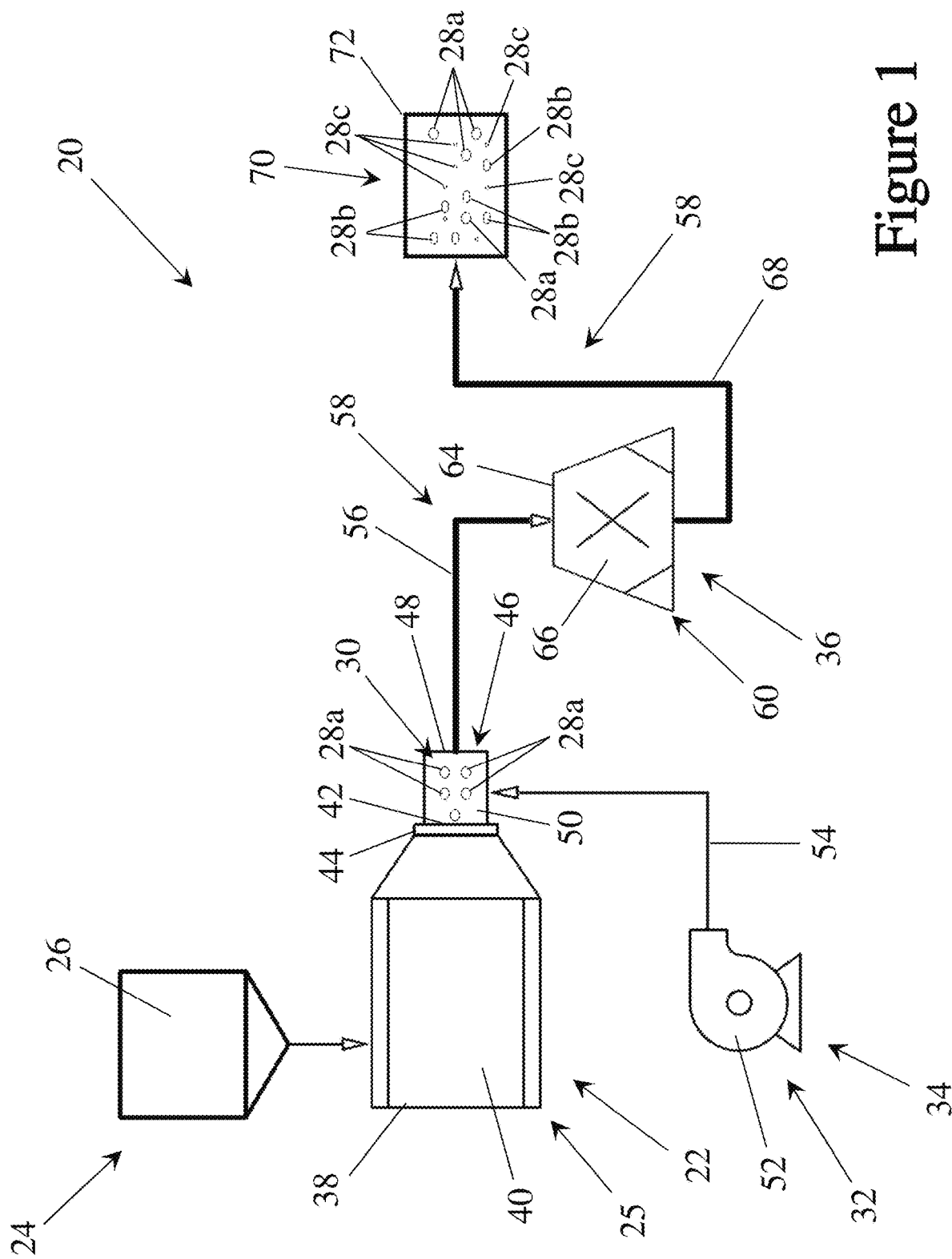
Figure 2:
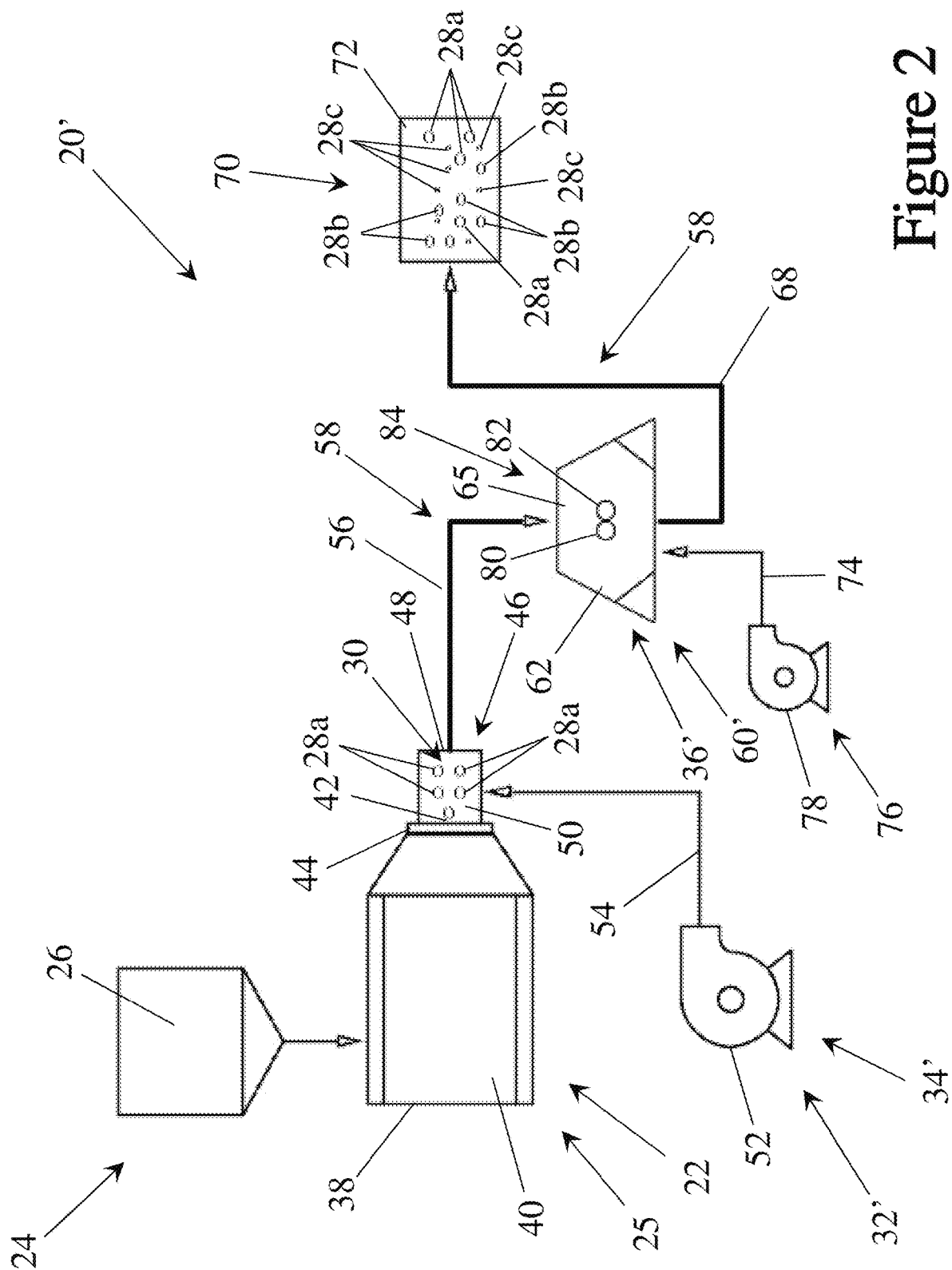
Figure 4:
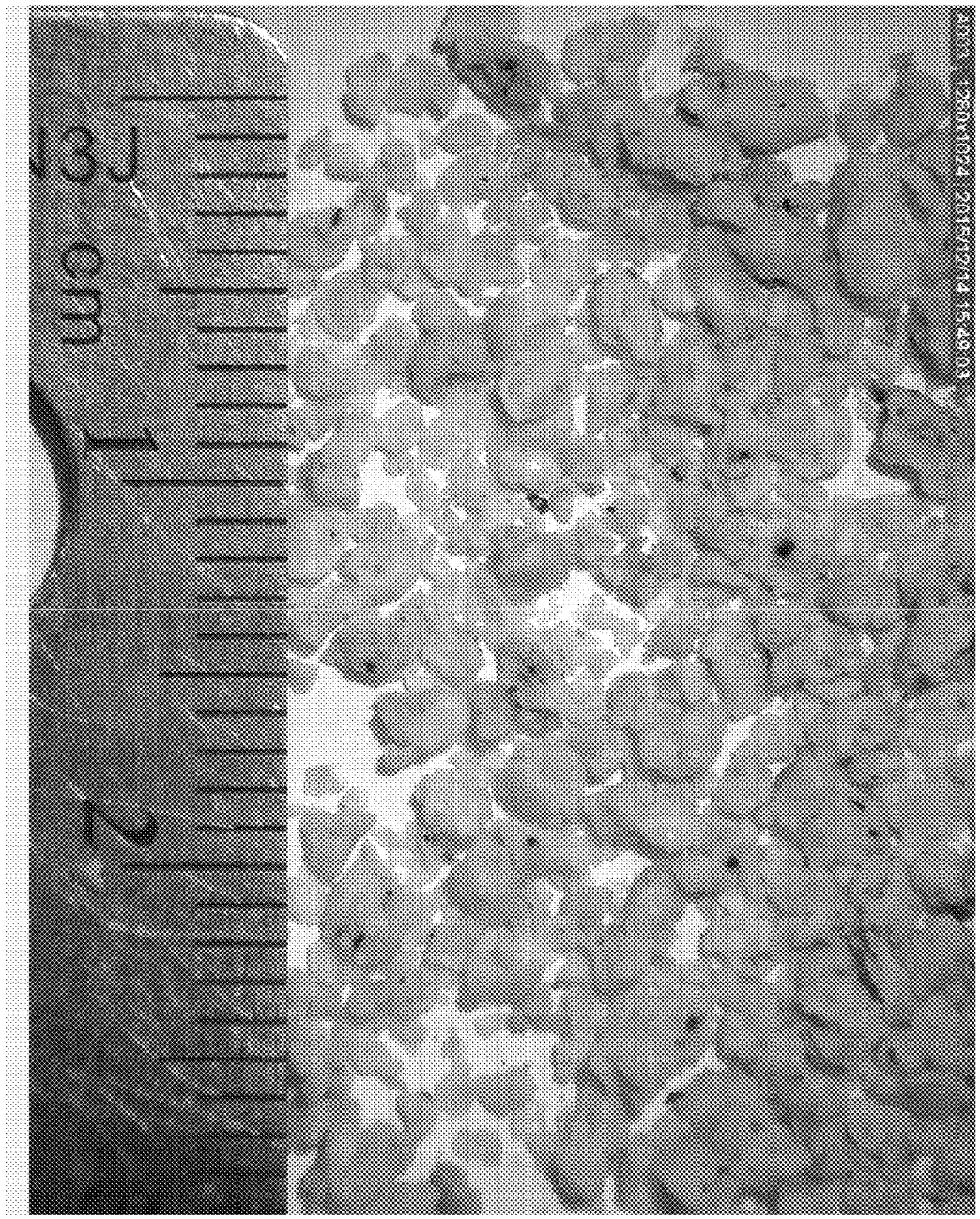
FIG. 4 is another microscope photo that includes extruded pellets same as or substantially the same as those shown in FIG. 3 where some but not all of the pellets have been particle-size reduced using a non-compression induced particle size reduction method and machine set to particle-size reduce pellets having a size greater than 0.047 inches.
Figure 6:
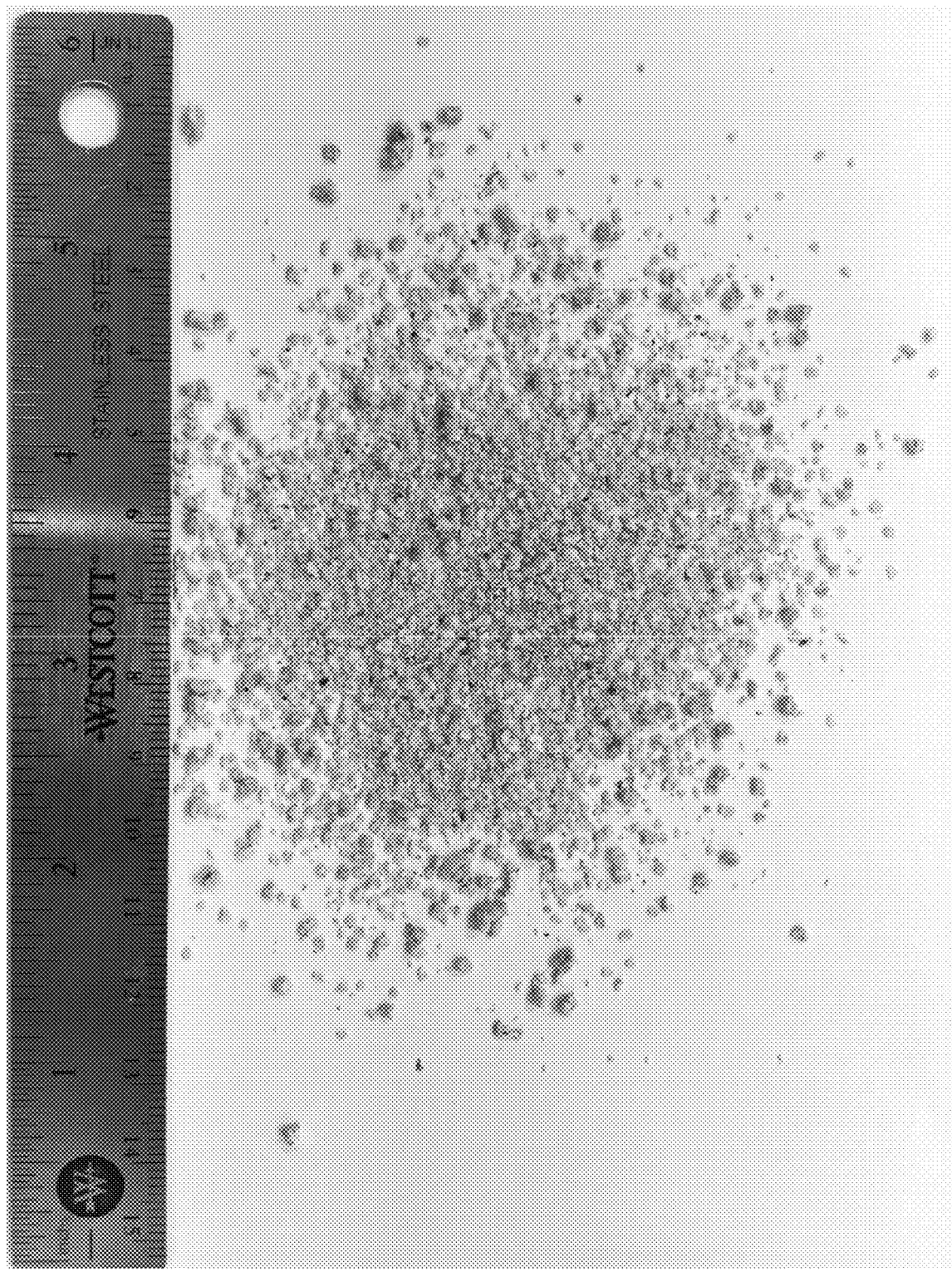
FIG. 6 is a microscope photo depicting a first batch of extruded pellets and smaller more finely sized "fines" produced from or during extrusion and/or during transport immediately after extrusion but before performing non-compression induced particle size reduction.
Figure 7:
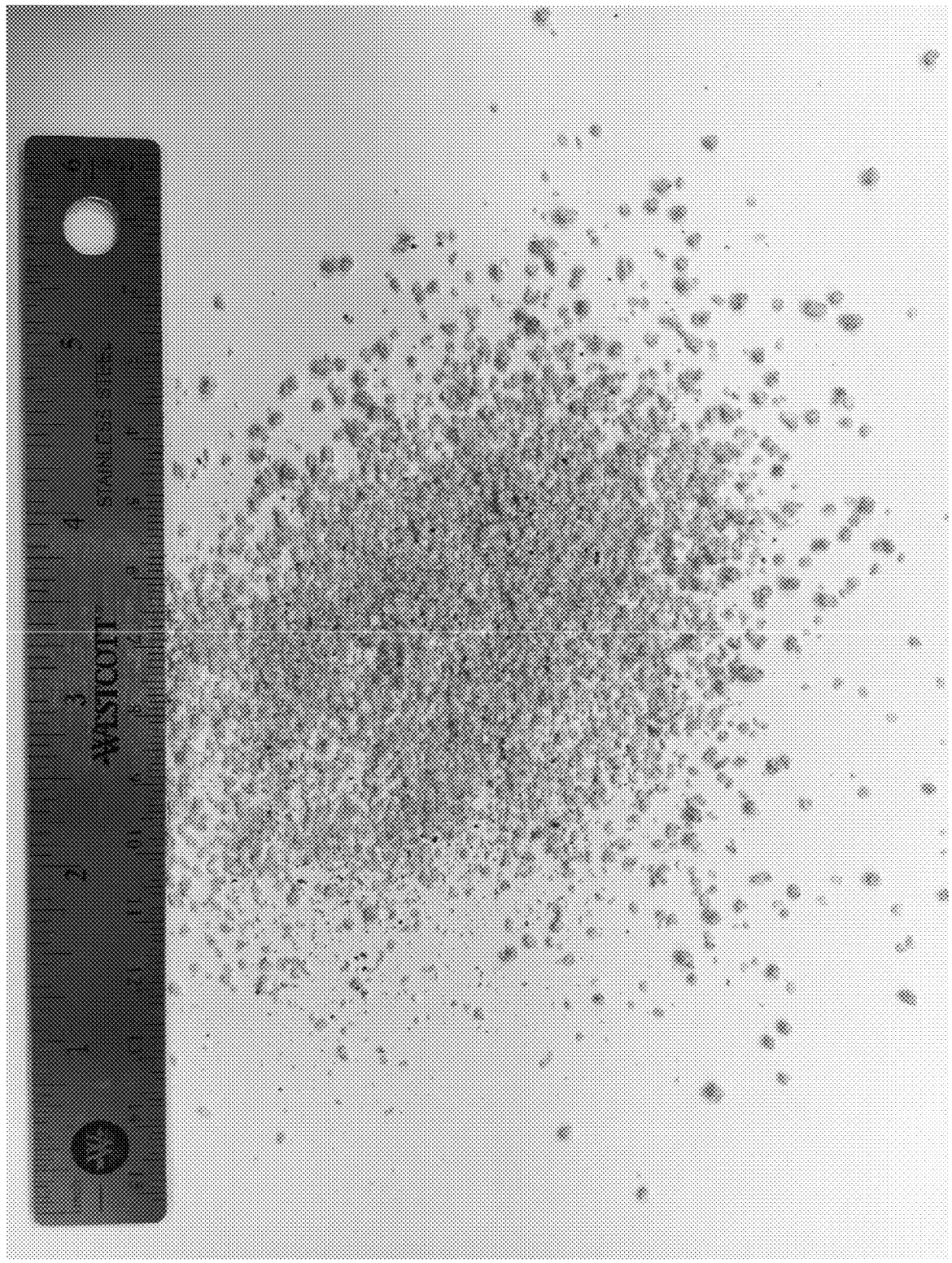
Figure 8:
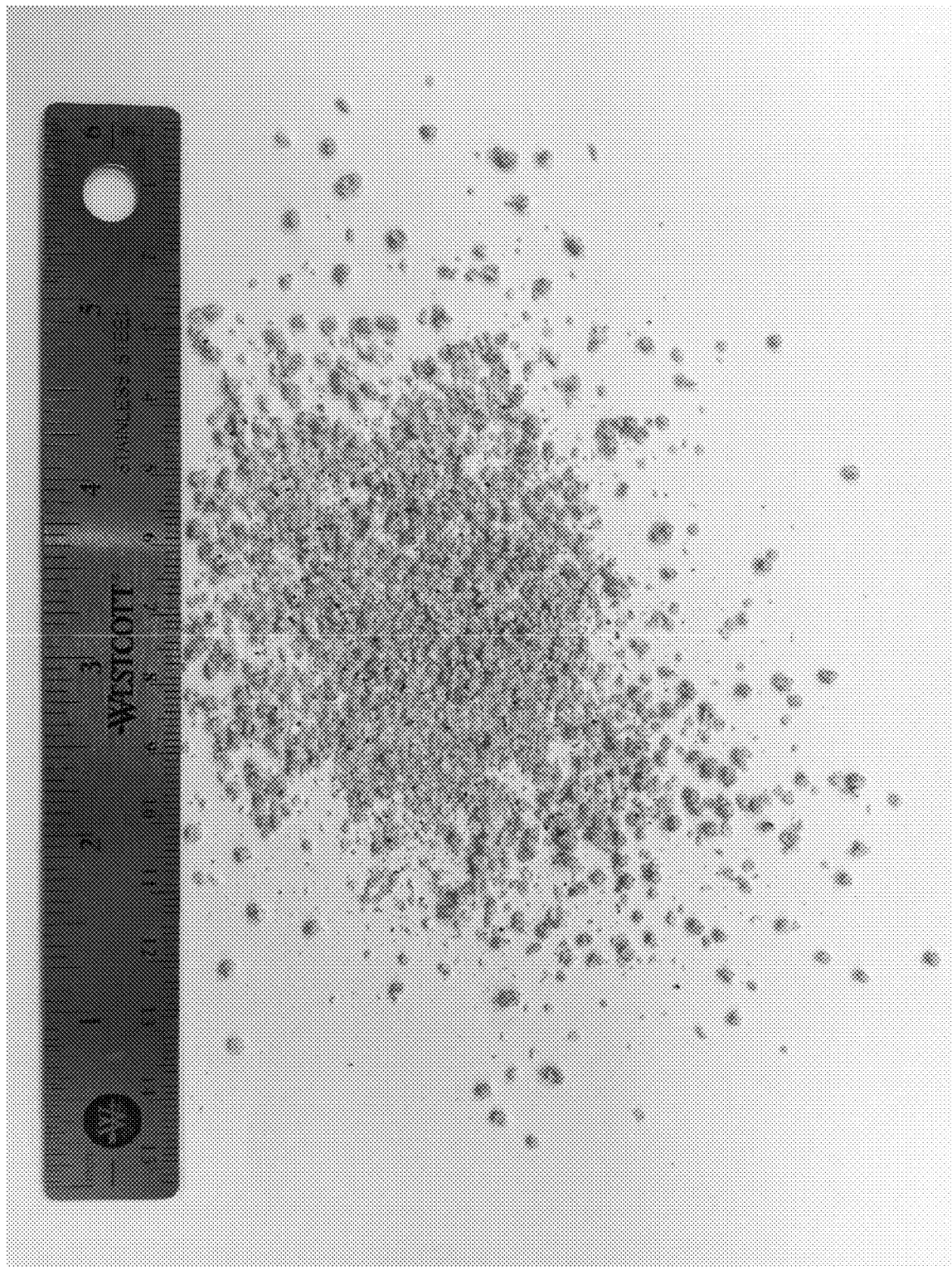
Figure 9:
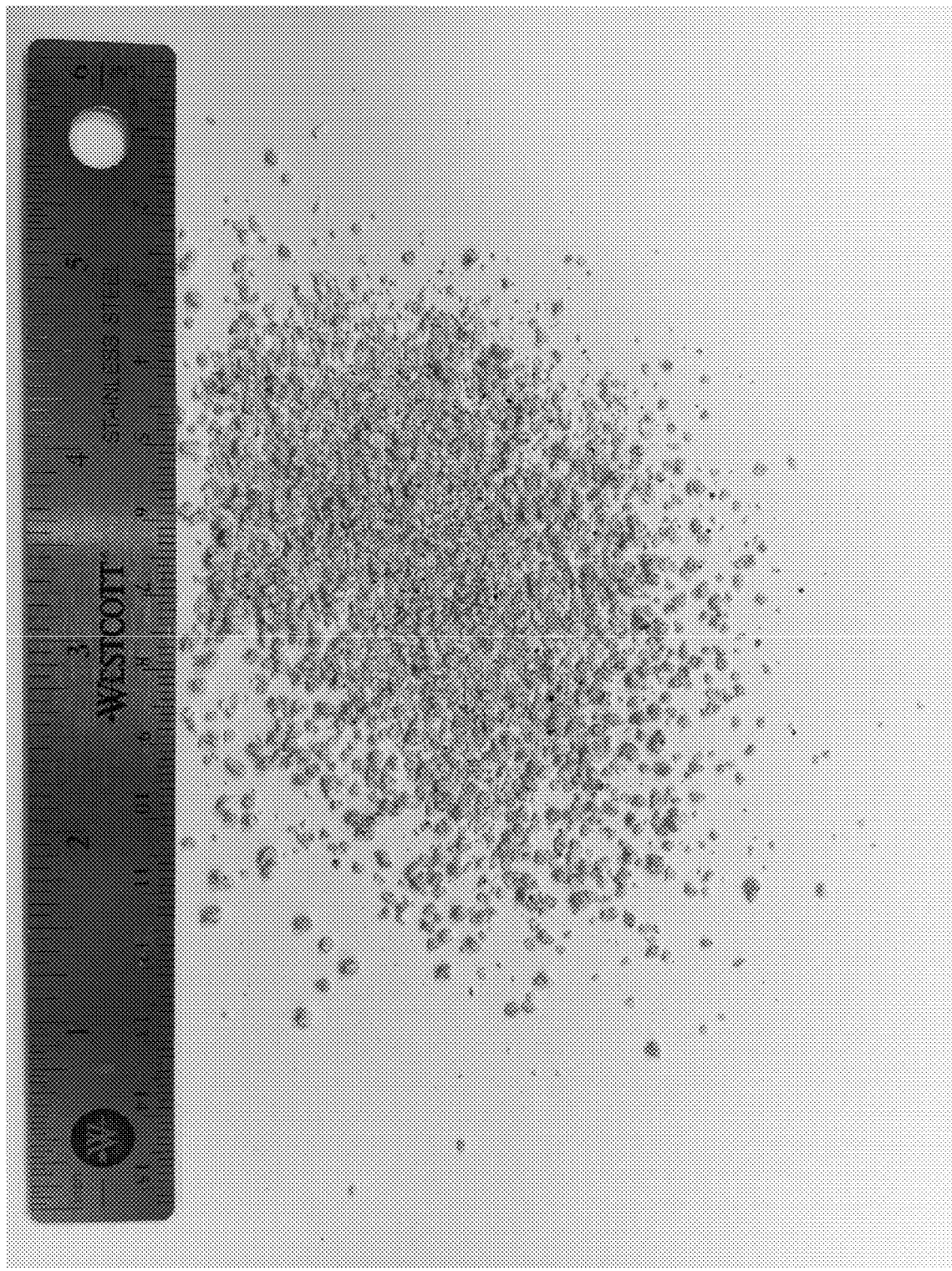
Figure 10:
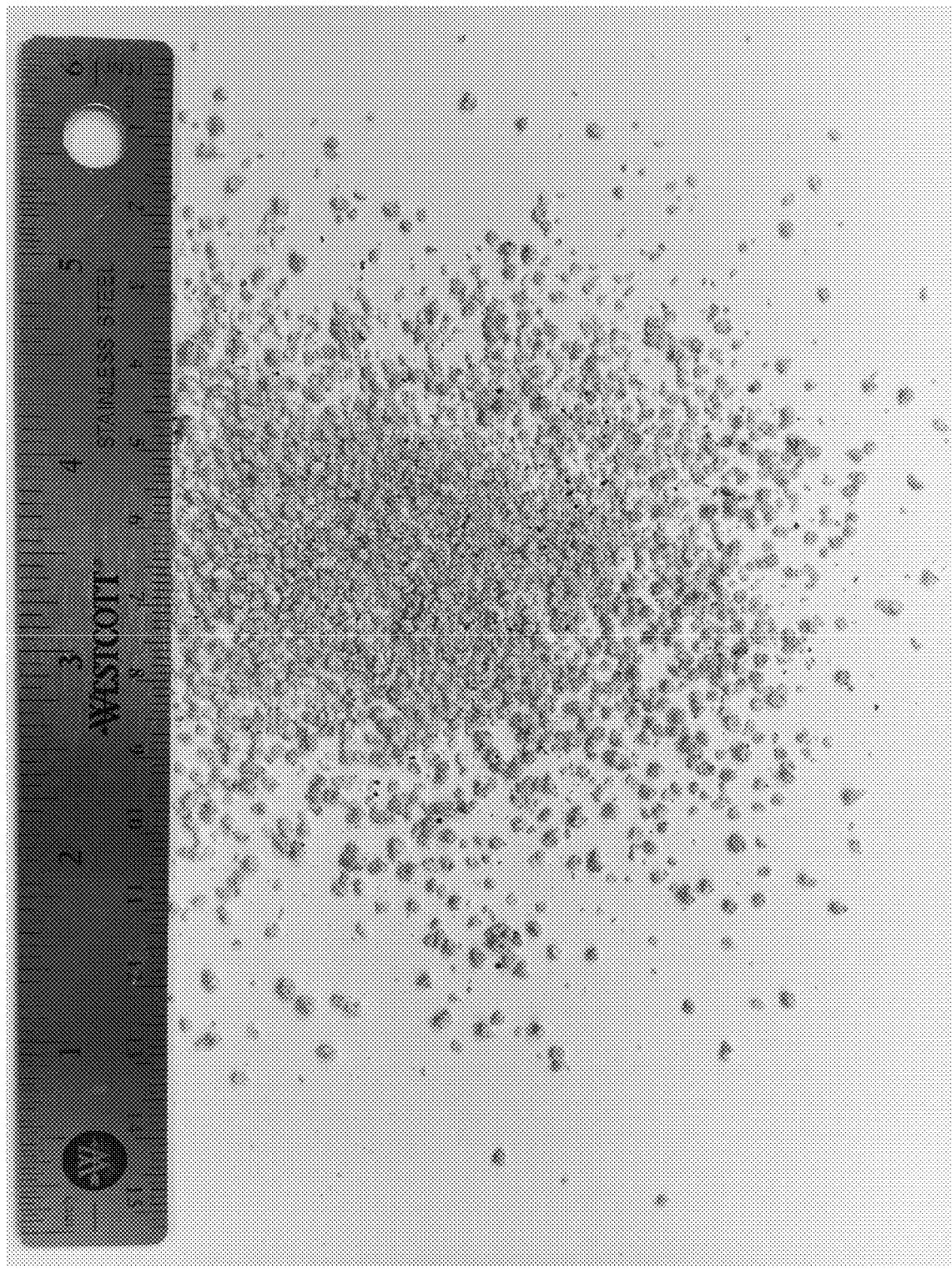
Figure 11:
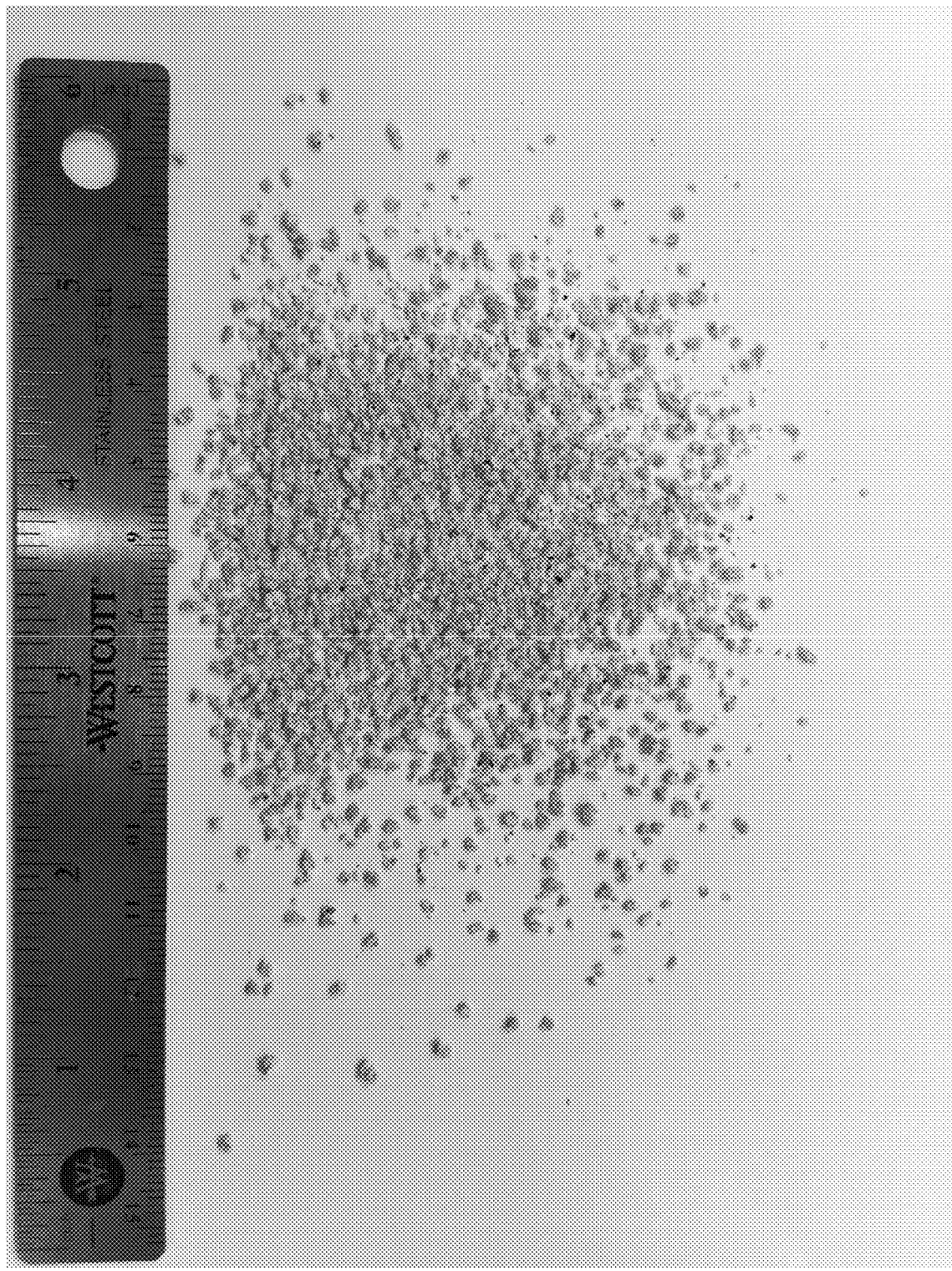
Figure 12:
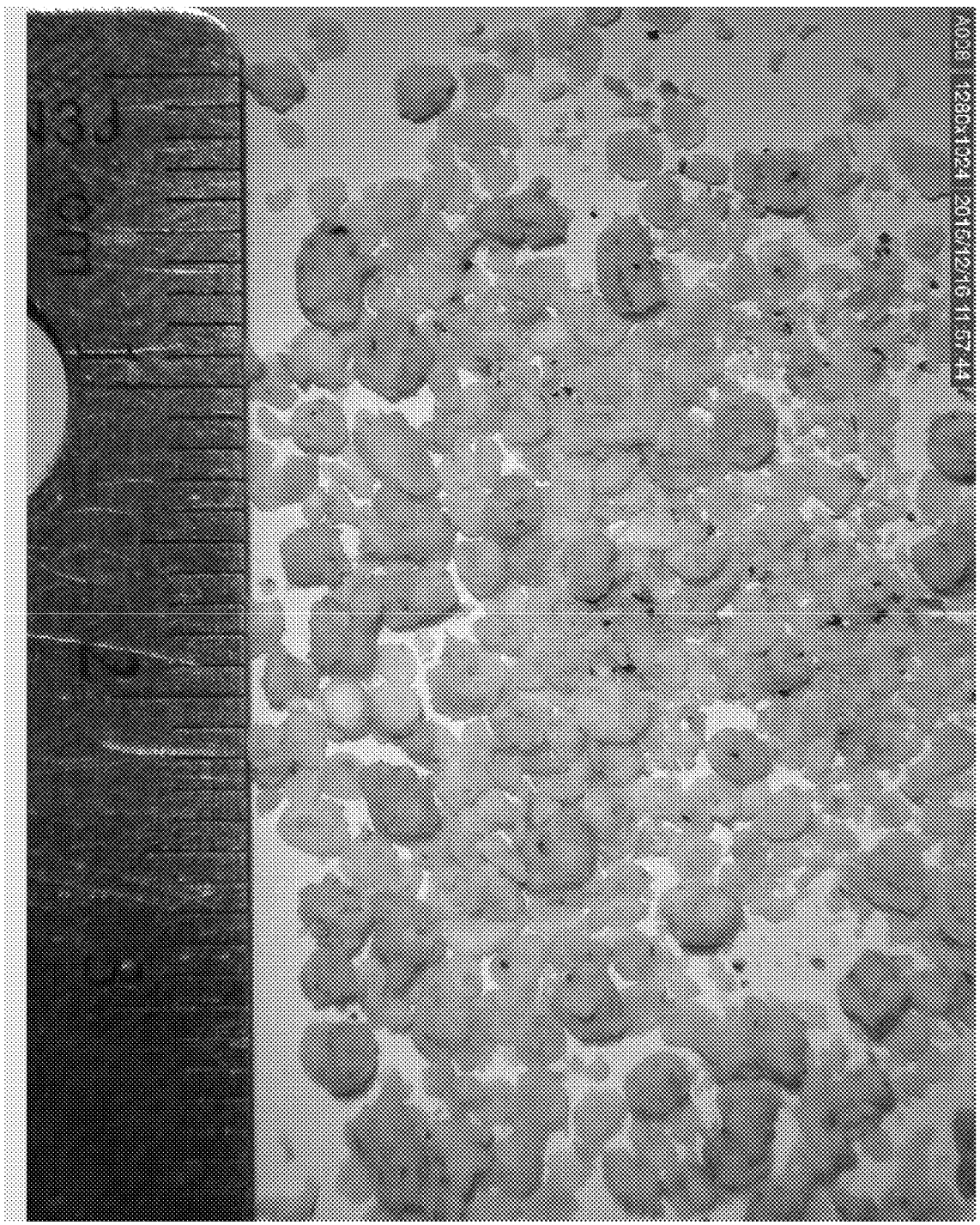
Figure 13:
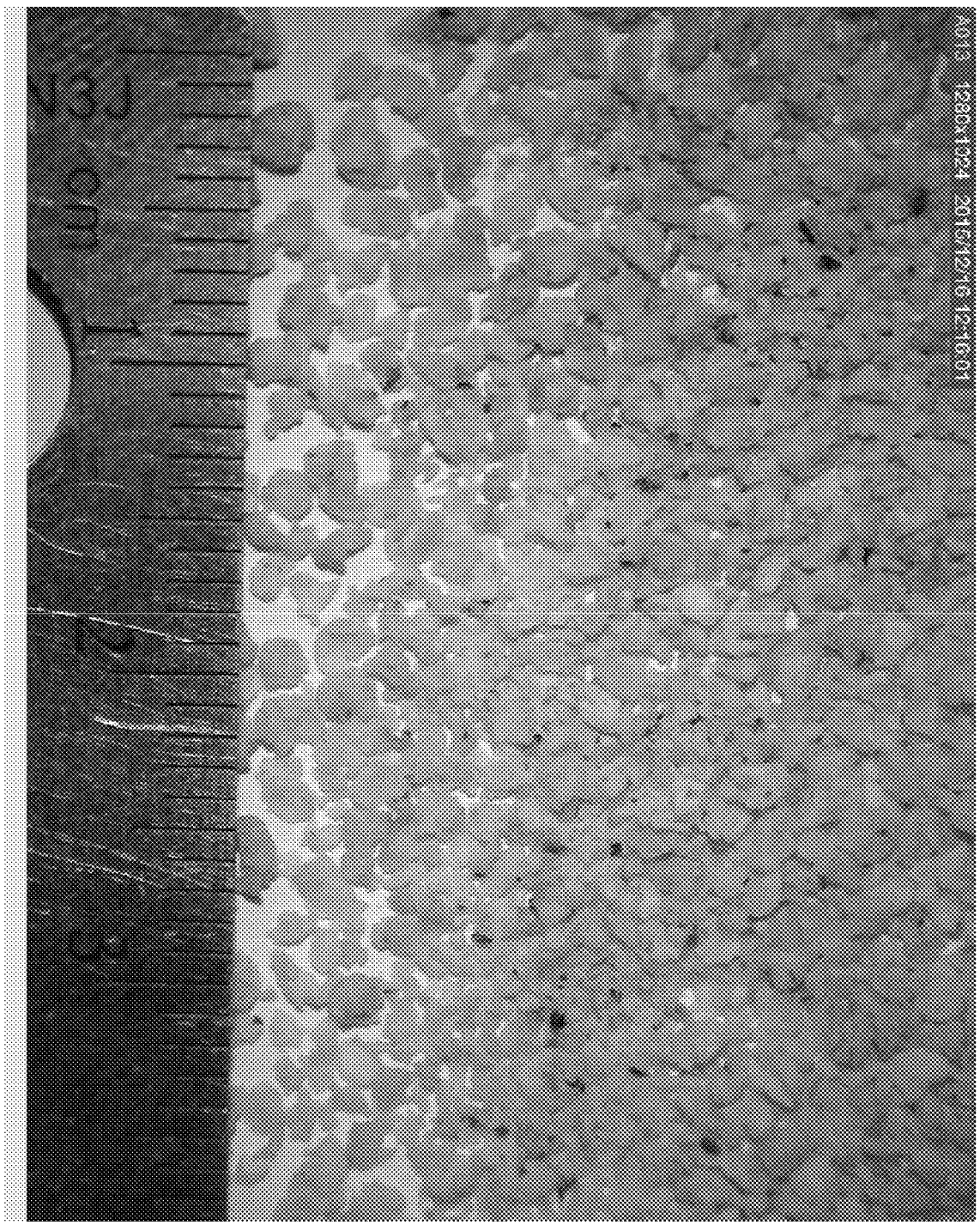
Figure 14:
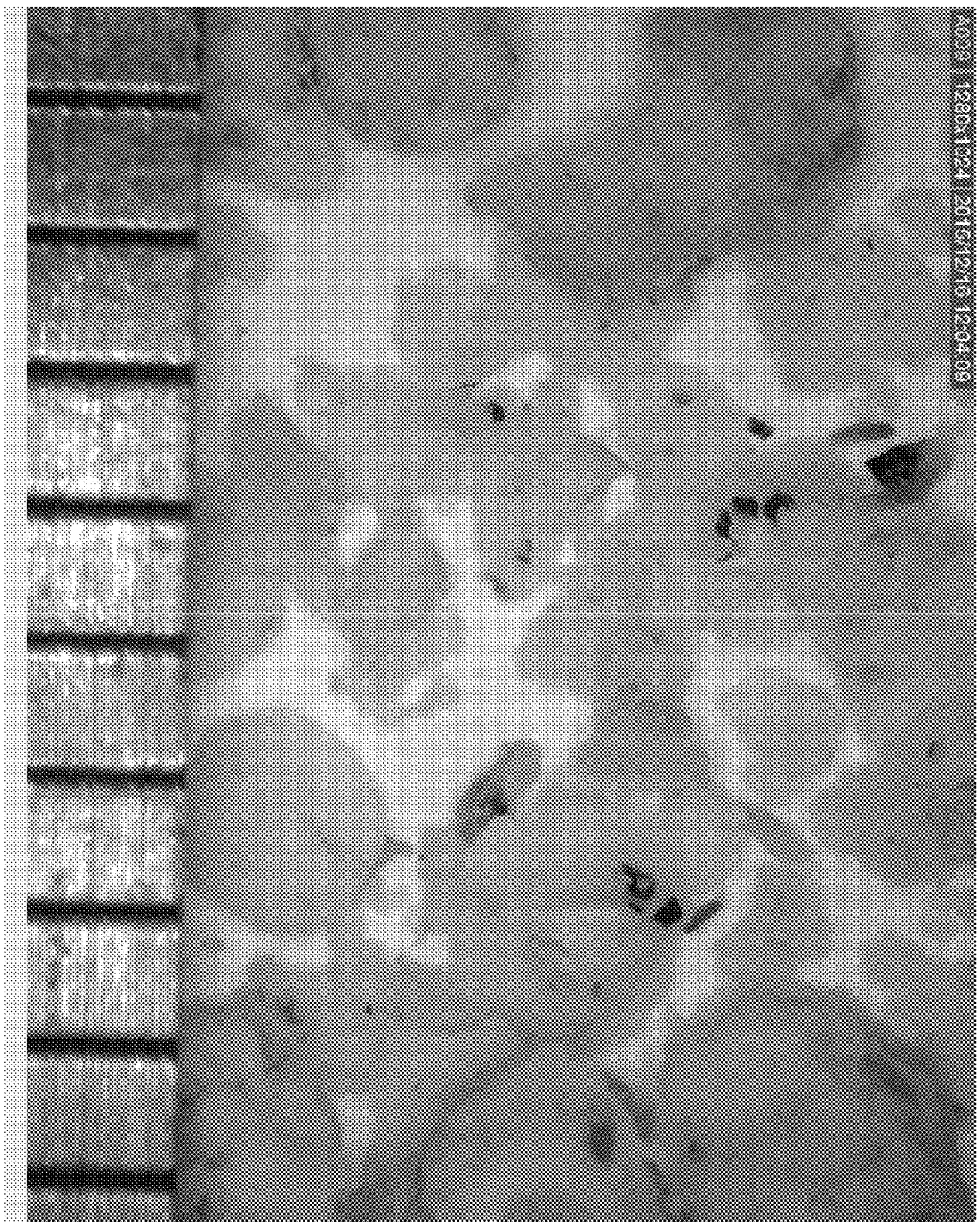
Figure 15:
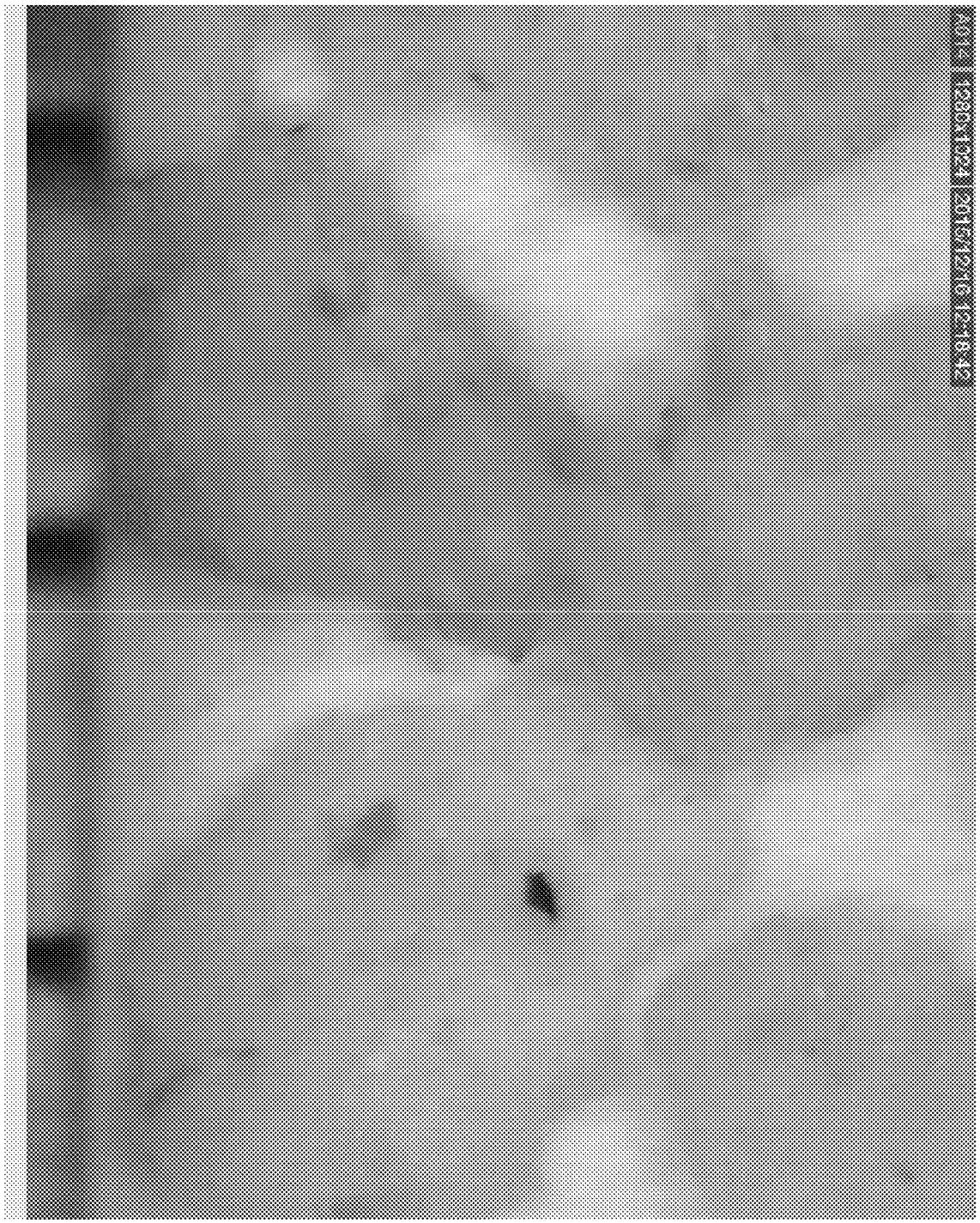
Figure 16:
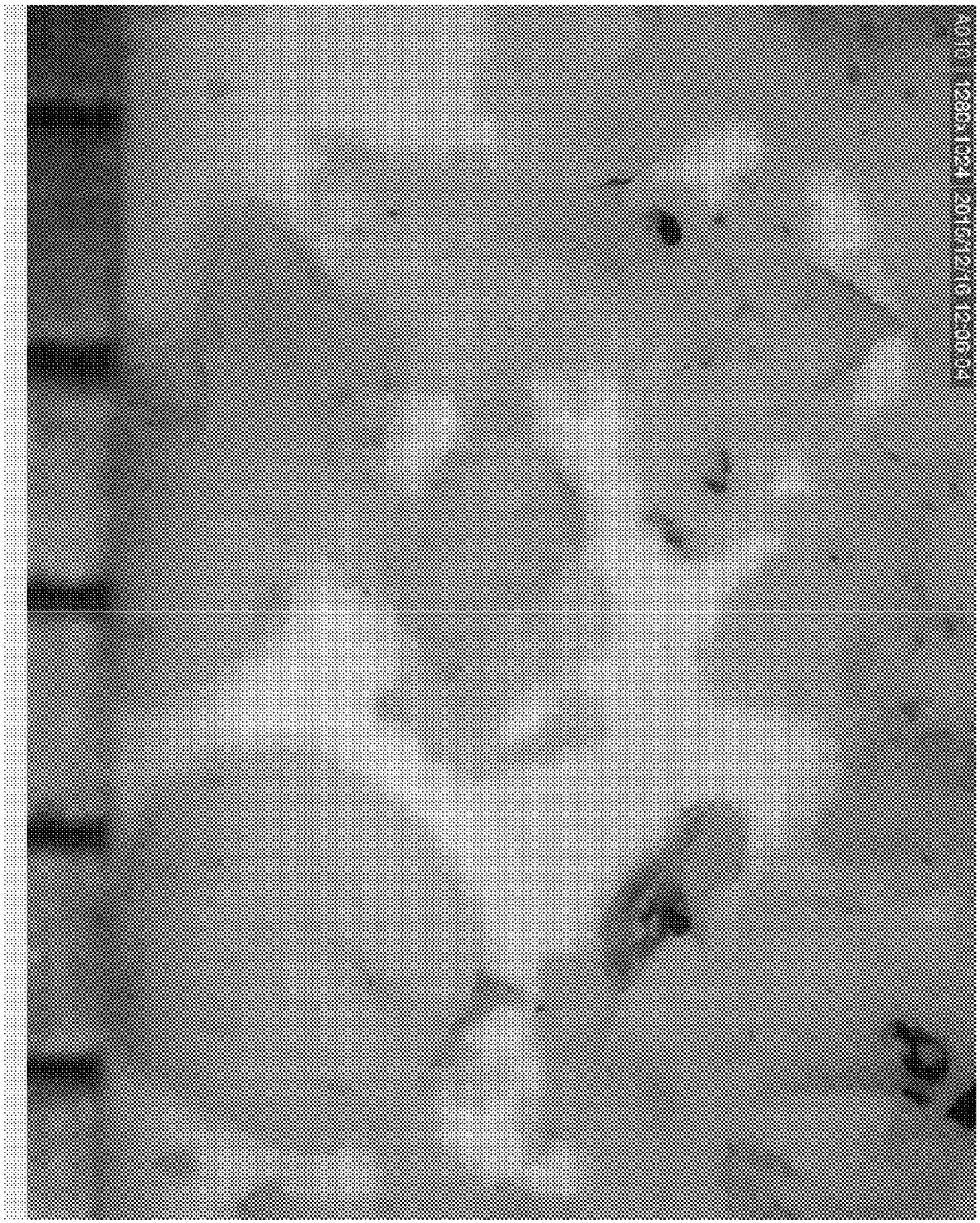
Figure 17:
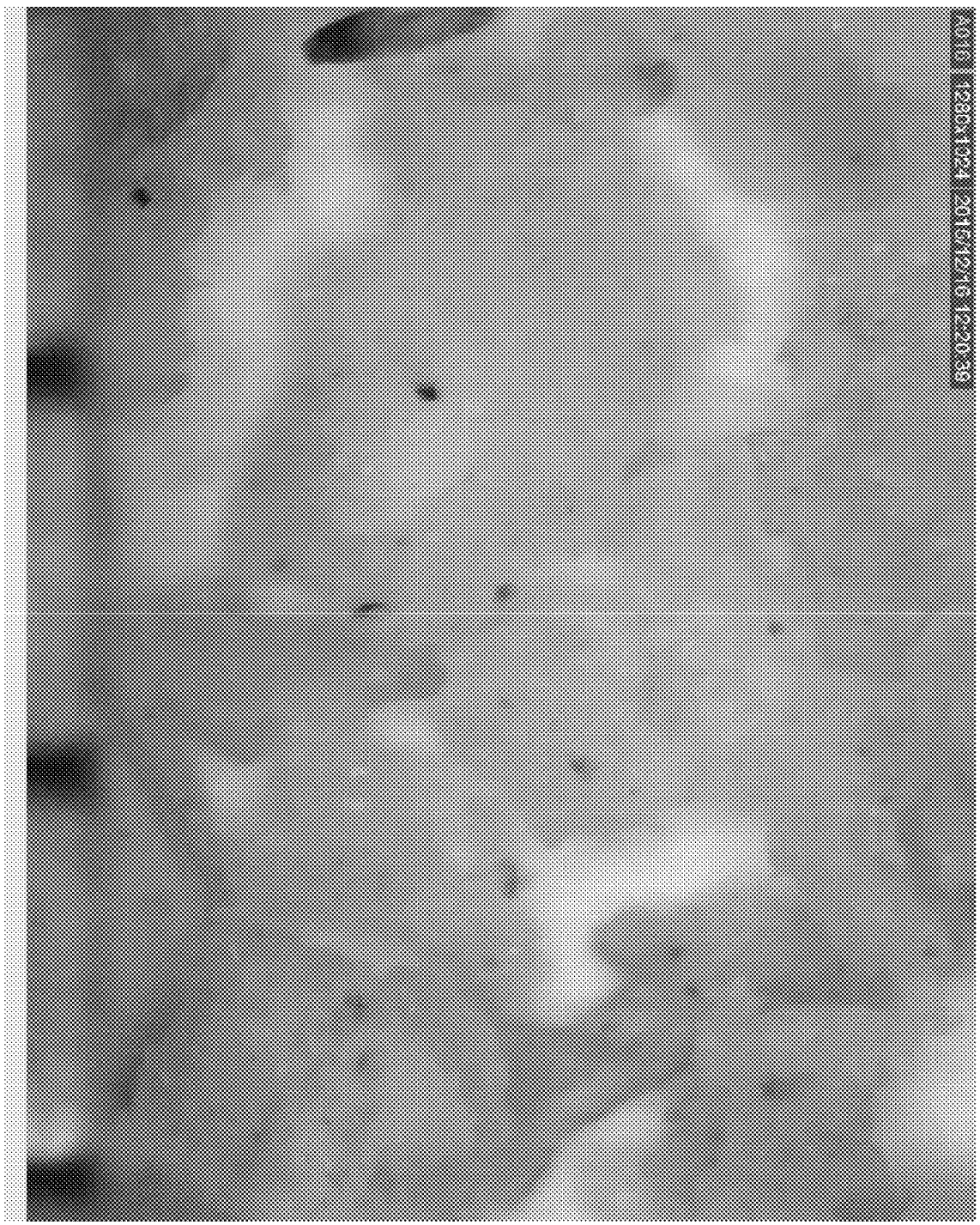
Figure 18:
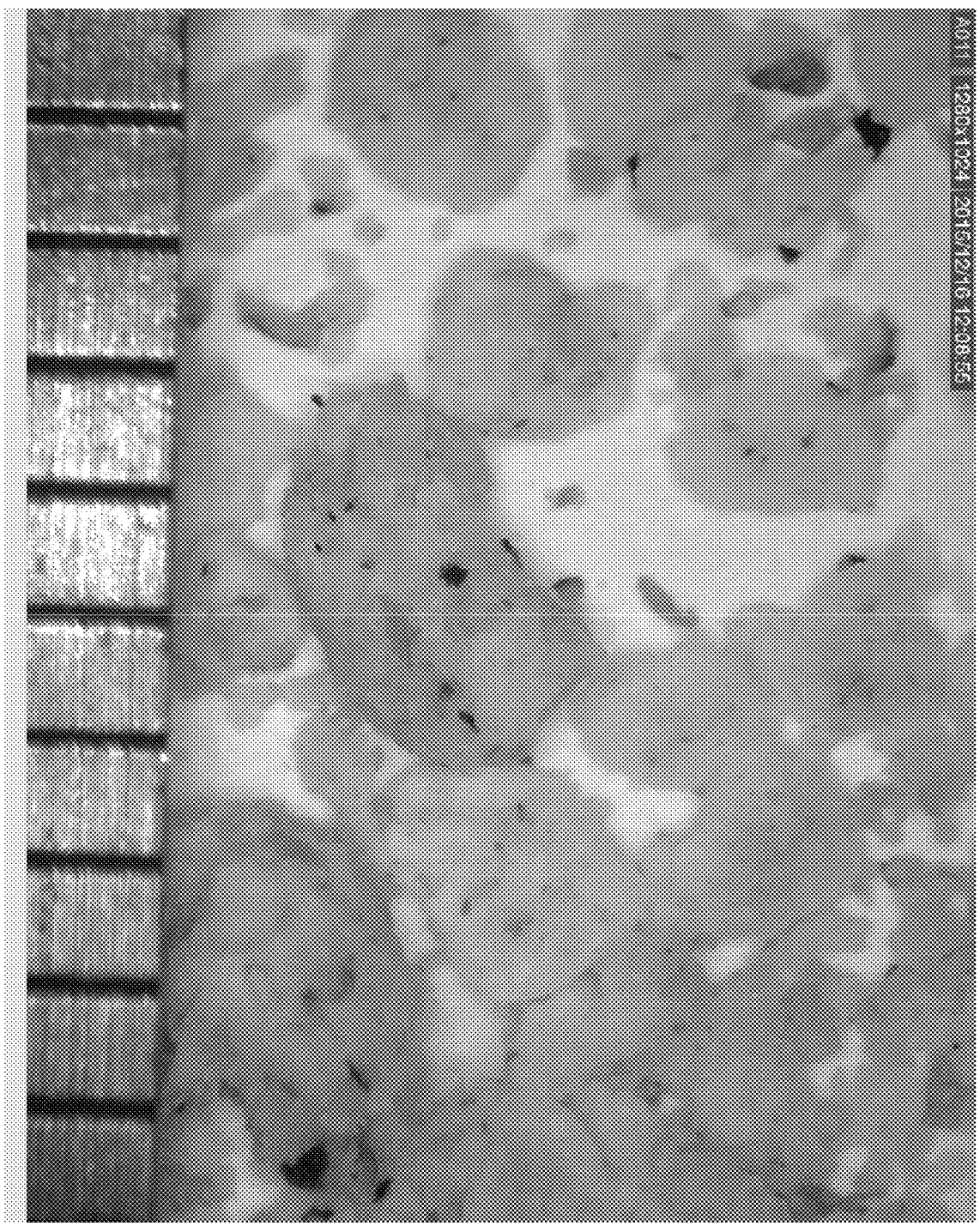
Figure 19:
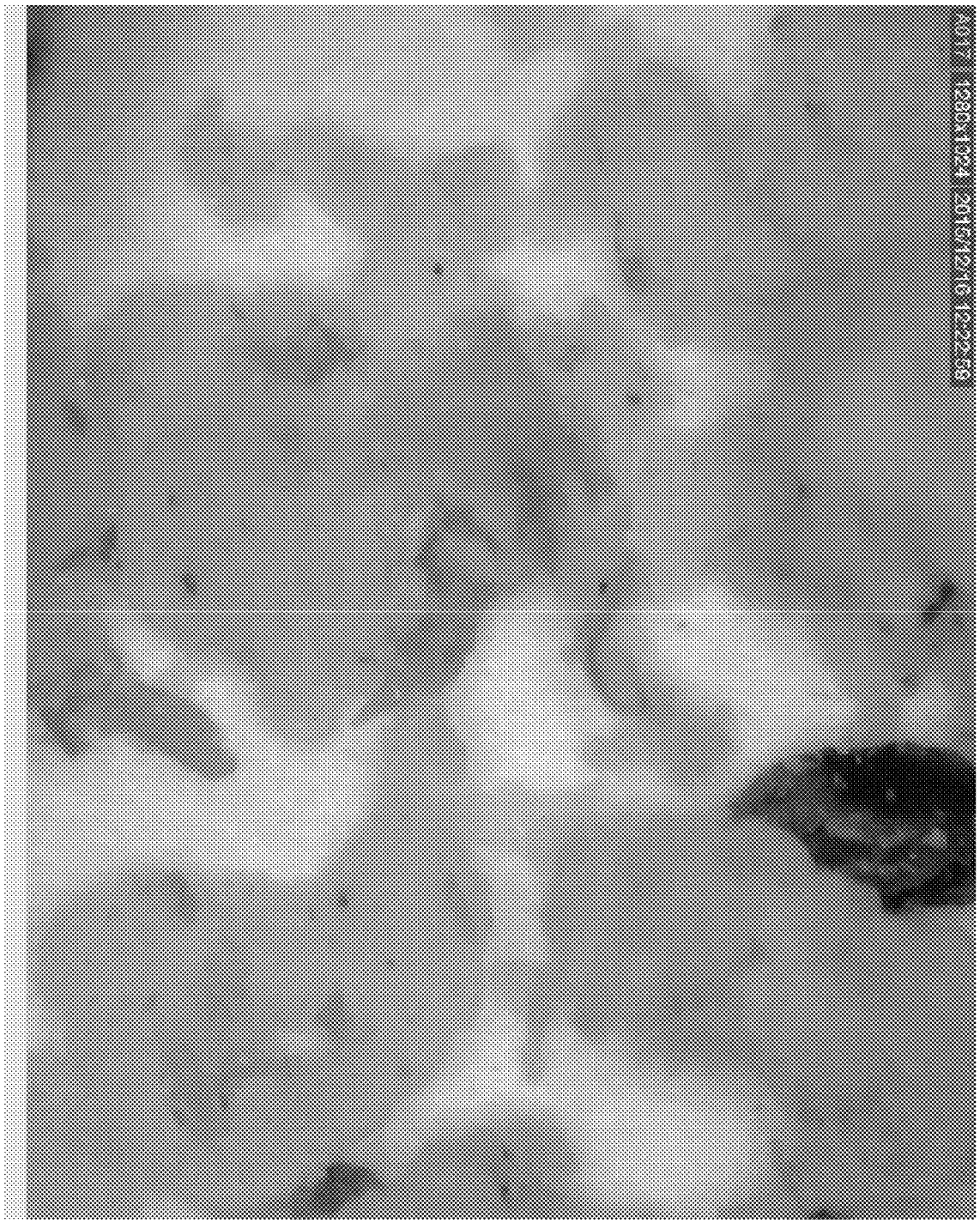
Figure 20:
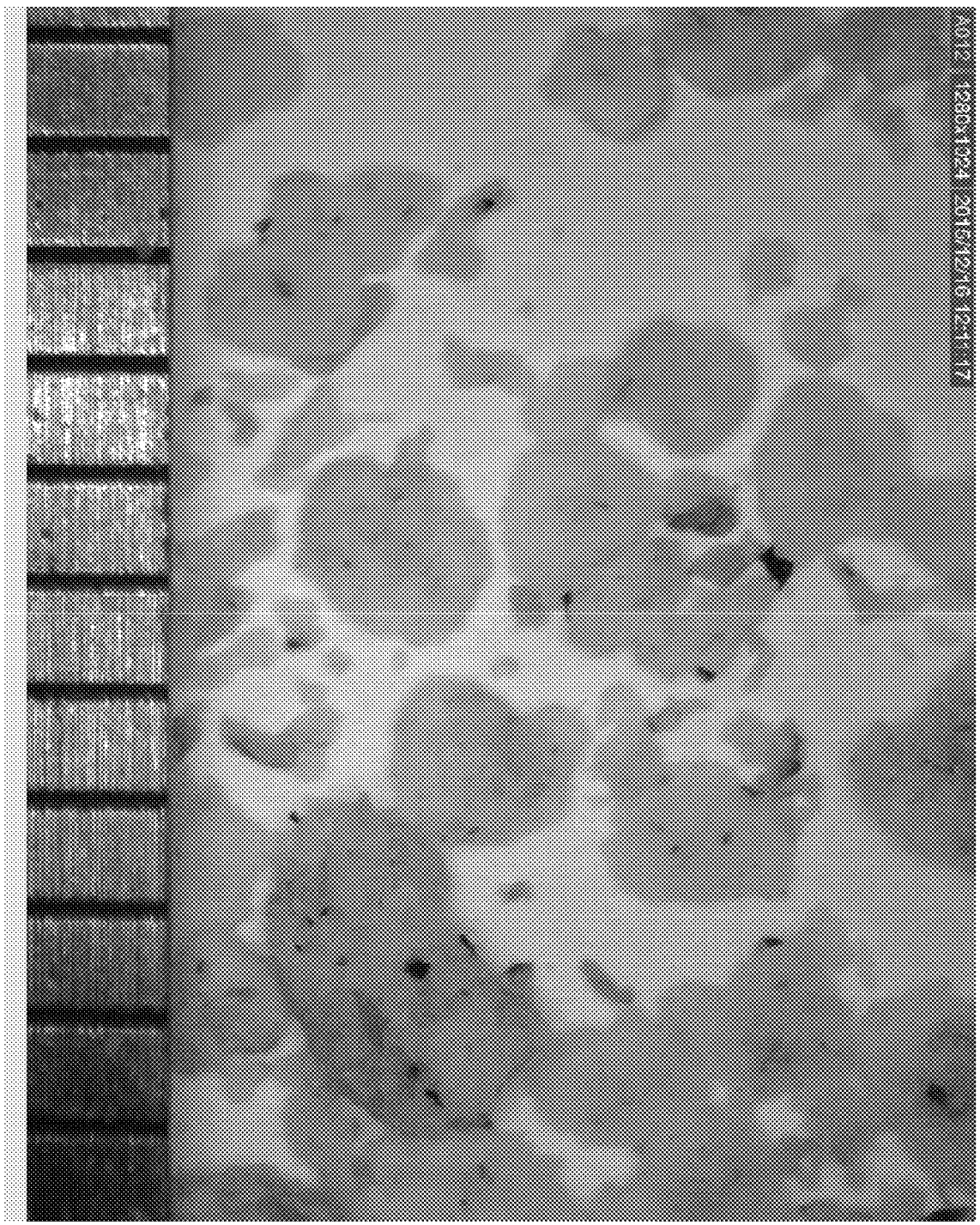
Figure 21:
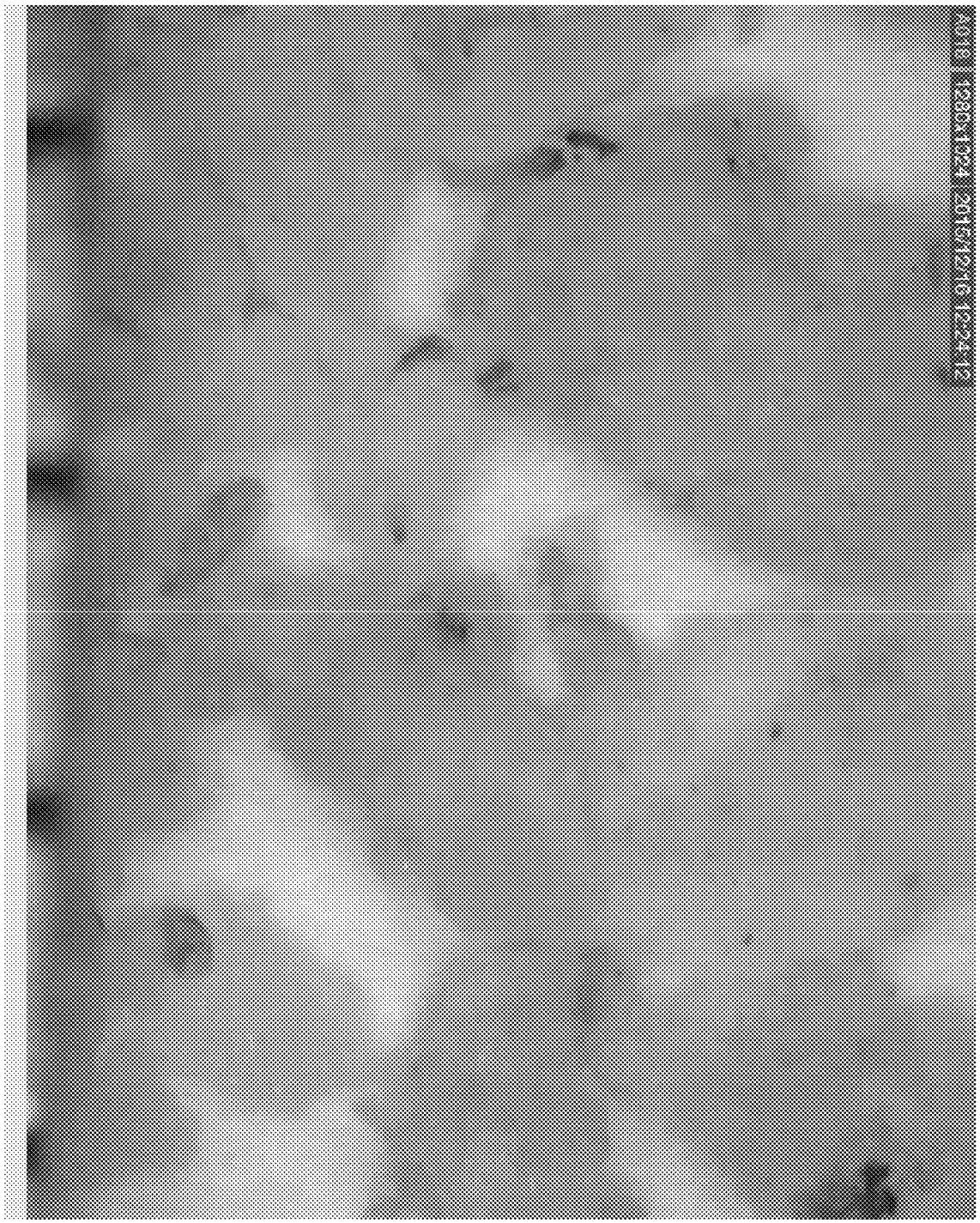

FIG. 7 is a second microscope photo depicting as-extruded pellets and smaller more finely sized "fines" from the first batch of FIG. 6 after performing non-compression induced particle size reduction, i.e., non-pulverizing, non-crushing and non-compressing particle size reduction, with a non-compression induced particle size reduction machine like one or more of the pellet comminuting devices or machines depicted in FIGS. 1 and 2 having a 0.062-inch particle size reduction setting;

FIG. 8 is a third microscope photo depicting as-extruded pellets and smaller more finely sized "fines" from the first batch of FIG. 6 after performing non-compression induced particle size reduction with a non-compression induced particle size reduction machine like one or more of those depicted in FIG. 1 and/or FIG. 2 producing a smaller 0.054-inch particle size reduction setting thereby increasing the ratio of fines produced as a result;

FIG. 9 is a fourth microscope photo depicting as-extruded pellets and smaller more finely sized "fines" from the first batch of FIG. 6 after performing non-compression induced particle size reduction with such a non-compression induced particle size reduction machine having a 0.049-inch particle size reduction setting further increasing the ratio of fines produced as a result;

FIG. 10 is a fifth microscope photo depicting as-extruded pellets and smaller more finely sized "fines" from the first batch of FIG. 6 after performing non-compression induced particle size reduction with such a non-compression induced particle size reduction machine like that depicted in FIG. 4 having a 0.045-inch particle size reduction setting even further increasing the ratio of fines produced as a result;

FIG. 11 is a sixth microscope photo depicting as-extruded pellets and smaller more finely sized "fines" from the first batch of FIG. 6 after performing non-compression induced particle size reduction with a non-compression induced particle size reduction machine having a 0.039-inch particle size reduction setting increasing the ratio of fines produced as a result even more than that depicted in FIG. 10;

FIG. 12 is a microscope photo depicting an enlarged second batch of as-extruded pellets and smaller more finely sized "fines" produced from or during extrusion and/or during transport immediately after extrusion but before performing non-compression induced particle size reduction in accordance with the present invention;

FIG. 13 is a second microscope photo depicting an increase in the amount and ratio of fines produced after performing non-compression induced particle size reduction in accordance with the present invention using a non-compression induced particle size reduction machine like the LePage corrugated roller equipped particle size reduction machine schematically depicted in FIG. 2 having a 0.030-inch particle size reduction setting on all of the as-extruded pellets and smaller more finely sized "fines" of the second batch of FIG. 12;

FIG. 14 is a microscope photo depicting an enlarged third batch of as-extruded pellets and smaller more finely sized "fines" produced from or during extrusion and/or during transport immediately after extrusion but before performing non-compression induced particle size reduction in accordance with the present invention;

FIG. 15 is a second microscope photo enlarged to show the third batch after all of the as-extruded pellets and smaller fines of the third batch of FIG. 14 have been particle size reduced in accordance with the present invention using non-compression induced particle size reduction with a non-compression induced particle size reduction machine that preferably is the LePage corrugated roller equipped particle size reduction machine schematically depicted in FIG. 2 having a 0.030-inch particle size reduction setting;

FIG. 16 is a microscope photo depicting an enlarged fourth batch of as-extruded pellets and smaller more finely sized "fines" produced from or during extrusion and/or during transport immediately after extrusion but before performing non-compression induced particle size reduction using the LePage corrugated roller equipped particle size reduction machine schematically depicted in FIG. 2;

FIG. 17 is a second microscope photo enlarged to show the fourth batch after all of the as-extruded pellets and smaller fines of the fourth batch of FIG. 16 have been particle size reduced using non-compression induced particle size reduction in accordance with the present invention with a non-compression induced particle size reduction machine that preferably is the LePage corrugated roller equipped particle size reduction machine schematically depicted in FIG. 2 configured or setup to have a 0.030-inch particle size reduction setting;

FIG. 18 is a microscope photo depicting an enlarged fifth batch of as-extruded pellets and smaller more finely sized "fines" produced from or during extrusion and/or during transport immediately after extrusion but before performing non-compression induced particle size reduction;

FIG. 19 is a second microscope photo enlarged to show the fifth batch after all of the as-extruded pellets and smaller fines of the fifth batch of FIG. 18 have been particle size reduced using non-compression induced particle size reduction in accordance with the present invention with a non-compression induced particle size reduction machine that preferably is the LePage corrugated roller equipped particle size reduction machine schematically depicted in FIG. 2 having a 0.030-inch particle size reduction setting FIG. 20 is a microscope photo depicting an enlarged sixth batch of as-extruded pellets and smaller more finely sized "fines" produced from or during extrusion and/or during transport immediately after extrusion but before performing non-compression induced particle size reduction; and FIG. 21 is a second microscope photo enlarged to show the sixth batch after all of the as-extruded pellets and smaller fines of the sixth batch of FIG. 20 have been particle size reduced using non-compression induced particle size reduction in accordance with the present invention with a non-compression induced particle size reduction machine that preferably is the the LePage corrugated roller equipped particle size reduction machine schematically depicted in FIG. 2 having a 0.030-inch particle size reduction setting.

Before explaining one or more embodiments of the invention in detail, it is to be understood that the invention is not limited in its application to the details of construction and the arrangement of the components set forth in the following description or illustrated in any appended drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIG. 1 illustrates a preferred but exemplary embodiment of a system 20 for producing extruded granular sorbent in accordance with the invention that employs an extruder 22 which gelatinizes starch in a starch-containing admixture delivered into the extruder 22 from an admixture-holding container 24, e.g., a hopper or bin 26, and extrudes the gelatinized starch-containing admixture from the extruder 22 in the form of at least a plurality of pairs of, i.e., at least three, pellets 28a of granular sorbent extrudate per second of extruder operation that are processed after extrusion using a cold-processing arrangement 32 and method of the present invention that cools, dries and thereafter processes the cooled and dried extruded pellets 28a in a manner that changes at least one characteristic or property of the pellets 28a in preparation for granular sorbent use. The cold-processing arrangement 32 includes a cooling and drying subsystem 34 that is configured to cold-process the extruded pellets 28a by at least one of cooling and drying the pellets 28a, and a granular sorbent processing subsystem 36 that post-extrusion processes the cooled and/or dried pellets 28a in a manner that changes and/or preferably improves at least one characteristic or property of the pellets 28a while maintaining the pellets 28a in a cold-processed condition during processing.

The granular sorbent pellets 28a are therefore cold-processed upon extrusion from the extruder 22 by at least cooling the pellets 28a and preferably also by drying the pellets 28a immediately upon extrusion using such a cold-processing arrangement 32 to thereby advantageously preserve and preferably substantially freeze at least one of the state, structure, phase and/or matrix of one or more of the starches in the pellets 28a modified by or during extrusion of the starch-containing admixture from the extruder 22 producing pellets 28a of extruded granular sorbent 30 of the present invention that better maintain(s) their starch state(s), starch structure(s), starch phase(s), starch matrix, liquid absorbent properties and/or solubility of starch in the pellets 28a during granular sorbent use. Not only does cold-processing of the pellets 28a, beginning the instant the pellets are extruded out of the die 42 of the extruder 22, preserve and preferably substantially freeze the state, structure, phase and/or matrix of the extruder-modified starches in the pellets 28a, including by preventing rapid phase retrogradation of starch, including water soluble binder, in the pellets 28a, cold-processing of the pellets 28a also advantageously prevents post-extrusion shrinkage of the pellets 28a that otherwise would typically occur immediately upon extrusion from the die 42 of the extruder 22. Such cold-processing of the pellets 28a immediately upon extrusion further advantageously enables post-extrusion processing to be carried out by the post-extrusion granular sorbent pellet processing subsystem 36 on the cooled and/or dried pellets 28a in a manner that changes and which preferably improves at least one characteristic or property of the pellets 28a during or as a result of post-extrusion processing while maintaining the pellets 28a substantially in the cold-processed condition during post-extrusion pellet processing.

With continued reference to FIG. 1, the extruded granular sorbent 30 production system 20 has at least one extruder 22 that preferably is a single-screw food-type, snack-type or extrusion-cooker extrusion machine 38, e.g., single-screw extruder 38, which employs a rotary screw drive motor (not shown) having a horsepower rating of at least twenty (20) horsepower and preferably no greater than two-hundred (200) horsepower, preferably between forty (40) and one-hundred fifty (150) horsepower, and more preferably between fifty (50) and one-hundred (100) horsepower, which drives a single generally horizontal elongate screw or auger received inside an elongate horizontally oriented generally cylindrical chamber of a barrel of the single-screw extruder 38 that can be heated and form part of or be disposed within an elongate generally horizontally extending extruder housing 40. The extruder 22 has a generally circular die 42 disposed at a discharge end 44 of the extruder that has at least one and preferably at least a plurality of annular rings or arrays of die through-holes (not shown) formed therein with each ring or array having at least a plurality of pairs of, i.e., at least three, die through-holes (not shown) each with a length, depth, diameter, throat and/or other die hole configuration suitable for discharging or expelling extrudate, e.g., ropes of starch-containing granular sorbent extrudate extruded from a starch-containing admixture, therethrough during extruder operation used to form extruded starch-containing pellets 28a having a desired width or diameter preferably falling within an acceptable range of widths or diameters suitable for the intended granular sorbent use or application. As the ropes of granular sorbent extrudate are expelled or discharged under pressure through the holes in the extruder die 42, a rotating cutter (not shown) equipped with at least a plurality, preferably at least a plurality of pairs of, i.e., at least three, cutter arms (not shown) each carrying a replaceable knife or blade is rotated by an electric motor at a rotational speed of at least 2,500 revolutions per minute (RPM), preferably at least 3,500 RPM, and more preferably at least 4,000 RPM to cut the granular sorbent extrudate ropes being discharged from or expelled out the holes of the die 42 into discrete pellets 28a that are elongate, preferably oblong, and which have a desired pellet length that preferably falls within an acceptable range of lengths suitable for the intended granular sorbent use of the pellets 28a. Each one of the extruded pellets 28a is not only elongate but can be oblong, e.g. generally oval, and preferably irregularly shaped, e.g., having one or more lobes, fibrils, fingers, or other outwardly extending projections, having a porous outer surface with at least a plurality of spaced apart pores, holes, or recesses formed in the pellet outer surface, and having a void filled pellet interior that includes at least a plurality, preferably at least a plurality of pairs of, i.e. at least three, internal voids within the pellet 28a preferably forming a void-filled internal starch pellet matrix. Although also not shown in FIG. 1, the rotary pellet cutter is received in a knife cage 46 that houses the cutter and also forms a pellet-collecting enclosure 48, e.g., pellet collector 48, disposed at the discharge end 44 of the extruder 22, e.g., discharge end 44 of single-screw extruder 38, which also encloses the extruder die 42 such that the pellets 28a cut by the cutter from the extrudate expelled or discharged out the holes of the die 42 during extruder operation are expelled or discharged into a chamber 50 defined within cage 46 or pellet-collecting enclosure 48.

An extruded granular sorbent production system 20 in accordance with the present invention can employ the extruded granular sorbent extruding methods and/or equipment, use the starch-containing admixture formulations, and/or blend the resultant pellets 28a of extruded granular sorbent 30 in accordance with those disclosed or otherwise described in commonly owned U.S. application Ser. Nos. 13/842,534, 13/868,073, 13/868,084, 14/426,483, 14/605,045, 14/656,086, 14/656,692, and 14/668,975, respectively published as U.S. Patent Application Publication Nos. US20140069344, US20140069345, US20140069346, US20150238931, US20150145164, US20150181832, US20150181834, and US20150196005 including to produce extruded granular sorbent pellets 28a, including that which is well suited for use as cat, dog, pet or animal litter such that each of U.S. Patent Application Publication Nos. US20140069344, US20140069345, US20140069346, US20150238931, US20150145164, US20150181832, US20150181834, and US20150196005 are hereby expressly incorporated herein by reference. In addition, it is also contemplated that select portions of the extruded granular sorbent production method and extruded granular sorbent production system 20 can be incorporated into and/or used with the extruded granular sorbent 30 and/or litter making methods, systems, production lines, equipment and/or extruders disclosed in one or more of U.S. Patent Application Publication Nos. US20140069344, US20140069345, US20140069346, US20150238931, US20150145164, US20150181832, US20150181834, and/or US20150196005, in accordance with the present invention including with respect to implementation and/or carrying out the present invention. More specifically, it is contemplated that portions of the extruded granular sorbent production method and extruded granular sorbent production system 20 that can be incorporated into or used with the extruded granular sorbent and/or litter making methods, systems, production lines, equipment and/or extruders disclosed in one or more of U.S. Patent Application Publication Nos. US20140069344, US20140069345, US20140069346, US20150238931, US20150145164, US20150181832, US20150181834, and/or US20150196005 include at least those method steps and/or system components, e.g. equipment, responsible for cold-processing of the extruded pellets 28a upon or after extrusion, including the cold-processing arrangement 32, preferably at least the cooling and drying subsystem 34 thereof, and/or that which relates to post-extrusion processing of the pellets including post-extrusion granular sorbent, e.g., pellet 28a, processing subsystem 36, which includes related equipment, including one or more of the post-extrusion processing devices, machines and/or mills disclosed and or shown elsewhere herein.

An improved presently preferred extruded granular sorbent production method of the present invention employs an improved extruded granular sorbent production system 20 that uses an ultrahigh pressure extrusion method carried out with an ultrahigh pressure extrusion system 25 where the extruder 22 preferably is a single-screw extruder 38 that subjects starch in the starch-containing admixture to an extrusion temperature of at least 100 degrees Celsius and to an ultrahigh extrusion pressure of at least 2000 pounds per square inch that is an extrusion pressure high enough to physically modify starch in the admixture into forming at least a plurality of different types of physically modified starches producing ultrahigh pressure extruded granular sorbent 30, such as in the form of ultrahigh pressure extruded granular sorbent pellets 28a, extruded from the extruder 22 that is composed of the at least plurality of different types of physically modified starches with at least one of the physically modified starches improving extruded granular sorbent 30 performance and at least another one of the physically modified starches imparting a beneficial property of agglutinating when wetted with water, urine, liquid fecal matter, an aqueous solution, or another type of aqueous liquid composed at least in part of water. In a preferred method and embodiment, ultrahigh pressure extruded granular sorbent 30 in accordance with the present invention has a still another or third type of physically modified starch that is a water-insoluble aliphatic, hydrocarbon or petroleum liquid sorbent starch produced during ultrahigh pressure extrusion that is a water insoluble starch which advantageously facilitates sorption of aliphatic, hydrocarbon and petroleum-based liquids enabling such an ultrahigh pressure extruded granular sorbent 30 to pick up and retain at least one time its weight of an aliphatic, hydrocarbon and petroleum-based liquid, preferably at least two times its weight of an aliphatic, hydrocarbon and petroleum-based liquid, and more preferably at least three times its weight of an aliphatic, hydrocarbon and petroleum-based liquid.

When wetted with water, such ultrahigh extrusion pressure extruded granular sorbent 30 contains enough room temperature cold water soluble amylopectin binder throughout, including along and forming part of its outer porous surface, to cause the binder to flow when wetted with water producing a flowable adhesive that flows therefrom, in between and around it and any other adjacent granules, particles and the like in forming such a wetted agglutinated mass. When wetted with water and forms such a moist agglutinated mass, the ultrahigh pressure extruded granular sorbent 30 undergoes one-shot rapid retrograding agglutination as the agglutination process is irreversible in that the extruded granular sorbent 30 cannot be reused when it dries.

Where the extruded granular sorbent 30 is formed into smaller sized components, such as pellets, such as by cutting the extruded granular sorbent 30 into pellets upon or after extrusion, wetting of ultrahigh extrusion pressure extruded granular sorbent pellets 28a with water, urine, liquid fecal matter or another aqueous liquid, causes room temperature cold water soluble amylopectin binder in the pellets to become a flowable adhesive that flows from wetted pellets around and in between them, adjacent pellets as well as any other non-extruded particles, granules, etc. where part of a blended extruded granular sorbent product, agglutinating them together into an agglutinated mass. In addition to such ultrahigh extrusion pressure extruded granular sorbent 30 of the present invention being of self-agglutinating composition by forming such an agglutinated mass when wetted with water, the agglutinated mass forms a rock-hard clump as it dries that has a clump crush or compression strength of at least 300 pounds per square inch, preferably at least 400 pounds per square inch, and more preferably at least 500 pounds per square inch when dried to a steady state moisture content that preferably is no greater than 12% by weight of the dried clump. When the ultrahigh pressure extruded granular sorbent 30 is wetted with water and forms such a moist agglutinated mass that dries into such a rock-hard clump, the wetted extruded granular sorbent 30 undergoes one-shot rapid retrogradation when wetted that is irreversible thereby forming a rock-hard clump when it dries that will not absorb water again.

In one preferred method and embodiment, a starch-containing admixture composed of at least 40% starch by admixture weight having a low moisture content no greater than 25% by admixture weight is extruded from an extruder 22 that preferably is a single-screw extruder 38 under an ultrahigh pressure of at least 2000 pounds per square inch, preferably at least 2500 pounds per square inch, more preferably at least 3000 pounds per square inch with the admixture moisture content low enough, preferably no greater than 25%, and the ultrahigh extrusion pressure high enough, preferably greater than 2000 pounds per square inch, more preferably at least 2500 pounds per square inch, even more preferably at least 3000 pounds per square inch, to form at least 5% room temperature cold water soluble physically-modified amylopectin binder in the ultrahigh extrusion pressure extruded granular sorbent 30, e.g., pellets 28a, extruded from the extruder 22 by extruded granular sorbent weight. Where the extruder is a single-screw extruder 38 that is used to carry out ultrahigh pressure extrusion of extruded granular sorbent 30 in accordance with the present invention, no moisture, such as in the form of water or steam, is added to the admixture while in the extruder 22 to maintain such a low moisture content of less than 25% by admixture weight. Where the extruder 22 is a single screw extruder 38, the admixture is subjected to such an ultrahigh extrusion pressure of at least 2000 pounds per square inch, and preferably at least 2500 pounds per square inch, within the extruder 22 for a residency time of no greater than twenty seconds, preferably no greater than eighteen seconds, before being extruded from the extruder 22 in the form of extruded granular sorbent 30. No moisture, such as in the form of water or steam is added to the admixture while in the extruder 22 to maintain such a low moisture content of less than 25% by admixture weight. Such extruded granular sorbent 30 has a sufficient amount of room temperature cold water soluble physically-modified amylopectin binder to cause water-wetted extruded granular sorbent 30 to self-agglutinate substantially instantaneously forming agglutinated masses within five seconds of being wetted with water that are readily scoopable from a box of the extruded granular sorbent 30 within one minute of being wetted and which form clumps when dried to a moisture content of no greater than 12% by dried clump weight that possess a crush or compressive strength of at least 400 pounds per square inch.

In one such preferred method and embodiment, the starch-containing admixture is composed of one or more starch-containing cereal grains having enough starch to produce an admixture containing at least 40% starch, preferably at least 50% starch, by weight of the admixture at a moisture content of no greater than 25% that is extruded from the extruder an ultrahigh pressure of at least 2000 pounds per square inch, preferably at least 2500 pounds per square inch, more preferably at least 3000 pounds per square inch producing extruded granular sorbent 30, e.g., pellets 28a, discharged from the extruder 22 containing at least 5%, preferably at least 7.5%, and more preferably at least 10%, room temperature cold water soluble physically-modified amylopectin binder by extruded granular sorbent weight. Where the extruder 22 is a single-screw extruder 38, the admixture is subjected to such an ultrahigh extrusion pressure within the extruder 38 for a residency time of at least eight seconds and no longer than twenty seconds ensuring that the starch within the admixture is physically modified sufficiently to cause at least a plurality of different types of physically modified starches to form within the extruder 22 with at least one of the physically modified starches being room temperature cold water soluble amylopectin binder and at least one other of the physically modified starches being an increased liquid sorbent physically modified starch that provides improved or increased water absorption and/or adsorption and which preferably also provides improved or increased absorption and/or adsorption of aliphatic, petroleum and/or hydrocarbon-based liquids, e.g., oil. No moisture, such as in the form of water or steam is added to the admixture while in the extruder 22 to maintain such a low moisture content of less than 25% by admixture weight. Such extruded granular sorbent 30 has a sufficient amount of room temperature cold water soluble physically-modified amylopectin binder to cause water-wetted extruded granular sorbent 30 to self-agglutinate substantially instantaneously forming agglutinated masses within five seconds of being wetted with water that are readily scoopable from a box of the extruded granular sorbent 30 within one minute of being wetted and which form clumps when dried to a moisture content of no greater than 12% by dried clump weight that possess a crush or compressive strength of at least 400 pounds per square inch.

In another such preferred method and embodiment, the admixture is composed at least 60%, preferably at least 70%, more preferably 75% sorghum, preferably whole grain sorghum, which can be decorticated sorghum, at a moisture content of no more than about 15% having enough starch to produce an admixture containing at least 40%, preferably at least 50%, starch by weight of the admixture at a moisture content of no greater than 15% that is extruded from the extruder an ultrahigh pressures of at least 2000 pounds per square inch, preferably at least 2500 pounds per square inch, more preferably at least 3000 pounds per square inch producing extruded granular sorbent 30 discharged from the extruder 22 containing at least 5%, preferably at least 7.5%, and more preferably at least 10%, room temperature cold water soluble physically-modified amylopectin binder by extruded granular sorbent weight. No moisture, such as in the form of water or steam is added to the admixture while in the extruder 22 to maintain such a low moisture content of less than 15% by admixture weight.

A preferred ultrahigh pressure extruded granular sorbent 30 of the present invention is composed of the at least plurality of physically modified starches with one of the physically modified starches being an enhanced liquid sorbent starch that produces ultrahigh pressure extruded granular sorbent 30 with a water sorption capacity of at least four times, preferably at least five times, the weight of the ultrahigh pressure extruded granular sorbent 30 but which also advantageously possesses a more rapid rate of sorption being able to pick up and retain at least one time its weight in water within at least fifteen seconds of being wetted with the water, at least two times its weight in water within at least twenty seconds of wetting, and at least four times its weight in water within at least thirty seconds of wetting forming a scoopable agglutinated mass with a clump retention rate of at least 90% within two minutes of wetting. Another one of the physically modified starches formed in the ultrahigh pressure extruded granular sorbent 30 is a room temperature cold water soluble binder that preferably is or includes a room temperature cold water soluble amylopectin binder with the pellets 28a each having a sufficient amount by pellet weight, preferably substantially uniformly distributed within its void-filled interior and along its porous outer surface, so as to at least partially solubilize when wetted into a flowable physically-modified starch adhesive that is or includes a flowable physically-modified amylopectin starch adhesive that flows from each one of a plurality wetted pellets 28a, along the wetted pellets 28a, between the wetted pellets 28a, and/or along or around one or more adjacent pellets 28a clumping them together via agglutination forming a wetted rubbery agglutinated mass having a putty-like feel that is composed of a least a plurality of pairs, i.e., at least three, pellets 28a, per cubic centimeter of the agglutinated mass. Ultrahigh pressure extruded granular sorbent 30 of the present invention preferably has at least 5% room temperature cold water soluble binder by weight that more preferably includes a room temperature cold water soluble amylopectin binder formed of amylopectin starch in the admixture whose molecular weight has been reduced by physical modification of the amylopectin starch in the admixture in the extruder 22 during extrusion due to mechanical interaction, e.g., grinding or cutting, with a rotating screw within the housing 40 of the extruder 22 and by application of an ultrahigh extrusion pressure greater than 2000 PSI, preferably greater than 2500 PSI. A preferred ultrahigh pressure extruded granular sorbent 30 of the present invention has at least 5% room temperature cold water soluble amylopectin binder by ultrahigh pressure extruded granular sorbent weight that is formed of such molecular weight reduced amylopectin whose molecules or polymers chains are reduced in size during physical starch modification in the extruder 22 during ultrahigh pressure extrusion to a molecular weight and/or polymer chain length about the same as that of amylose starch. A preferred ultrahigh pressure extruded granular sorbent 30 is composed of at least 5% room temperature cold water soluble physically modified starch binder that includes at least 1%, preferably includes at least 2%, room temperature cold water soluble amylopectin binder formed of physically modified amylopectin starch having a molecular weight distribution and/or polymer chain length distribution within ±25% of the molecular weight or polymer chain length of amylose.

When wetted with water, such ultrahigh extrusion pressure extruded granular sorbent 30 contains enough room temperature cold water soluble amylopectin binder throughout, including along and forming part of its outer porous surface, to cause the binder to flow when wetted with water producing a flowable adhesive that flows therefrom, in between and around it and any other adjacent granules, particles and the like in forming such a wetted agglutinated mass. Where the extruded granular sorbent 30 is formed into smaller sized components, such as pellets, such as by cutting the extruded granular sorbent 30 into pellets upon or after extrusion, wetting of ultrahigh extrusion pressure extruded granular sorbent pellets 28a with water, urine, liquid fecal matter or another aqueous liquid, causes room temperature cold water soluble amylopectin binder in the pellets to become a flowable adhesive that flows from wetted pellets around and in between them, adjacent pellets as well as any other non-extruded particles, granules, etc. where part of a blended extruded granular sorbent product, agglutinating them together into an agglutinated mass. In addition to such ultrahigh extrusion pressure extruded granular sorbent 30 of the present invention being of self-agglutinating composition by forming such an agglutinated mass when wetted with water, the agglutinated mass forms a rock-hard clump as it dries that has a clump crush or compression strength of at least 300 pounds per square inch, preferably at least 400 pounds per square inch, and more preferably at least 500 pounds per square inch when dried to a steady state moisture content that preferably is no greater than 12% by weight of the dried clump.

In a preferred ultrahigh pressure extrusion method and system 25 of the present invention, starch in the starch-containing admixture is physically modified by the extruder by subjecting starch in the starch-containing admixture to an ultrahigh extrusion pressure of at least 2000 PSI, preferably at least 2500 PSI, in an extruder 22 that preferably is a single screw extruder 38 where the residency time that the starch-containing admixture remains inside the extruder under ultrahigh extrusion pressure is no longer than twenty-five seconds before being discharged or extruded from the extruder as extruded granular sorbent 30. In a preferred embodiment, ultrahigh pressure extruded granular sorbent 30 is divided into smaller sized components, preferably pellets 28a, after extrusion which each have a sufficient amount of room temperature cold water soluble physically modified amylopectin starch binder, preferably at least 5% by pellet weight, for the extruded granular sorbent pellets 28a to agglutinate when wetted with water, and each have a sufficient amount of enhanced liquid sorbent starch, preferably at least 10% liquid sorbent starch by pellet weight, more preferably at least 25% by pellet weight, to absorb and/or absorb at least four times, preferably at least five times, the weight of extruded granular sorbent 30 in water during sorbent use. Such pellets 28a formed of ultrahigh pressure extruded granular sorbent 30 of the present invention preferably also have at least 5% by weight water insoluble aliphatic, petroleum or hydrocarbon liquid sorbent starch, preferably at least 10% by weight water insoluble aliphatic, petroleum or hydrocarbon liquid sorbent starch, and more preferably at least 15% by weight water insoluble aliphatic, petroleum or hydrocarbon liquid sorbent starch enabling such pellets 28a to pick up and retain at least one time its weight of an aliphatic, hydrocarbon and petroleum-based liquid, preferably at least two times its weight of an aliphatic, hydrocarbon and petroleum-based liquid, and more preferably at least three times its weight of an aliphatic, hydrocarbon and petroleum-based liquid. Residency time is the amount of time the admixture resides in the extruder and is subjected to pressure within the extruder as measured within the extruder at the die plate of the extruder before the admixture is extruded from the extruder as extruded granular sorbent 30 and formed into pellets 28a.

In one such preferred ultrahigh pressure extrusion method and system of the invention, a starch-containing admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is delivered from the hopper 26, such as via gravity feed, into the extruder 22, preferably single-screw extruder 38, where the admixture in the extruder is subjected to an ultrahigh extrusion pressure within the extruder, preferably measured at or adjacent the extruder discharge end 44 or at the die 42 during extrusion, of at least 2,000 pounds per square inch (PSI) or at least 13791 kilopascals (kPa), preferably of at least 2,500 PSI or of at least 17236 kPa, and more preferably of at least about 3,000 PSI±10% or of at least about 20684 kPa±10%, and an extrusion temperature within the extruder 22, preferably measured at or adjacent the extruder discharge end 44 or at the extruder die 42 during extrusion, of at least 100 degrees Celsius or of at least 212 degrees Fahrenheit, preferably of at least 120° C. or at least 248° F., and more preferably of at least about 135° C.±10° C. or of at least about 275° F.±18° F. such that at least some of the starch gelatinized in the extruder during extrusion is physically modified into room temperature water-soluble binder that preferably is or includes room temperature cold water soluble physically modified amylopectin starch binder in each extruded pellet 28a in an amount by pellet weight sufficient to cause at least a plurality of pairs, i.e., at least three, of the pellets 28a to self-clump together via agglutination forming an agglutinated mass composed of at least a plurality of pairs of the pellets 28a when wetted by water or urine, e.g., cat, dog, pet or other animal urine, making such pellets 28a suitable for use as granular sorbent litter, e.g., cat, pet or animal litter. In a preferred admixture and granular sorbent extrusion method, each one of the extruded pellets 28a preferably has enough water-soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

Where the extruder 22 of the ultrahigh pressure extruded granular sorbent extrusion system 25 is a single-screw extruder 38, no additional moisture or water is added to the admixture while in the extruder 22 during starch gelatinization and extrusion. In one preferred admixture, the at least at least 35% starch, preferably at least 40% starch, and more preferably at least 45% starch by dry admixture weight is provided from whole grain sorghum that can be a decorticated whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% sorghum by dry admixture weight with the entirety of such an admixture having a total moisture content of no greater than 18%, preferably no greater than 15%, and more preferably no greater than about 14%±1% by weight of the admixture. In such a preferred sorghum-based admixture and granular sorbent extrusion method, each one of the extruded pellets 28a preferably has enough water-soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

In a preferred ultrahigh pressure extrusion method and embodiment of system 25 employing a twin-screw extruder (not shown), no additional moisture or water also is added to the admixture while in the twin-screw extruder during starch gelatinization and extrusion In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. No additional moisture or water is added to the admixture while in the extruder 22 during starch gelatinization and pellet extrusion. In such a preferred corn-containing admixture and granular sorbent extrusion method, each one of the extruded pellets 28a preferably has enough room temperature water-soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

A scoopable clump is formed of such an agglutinated mass of such wetted pellets 28a within two minutes of the plurality of pairs of pellets 28a being wetted that can be readily scooped from other pellets 28a of extruded granular sorbent litter in a litter box and produces a hardened clump when the agglutinated mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%.

In a preferred extruded granular sorbent method and embodiment, such an admixture having at least admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is gelatinized in the extruder 22, preferably single-screw extruder 38, and subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically modified into forming at least 5% room-temperature water-soluble physically-modified starch-based binder, preferably least 5% physically modified starch-based cold water soluble carbohydrate polymer binder, and more preferably at least 5% room temperature cold water soluble physically modified amylopectin starch binder by pellet weight in each extruded pellet 28a, which functions as a water-soluble clumping agent that preferably is cold-water soluble clumping agent, which preferably is an amount great enough in each extruded granular sorbent pellet 28a to self-clump together at least a plurality of pairs of, i.e., at least three, pellets 28a, without the presence of any other clumping agent or binder, forming an agglutinated mass of the pellets 28a when the at least a plurality of pairs of the pellets 28a are wetted with water or urine. No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. No additional moisture or water is added to the admixture while in the extruder 22 during starch gelatinization and pellet extrusion. In such a preferred admixture and granular sorbent extrusion method, each one of the extruded pellets 28a preferably has enough room temperature water-soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith. A scoopable clump is formed of such an agglutinated mass of such wetted pellets 28a within two minutes of the plurality of pairs of pellets 28a being wetted that can be readily scooped from other pellets 28a of extruded granular sorbent litter in a litter box and produces a hardened clump when the agglutinated mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%.

In another preferred extruded granular sorbent method and embodiment, such an admixture having at least admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is gelatinized in the extruder 22, preferably single-screw extruder 38, and subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically into forming at least 7.5% room-temperature water-soluble physically-modified starch-based binder, preferably least 7.5% physically modified starch-based cold water soluble carbohydrate polymer binder, and more preferably at least 7.5% room temperature cold water soluble physically modified amylopectin starch binder in each extruded pellet 28a by pellet weight that functions as a water-soluble clumping agent that preferably is a cold water-soluble clumping agent that preferably is an amount great enough in each extruded granular sorbent pellet 28a to self-clump at least a plurality of pairs of pellets 28a, without the presence of any other clumping agent or binder, into an agglutinated mass of the pellets 28a when the at least a plurality of pairs of the pellets 28a are wetted with water or urine. No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. No additional moisture or water is added to the admixture while in the extruder 22 during starch gelatinization and pellet extrusion. A scoopable clump is formed of such an agglutinated mass of such wetted pellets 28a within two minutes of the plurality of pairs of pellets 28a being wetted that can be readily scooped from other pellets 28a of extruded granular sorbent litter in a litter box and which is an agglutinated mass of the pellets 28a that produces a hardened clump when the agglutinated pellet mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%. In such a preferred admixture and granular sorbent extrusion method, each one of the extruded pellets 28a preferably has enough physically-modified starch-based room temperature water soluble binder that preferably is or includes cold water soluble physically modified amylopectin starch binder such that at least some of the water-soluble binder forms a flowable adhesive when pellets 28a are wetted that flows from, around and in between each wetted pellet 28a and at least one other pellet 28a adjacent thereto, adjoining therewith, or in contact therewith.

In still another preferred extruded granular sorbent method and embodiment, such an admixture having at least admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is gelatinized in the extruder 22, preferably single-screw extruder 38, and subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically modified into forming at least 10% room-temperature water-soluble physically-modified starch-based binder, preferably least 10% physically modified starch-based cold water soluble carbohydrate polymer binder, and more preferably at least 10% room temperature cold water soluble physically modified amylopectin starch binder in each extruded pellet 28a by pellet weight that functions as a water-soluble clumping agent that preferably is an amount great enough in each extruded granular sorbent pellet 28a to self-clump at least a plurality of pairs of pellets 28a, without the presence of any other clumping agent or binder, into forming an agglutinated mass of the pellets 28a when the at least a plurality of pairs of the pellets 28a are wetted with water or urine. No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In such a preferred sorghum-containing admixture and granular sorbent extrusion method, each one of the extruded pellets 28a preferably has enough physically modified starch-based room temperature water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith. In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. In such a preferred cornmeal-containing admixture and granular sorbent extrusion method, each one of the extruded pellets 28a preferably has enough physically modified starch-based water soluble binder that at least some of the water-soluble binder forms a flowable adhesive when pellets 28a are wetted that flows from, around and in between each wetted pellet 28a and at least one other pellet 28a, preferably at least a plurality of other pellets 28a, disposed adjacent thereto, adjoining therewith, or in contact therewith. No additional moisture or water is added to the admixture while in the extruder 22 during starch gelatinization and pellet extrusion. A scoopable clump is formed of such an agglutinated mass of such wetted pellets 28a within two minutes of the plurality of pairs of pellets 28a being wetted that is scoopable from other surrounding unwetted pellets 28a of extruded granular sorbent litter in a litter box and which is an agglutinated mass of the pellets 28a that produces a hardened clump of the pellets 28a when the agglutinated pellet mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%.

As a result of extruding such ultrahigh pressure extruded granular sorbent 30 in accordance with the present invention at such an ultrahigh extrusion pressure of at least 2000 pounds per square inch, preferably at least 2,500 pounds per square inch at an extrusion temperature of at least 100° Celsius from such a starch-containing admixture at such a low moisture content of preferably no more than 25% by admixture weight and without introducing any moisture to the admixture during extrusion in accordance with the above, an ultrahigh pressure extruded granular sorbent 30 of the present invention is advantageously shelf stable at room temperature in that it will not retrograde at room temperature. Such an ultrahigh pressure extruded granular sorbent 30 advantageously is retrograde-proof after extrusion upon reaching room temperature so long as the ultrahigh pressure extruded granular sorbent 30 is not wetted with water after extrusion and is not dried with heat after extrusion. In a preferred post-extrusion processing method in accordance with the present invention, no water nor heat is applied to the ultrahigh pressure extruded granular sorbent 30 upon and after extrusion with the ultrahigh pressure extruded granular sorbent 30 reaching room temperature without any application of heat to dry it nor any application of water for that matter. Post-extrusion processing of the ultrahigh pressure extruded granular sorbent 30 without application of heat or water advantageously preserves the state of the at least plurality, preferably at least a plurality of pairs, i.e. at least three, of different types of physically modified starches in the ultrahigh pressure extruded granular sorbent 30 in a manner that retrograde-proofs the ultrahigh pressure extruded granular sorbent 30. This holds true even where the ultrahigh pressure extruded granular sorbent 30 is divided into pellets 28a, such as immediately upon discharge from the extruder 22, as well as during any post-extrusion processing like the particle size reduction post-extrusion processing discussed in more detail below.

Ultrahigh pressure extruded granular sorbent 30 also advantageously has a void filled internal honeycomb sorption-capacity increasing starch matrix or structure that advantageously remains intact when post-extrusion application of water and heat are avoided. Ultrahigh pressure extruded granular sorbent 30 further advantageously has a porous outer surface with each ultrahigh pressure extruded granular sorbent pellet 28a having at least a plurality of pairs, i.e. at least three, of pores, openings or depressions formed therein during extrusion from the extruder 22 which help facilitate liquid sorption by helping to wick liquid therethrough and into voids within the internal honeycomb starch matrix or structure of the pellet interior. Such ultrahigh pressure extruded granular sorbent 30 still further advantageously is formed of water-soluble starches preferably formed via physical modification during the ultrahigh pressure extrusion process that are not sticky nor function as a binder but which are distributed throughout each ultrahigh pressure extruded granular sorbent pellet 28a that solubilize or dissolve when wetted with water during sorbent use helping to facilitate the more rapid pick up of the water. As a result of the post-extrusion process of the present invention avoiding application of heat and water from when the ultrahigh pressure extruded granular sorbent 30 is extruded from the extruder up until the ultrahigh pressure extruded granular sorbent 30 reaches room temperature thereby becoming retrograde proof, this process also advantageously preserves the voids formed within the interior of each ultrahigh pressure extruded granular sorbent pellet, preserves the pores formed in the outer surface of each ultrahigh pressure extruded granular sorbent 30, and preserves the water-soluble physically modified sorption enhancing starches distributed throughout the honeycomb starch matrix of each ultrahigh pressure extruded granular sorbent pellet 28a advantageously optimizing sorbent performance.

This contrasts with past attempts at extruding granular sorbent known in the art, including at lower extrusion pressures, as it is now understood from practicing the present invention that excess water or moisture in the admixture causes the prior art extruded granular sorbent to retrograde relatively rapidly beginning upon extrusion, and post-extrusion heating of the prior art extruded granular sorbent done to dry it more rapidly accelerates retrogradation. Where the prior art extruded granular sorbent is extruded with such excess moisture, it is not retrograde-proof as retrogradation of the prior art extruded granular sorbent begins almost immediately upon extrusion from the extruder. This not only adversely reduces liquid sorption of the prior art extruded granular sorbent, but it typically also ensures it will not be able to clump when wetted with water without the addition of a separate clumping agent additive. Where the prior art extruded granular sorbent is heated to dry it, retrogradation is detrimentally accelerated adversely reducing water sorption capacity even more and typically requiring application of the clumping agent additive after heated drying in order for it to clump when wetted with water. In addition, excess water in the prior art extruded granular sorbent is disadvantageous by preventing formation of internal voids and external pores in the prior art extruded granular sorbent typically causing an imperforate skin to form that interferes with sorption of water. Application of heat to dry such prior art extruded granular sorbent also is disadvantageous in that it typically shrinks or densifies the prior art extruded granular sorbent further adversely reducing sorption while also making it more difficult to control density of any final granular sorbent product blended or otherwise mixed therewith.

In the past, such prior art extruded granular sorbent has been ground or otherwise comminuted using a high-energy comminuting hammer mill in order to break apart the prior art extruded granular sorbent pellets to improve water sorption. Unfortunately, doing so further adversely impacts the prior art extruded granular sorbent pellets at a molecular level by changing their starch structures at a molecular level in a manner that reduces water sorption capacity sometimes to an extent that almost defeats the purpose of hammer milling. Where such hammer milling is done before heated pellet drying, the plasticity of the still moist pellets that pass through the hammer mill often times does not grind them but rather compacts or crushes them which detrimentally reduces water sorption capacity. Where such hammer milling is done before heated pellet drying, heating the hammer milled pellets prior to heated drying of the pellets also detrimentally changes the starch structures of the hammer milled pellets in a manner that also detrimentally reduces water sorption. As a result, such prior art extruded granular sorbent, including when formed into pellets, typically has poor water sorption capacity and does not agglutinate or even clump without the addition of a separate cost-increasing clumping agent additive.

As discussed in more detail below and depicted in FIG. 1, a preferred but exemplary embodiment of a system 20 for producing extruded granular sorbent 30 employs a post-extrusion cold-processing method and arrangement 32 for drying without heating the extruded granular sorbent 30, e.g., pellets 28a, extruded by the extruder 22 of the extruded granular sorbent production system 20. Such a cold-processing method and arrangement 32 preferably is particularly well suited for use with an extruded granular sorbent production system 20 equipped with an ultrahigh pressure extrusion system 25 of the present invention as it has a cooling and drying subsystem 34 downstream of the extruder 22 that performs post-extrusion cold processing of the ultrahigh pressure extruded granular sorbent 30, e.g., ultrahigh pressure extruded granular sorbent pellets 28a, discharged from the extruder 22. In such a cold-processing method and arrangement 32, both drying and cooling of the ultrahigh pressure extruded granular sorbent pellets 28a is performed immediately upon extrusion from the extruder 22 in a manner that preserves the structure of starches physically modified by or during ultrahigh pressure extrusion enabling the pellets 28a to ultimately reach a stable retrogradation-proof room temperature without ever having been heated or otherwise causing pellet temperatures increase following extrusion.

The cooling and drying subsystem 34 of the pellet cold-processing arrangement 32 of the extruded granular sorbent production system 20 of the present invention includes a pellet cooling air blower 52 in fluid-flow communication via an extruded pellet coolant gas conveying duct 54 with the chamber 50 of the pellet collector 48, e.g., pellet-collecting enclosure 48 that supplies gaseous coolant, preferably cooling air, at a temperature of at least 100° F. less or at least 37° C. than the temperature of the pellets 28a exiting the extruder die 42 during operation of the extruder 22 during pellet extrusion. The pellet cooling air blower 52 preferably is a centrifugal fan or squirrel cage blower that draws in ambient air at a temperature no higher than 100° F. or no higher than 37° C., preferably no higher than 90° F. or no higher than 32° C., and more preferably no higher than 80° F. or no higher than 26° F. at a volumetric flow rate high enough to relatively rapidly transport the as-extruded pellets 28a immediately upon extrusion from the extruder die 42 via a pellet conveying duct 56 of a pneumatic pellet conveyor 58 to a post-extrusion pellet processing device 60 of the post-extrusion granular sorbent pellet processing subsystem 36 while also rapidly cooling and preferably also drying the pellets 28a during pneumatic conveyor transport. In a preferred pellet cold-processing method and cooling and drying subsystem 34 of the pellet cold-processing arrangement 32 of the present invention, the blower 52 turbulently conveys ambient air externally, e.g., outside, of the extruder 22 and chamber 50 through the coolant duct 54 to the chamber 50 which is or functions as a pellet cooling chamber 50 at a high enough volumetric flow rate to cold process the pellets 28a and cool the pellets 28a immediately upon extrusion from the extruder die 42 at a pellet coolant rate of at least 10 degrees Fahrenheit or at least 5 degrees Celsius, preferably at least 15 degrees Fahrenheit or at least 7 degrees Celsius, and more preferably at least 20 degrees Fahrenheit or at least 10 degrees Celsius per second of time, for at least one second and preferably for at least two seconds, after extrusion of transport of the extruded pellets 28a from the extruder die 42 through the pellet cooling chamber 50 and into the pellet conveying duct 56 of the pneumatic pellet conveyor 58 while maintaining a post-extrusion pellet moisture content of the pellets 28a to less than 14%, preferably less than 12%, and more preferably less than about 10%±1% by pellet weight. In a preferred pellet cold-processing method and embodiment, the blower 52 conveys ambient air at a temperature no higher than 100° F. or no higher than 37° C., preferably no higher than 90° F. or no higher than 32° C., and more preferably no higher than 80° F. or no higher than 26° F. through the pellet coolant duct to the pellet cooling chamber 50 at a volumetric flow rate of at least 250 cubic feet per minute (CFM) or at least 7 cubic meters per minute (CMM), preferably at least 500 CFM or at least 14 CMM, and more preferably at least 800 CFM or at least 22 CMM, that convectively cools the pellets via turbulent convective cooling at such an aforementioned cooling rate immediately upon pellet extrusion to preserve the state of the starches in the pellets 28a modified by or during extrusion.

In a preferred embodiment, pellet cooling ambient air delivered at such temperatures and volumetric flow rates into the pellet cooling chamber 50 of the pellet collecting enclosure 48, which also serves as the knife cage 46, substantially completely freezes the state and structure of the modified starches in the pellets 28a immediately upon being extruded from the holes in the die 42 of the extruder 22 in a cold-processing method in accordance with the present invention that thereafter advantageously preserves or maintains the state and structure of the modified starches of the pellets 28a including during and preferably after post-extrusion processing of the pellets 28a by the pellet processing device 60 of the pellet processing subsystem 36. In such a preferred embodiment, the cooling and drying subsystem 34 of the pellet cold-processing arrangement 32 delivers pellet coolant air at one or more such aforementioned low temperatures and volumetric flow rates into the pellet cooling chamber 50 such that quenching of the pellets 28a occurs after extrusion of the pellets 28a from the holes of the die 42 of the extruder 22 while the pellets 28a reside in the chamber 50 substantially completely freezing the state and/or structure of the starches in the pellets 28a physically modified during starch gelatinization and/or extrusion by the extruder 22. Such rapid cooling and preferably quenching of the pellets 28a occurs immediately upon being expelled or discharged from the die 42 of the extruder 22 while in the pellet cooling chamber 50, e.g. pellet quenching chamber 50, such that the physically modified starch-based water-soluble binder, including any cold water soluble physically modified amylopectin soluble binder, formed in each pellet 28a from starch physically modified during starch gelatinization and/or extrusion is substantially completely preserved maximizing the amount of physically modified starch-based water-soluble binder, including any cold water soluble physically modified amylopectin starch binder, available in each extruded pellet 28a to serve as physically modified starch-based room temperature water-soluble binder pellet clumping agent that preferably is or includes cold water soluble physically modified amylopectin starch binder to clump together wetted pellets 28a during granular sorbent use, e.g. during use as litter.

In such a preferred method and embodiment, the pellet cooling chamber 50, e.g., pellet quenching chamber 50, is substantially airtight with the enclosure 48 provided by the knife cage 46 being of substantially gas tight construction. Where of gas tight or airtight construction, the walls that form the knife cage 46 and/or chamber 50 preferably are of imperforate or substantially imperforate construction.

Such a pellet cold-processing arrangement 32, including its pellet cooling and drying subsystem 34, can be constructed, arranged, and/or configured in accordance with one or both of the granular sorbent system and method for treating or processing granular sorbent during granular sorbent transport described and shown in commonly owned U.S. application Ser. No. 14/605,045 and published as U.S. Patent Application Publication No. US 20150145164 A1 and the quenched granular sorbent system and method for making quenched granular sorbent described and shown in commonly owned U.S. application Ser. No. 15/114,069 and published as U.S. Patent Application Publication No. US 20160346981 A1, the entirety of each of which is hereby expressly incorporated herein by reference.

In a preferred method and embodiment of the present invention, such cold-processing of the pellets 28a occurs from immediately upon pellet extrusion all the way until the pellets 28a are conveyed via the pellet conveying duct 56 of the pneumatic pellet conveyor 58 by the pellet coolant air to the pellet processing device 60 of the pellet processing subsystem 36 substantially continuously cooling and drying the pellets 28a the entire way until the pellets 28a reach the pellet processing device 60. Not only does such cold-processing of the pellets 28a substantially completely freeze, preserve and/or maintain the extruder-modified starches, including the water-soluble binder, in each extruded pellet 28a from the instant each pellet 28a is extruded from the extruder into the pellet cooling chamber 50, e.g. pellet quenching chamber 50, but the cooling and drying of each pellet 28a from the time of extrusion until being post-extrusion processed, including by pellet processing device 60, helps preserve and maintain these extruder-modified starches, including the water-soluble binder, present in each pellet 28a during such post-extrusion processing, including by the pellet processing device 60.

In use and operation of the cold processing arrangement 32, including its cooling and drying subsystem 34, each one of the pellets 28a is not only cooled from the time the pellet 28a is extruded from the extruder 22 but each one of the pellets 28a also is dried from the time the pellet is extruded from the extruder 22. As previously discussed, each one of the pellets 28a is both cooled and dried substantially continuously from the time of pellet extrusion preferably until being post-extrusion processed, e.g., by post-extrusion pellet processing device 60, of the post-extrusion pellet processing subsystem 36 preferably by the pellet cooling air that cools and dries the extruded pellets 28a while being conveyed by the airstream of pellet cooling air via the pellet conveying duct of the pneumatic conveyor to the point where post-extrusion pellet processing begins or takes place.

In implementing the cold-processing embodiment and carrying out the cold-processing method, drying of the pellets 28a takes place from the time of extrusion all the way until post-extrusion pellet processing without applying any heat to the pellets 28a and without heating, e.g. heating by external means, the stream of pellet cooling air conveying the pellets 28a to the post-extrusion pellet processing subsystem 36 with each cooled and dried pellet 28a preferably having a moisture content of no greater than about 12%±2% when entering the post-extrusion pellet processing subsystem 36 and/or being post-extrusion pellet processed by the subsystem 36, e.g. by pellet processing device 60. As a result of cold-processing each extruded pellet 28a upon and after extrusion and preferably up until reaching the post-extrusion pellet processing subsystem 36, any changes to the state, structure, phase and/or matrix of starches present in the pellets 28a during post-extrusion processing are minimized and preferably substantially completely prevented.

As discussed in more detail below, any post-extrusion processing of the pellets 28a in the post-extrusion pellet processing subsystem 36, including by post-extrusion pellet processing device 60, preferably is carried out while maintaining the pellets 28a undergoing post-extrusion processing in a substantially cold-processed condition where the temperature of the pellets 28a immediately after post-extrusion processing is within ±5° F. or within ±2° C. to thereby help preserve the state, structure, phase and/or matrix of the extruder-modified starches, including the physically modified starch-based water soluble binder, including any cold water soluble physically modified amylopectin starch binder, in the post-extrusion processed pellets 28a. In a preferred post-extrusion processing method and implementation in accordance with the present invention, performing post-extrusion pellet processing of the extruded pellets 28a while maintaining the pellet substantially in their cold processed condition advantageously maximizes the amount of physically modified starch-based water soluble binder, including any cold water soluble physically modified amylopectin starch binder, present or which remains present in the post-extrusion processed pellets 28a after post-extrusion processing is completed.

With continued reference to FIG. 1, post-extrusion processing of each cold-processed extruded pellet 28a is carried out by the post-extrusion pellet processing subsystem 36, e.g., by post-extrusion pellet processing device 60, in a manner that minimizes and preferably substantially completely prevents compressing or crushing of the pellets 28a during undergoing post-extrusion pellet processing in the subsystem 36 thereby advantageously minimizing and preferably substantially completely preventing any change in the state, structure, phase and/or matrix of starches, including the extruder-modified starches, present in the pellets 28a due to physical contact and/or mechanical interaction, including any mechanical engagement, with any of the pellets 28a during or as a result of post-extrusion pellet processing. Such post-extrusion processing of each cold-processed extruded pellet 28a preferably also is carried out by the post-extrusion pellet processing subsystem 36, e.g., by pellet processing device 60, without application of any heat from any heat source, e.g., heat-generation source, electrical heating element(s), air heater, or the like, prior to, during or after post-extrusion pellet processing of the pellets 28a in the post-extrusion pellet processing subsystem 36, e.g. by pellet processing device 60, thereby advantageously minimizing and preferably substantially completely preventing any change in the state, structure, phase and/or matrix of starches, including the extruder-modified starches, present in the pellets 28a during or as a result of post-extrusion pellet processing. Such post-extrusion processing of each cold-processed extruded pellet 28a preferably is further carried out by the post-extrusion pellet processing subsystem 36, e.g., by pellet processing device 60, in a manner that minimizes and which preferably substantially completely prevents generation or conduction of heat in or to any of the as-extruded pellets 28a undergoing post-extrusion pellet processing in the post-extrusion pellet processing system 36, e.g. by pellet processing device 60, thereby advantageously further minimizing and preferably substantially completely preventing any change in the state, structure, phase and/or matrix of starches, including the extruder-modified starches, present in the pellets 28a during or as a result of post-extrusion pellet processing.

With continued reference to FIG. 1, a preferred embodiment of a post-extrusion pellet processing subsystem 36 of the present invention employs a post-extrusion pellet processing device 60 that is a post-extrusion mechanical-engagement pellet processing device 62 that comminutes the as-extruded pellets 28a arriving in a cold-processed condition in accordance with that disclosed above with the pellets 28a preferably delivered in such a cold-processed processed condition to the device 60 where the pellets 28a have a pellet temperature that is at least 65° F. less or at least 35° C. less, preferably at least 75° F. less or at least 40° C. less, and more preferably at least 90° F. less or at least 70° C. less than the temperature of the pellets 28a upon extrusion from the extruder die 42, i.e., pellet extrusion temperature, and a pellet moisture content of no greater than about 12%±2% of pellet weight. When the extruded pellets 28a arrive at the pellet processing device 60 in such a cold-processed condition ready for post-extrusion mechanical-engagement pellet processing, e.g., post-extrusion pellet comminution, each pellet 28a preferably has a temperature no greater than 145° F. or no greater than 63° C., preferably no greater than 130° F. or no greater than 55° C., and more preferably no greater than about 120° F.±5° F. or no greater than about 50° C.±2.5° C. and has a moisture content no greater than about 10%±1% of pellet weight.

A preferred post-extrusion mechanical-engagement pellet processing device 62 well suited for mechanical-engagement pellet processing via pellet comminution is the pellet comminution machine 64 schematically depicted in FIG. 1 that can be a slicing or cutting pellet processing machine used to form generally longitudinal and/or transverse cuts or slits in the outer surface of the as-extruded pellets 28a during mechanical-engagement comminution-type pellet processing, but which more preferably is a comminution mill 66, such as a jet mill, cone mill, or vibration mill, constructed and arranged and/or otherwise configured to mechanically engage the as-extruded pellets 28a in the cold processed condition as the pellets 28a enter the device 64 or mill 66 in a manner that abrades the pellets 28a, removes at least a portion of an outer surface or skin of one or more of the pellets 28a, shears or tears open one or more of the pellets 28a exposing at least a portion of the pellet interior(s), e.g. inner void-filled pellet matrix, and/or severs or lops off one or more lobes, fibrils, fingers or other projections extending outwardly from the outer surface of pellets 28a being post-extrusion processed by device 64 or mill 66, or otherwise mechanically engages and comminutes pellets 28a passing through the device 64 or mill 66 during post-extrusion pellet processing. Whether the post-extrusion mechanical-engagement comminution type pellet processing device 62 is a pellet slicer or pellet cutter type comminution machine 64 that mechanically engages and comminutes pellets 28a passing through the machine 64 during post-extrusion pellet processing, or is a pellet comminution mill 66, the machine 64 or mill 66 used in post-extrusion mechanical-engagement pellet processing preferably comminutes the pellets 28a in a manner that minimizes and preferably substantially completely prevents pulverizing pellets 28a, crushing pellets 28a and otherwise compressing, e.g. mashing or smashing, pellets 28a during post-extrusion pellet processing.

As such, a post-extrusion pellet processing subsystem 36 in accordance with the present invention employs a non-pulverizing, non-crushing, non-compacting and non-compressing post-extrusion mechanical-engagement comminution type pellet processing device 62 that mechanically engages and comminutes the as-extruded pellets 28a passing through the device 62 in a manner that cuts, slits, shears, tears, opens, severs and/or lops off one or more portions of pellets 28a passing through the device 62 during such post-extrusion processing of the pellets 28a. Likewise, whether the device 62 is a pellet slicer or pellet cutter comminution machine 64 or a pellet comminution mill 66, such a pellet slicer or pellet cutter comminution machine 64 also is a non-pulverizing, non-crushing, non-compacting and non-compressing pellet slicing or pellet cutting machine 64 and such a pellet comminution mill 66 also is a non-pulverizing, non-crushing, non-compacting and non-compressing pellet comminution mill 66.

Post-extrusion mechanical-engagement comminution type processing of the as-extruded pellets 28a while in a cold processed condition advantageously enables portions of one or more of the pellets 28a passing through the non-pulverizing, non-crushing, non-compacting and non-compressing mechanical-engagement comminution type pellet processing device 62, whether the device 62 is a non-pulverizing, non-crushing, non-compacting and non-compressing pellet slicing or pellet cutting machine 64 and/or a non-pulverizing, non-crushing, non-compacting and non-compressing pellet comminution mill 66, modification of the state, structure, phase, or matrix of the extruder-modified starches in the pellets 28a passing through during such post-extrusion processing is minimized and preferably substantially completely prevented. By cooling and drying the pellets 28a prior to and preferably up to or adjacent entry into the pellet processing device 62, e.g., pellet cutter/slicer machine 64 and/or pellet comminution mill 66, post-extrusion physical modification of the previously extruder modified starches, including the room temperature water-soluble physically modified starch-based binder, e.g., physically modified starch-based room temperature water soluble clumping agent, is advantageously minimized and preferably substantially completely prevented during such mechanical engagement comminution type post-extrusion pellet processing. In addition, use of a non-pulverizing, non-crushing, non-compacting and non-compressing mechanical engagement comminution type post-extrusion pellet processing device 62, preferably either a non-pulverizing, non-crushing, non-compacting and non-compressing pellet cutter/slicer machine 64 or a non-pulverizing, non-crushing, non-compacting and non-compressing pellet comminution mill 66, minimizes the amount and/or nature of the mechanical engagement, physical contact, and/or comminution of the pellets 28a passing through the device 62, e.g. pellet cutter/slicer machine 64 and/or pellet comminution mill 66, thereby advantageously also helping to minimize and preferably helping to substantially completely prevent post-extrusion physical modification and/or thermal modification of such starches in the pellets 28a that were previously physically modified by the extruder 22 during or by gelatinization and/or extrusion.

During such post-extrusion mechanical engagement and/or comminution-type processing of the as-extruded original sized pellets 28a by device 62, e.g. pellet cutter-slicer machine 64 or pellet comminution mill 66, of such a preferred post-extrusion pellet processing subsystem 36 in carrying out a method of post-extrusion mechanical engagement and/or comminution type processing of original-sized extruded pellets 28a in accordance with the present invention advantageously minimizes and preferably prevents post-extrusion physical modification and/or post-extrusion thermal modification thereby helping to retain, preserve, optimize and preferably maximize the amount, magnitude and/or type of extruder-modified starches present and/or formed in the as-extruded pellets 28a by or during gelatinization and/or pellet extrusion by extruder 22 which further advantageously maintains and preferably optimizes (a) liquid absorption, including absorption of water, urine, liquid fecal matter, and hydrocarbon/petroleum-based oil(s), (b) pellet structural integrity, and/or (c) wetted pellet clumping of the comminuted reduced particle size pellets 28b, e.g., size-reduced pellets 28b, and smaller more finely sized pellet particles 28c, e.g., size-reduced fines 28c, produced as a result of comminution of the original-sized and/or as-extruded pellets 28a by device 62, e.g. e.g. pellet cutter/slicer machine 64 and/or pellet comminution mill 66, during post-extrusion mechanical engagement and/or comminution type pellet processing.

Such post-extrusion mechanical-engagement and/or comminution-type processing of the cold processed as-extruded pellets 28a in carrying out a preferred implementation of such a post-extrusion pellet processing method of the present invention can be and preferably is performed by comminuting pellets 28a as they pass through the device 62, e.g. pellet cutter/slicer machine 64 and/or pellet comminution mill 66, thereby physically modifying at least one of (a) a portion of the outer pellet surface, (b) the shape, and/or (c) the size of one or more as-extruded pellets 28a during such post-extrusion pellet processing producing one or more at least slightly smaller sized size-reduced pellets 28b and/or smaller more finely sized sized-reduced pellet particles 28c, e.g., fines 28c comminuted from one or more such original-extruded pellets 28a, that are discharged from the device 62, e.g. pellet cutter/slicer machine 64 and/or pellet comminution mill 66. Thereafter, the reduced-size pellets 28b and even smaller reduced-size fines 28c are then transported, such as preferably via a second pellet conveying duct 68 from the device 62, e.g. pellet cutter/slicer machine 64 and/or pellet comminution mill 66, of the pneumatic conveyor 58 such that cold-processing air cooling and non-heated convection air drying of the as-extruded pellets 28a entering the device 62, e.g. pellet cutter/slicer machine 64 and/or pellet comminution mill 66, also is carried out, is performed, or otherwise resumes for the comminuted reduced-size pellets 28b and even smaller sized reduced-size fines 28c. As such, cold-processing air cooling and non-heated convection air drying of the comminuted reduced-size pellets 28b and even smaller sized fines 28c preferably is carried out until the pellets 28b and fines 28c reach a further post-extrusion pellet processing station 70 depicted in FIG. 1 for purposes of example as including or being a pellet holding container 72, such as a bin, bag, hopper or the like, located downstream of the mechanical-engagement comminution type pellet processing device 62 in which the size-reduced pellets 28b and even smaller sized fines 28c are collected after being discharged from device 62, e.g. pellet cutter/slicer machine 64 and/or pellet comminution mill 66, after post-extrusion mechanical-engagement and/or comminution-type pellet processing of the as-extruded pellets 28a has been performed.

In a preferred method implementation and embodiment of a post-extrusion mechanical-engagement and/or comminution-type pellet-processing subsystem 36 of the present invention, it is contemplated that not all of the originally extruded pellets 28a will be comminuted by the mechanical-engagement comminution type pellet processing device 62 such that the container 72 of the further downstream post-extrusion pellet processing station 70 is depicted in FIG. 1 as also holding at least a plurality of pairs, i.e. at least three, of as-extruded pellets 28a together with at least a plurality of pairs, i.e., at least three, of the particle-size reduced pellets 28b and at least a plurality of pairs, i.e., at least three, of the of the smaller sized fines 28c. In one such preferred method implementation and embodiment, as-extruded pellets 28a are discharged from the extruder 22 in real time during extruder 22 and system 20 operation where the as-extruded pellets 28a are cold-process cooled and dried by pellet cold processing arrangement 32 before being post-extrusion processed by post-extrusion mechanical-engagement and/or comminution type pellet processing subsystem 36 also in real time followed by discharge of at least a plurality of and preferably at least a plurality of pairs, i.e. at least 3, of different sized pellets or particles, e.g. pellets 28a and/or 28b and/or fines 28c, formed of or from the as-extruded pellets 28a during post-extrusion pellet processing that are received in the container 72 of the downstream station 70. While only one size or type of smaller sized fines 28c our depicted in FIG. 1 as being formed by comminution of an as-extruded pellet 28a by post-extrusion processing thereof by the mechanical-engagement comminution type pellet processing device 62, at least a plurality of differently sized smaller fines instead of or in addition to the fines 28c depicted in FIG. 1 preferably are produced from pellet comminution of as extruded pellets 28a. Additionally, comminution of the as-extruded pellets 28a by device 62 can and preferably also does produce at least a plurality of differently sized particle size reduced pellets instead of or in addition to the particle size reduced pellets 28b depicted in FIG. 1. As such, in a preferred method and system of post-extrusion mechanical-engagement and/or comminution type pellet processing in accordance with the present invention, at least 2 different sized reduced-sized pellets and at least 2 different sized fines are produced during or from such post-extrusion mechanical-engagement and/or comminution type pellet processing by device 62 instead of or in addition to particle reduced size pellet 28b and fines 28c preferably producing a finished granular sorbent product ready for retail sale, consumer use and/or commercial use composed of a blend of at least 3 differently sized pellets and/or fines, preferably is composed of a blend of at least 4 differently sized pellets and/or fines, and more preferably is composed of a blend of at least 5 differently sized pellets and/or fines.

With continued reference to FIG. 1, container 72 of station 70 preferably holds at least a plurality of pairs of reduced-size pellets 28b and at least a plurality of pairs of even smaller size fines 28c per cubic centimeter of volume of the container 72 as the container 72 is filled therewith during real time operation of the system 20 in carrying out a preferred implementation of a method in accordance with the present invention. In another preferred method implementation and embodiment, container 72 of station 70 preferably holds (a) at least a plurality of pairs of as-extruded pellets 28a that have not been size-reduced during post-extrusion pellet processing by device 62 of subsystem 36, (b) at least a plurality of pairs of reduced-size pellets 28b, and (c) at least a plurality of pairs of even smaller size fines 28c per cubic centimeter of volume of the container 72 when filled therewith during real time operation of the system 20 in accordance with the present invention.

If desired, container 72 of pellet processing station 70 can include or be configured to further process pellets 28a and/or 28b and/or fines 28c that have been discharged from the post-extrusion pellet processing subsystem 36 where the pellets 28a and/or 28b and/or fines 28c can be and preferably are further processed, such as by being coated with one or more coating materials, e.g. powdered bentonite, zeolite, silica, and/or other coating materials, by being stored in a container, such as in a bulk bag or bin for later shipment and/or subsequent packaging as at least part of a granular sorbent product, and/or is blended and/or packaged with other granular materials in a granular sorbent product produced in accordance with the present invention composed of at least 50%, preferably at least 65% and more preferably at least 75% of the comminuted reduced-sized pellets 28b and the even smaller sized fines 28c formed during post-extrusion mechanical engagement and/or comminution type pellet processing of the as-extruded extruded pellets 28a.

It is therefore contemplated that the processing station 70 schematically shown in FIG. 1 located at the end of the cold-process air cooling and non-heated convective, preferably turbulently convective, air drying pneumatic pellet transporting conveyor 58 can be or otherwise include a pellet or particle size separating or classifying station, a pellet or granular blender or blending station, a mixer or mixing station, a pellet or particle coater or coating station, an agglomerator, a bulk bag or bulk bin filling station, a retail container or retail bag packaging line or station, or can be another type of pellet 28b and/or fines 28c processing station, including another post-extrusion mechanical-engagement and/or comminution-type pellet processing device, such as a pellet cutter, pellet slicer, or pellet comminution mill that preferably is of non-pulverizing, non-crushing, non-compacting and non-compressing construction and operation. If desired, a system and method in accordance with the present invention can and preferably does further contemplate one or more additional such processing stations, e.g., comminution device 62 and/or station 70, not shown in FIG. 1 downstream of and linked to processing station 70, such as by another duct (not shown) of pneumatic conveyor 58 and/or by another pellet or particulate matter transport device or mechanism (not shown).

FIG. 2 illustrates another preferred embodiment of an extruded granular sorbent production system 20' that is similar to the system 20 shown in FIG. 1 but which employs a pellet comminuting particle size reducer 62 that preferably is a rotating roll type pellet comminuting mill 65 as the pellet processing device 60' of post-extrusion pellet processing subsystem 36'. In addition, the cold-processing arrangement 32' has a cooling and drying subsystem 34' that includes a second coolant air conveying duct 74 in gas flow communication with the pellet particle size reducer 62 for cold processing as-extruded pellets 28a in real time as the pellets 28a are being processed, e.g. comminuted, by the particle size reducer 62 to minimize and preferably substantially completely prevent any increase in the temperature of the pellets 28a as they are being processed by the particle size reducer 62.

While the coolant air conveying duct 74 can also be in gas flow communication with the pellet cooling air blower 52, the duct 74 preferably is separately supplied with pellet coolant gas, preferably ambient air having a temperature no higher than 100° F. or no higher than 37° C., preferably no higher than 90° F. or no higher than 32° C., and more preferably no higher than 80° F. or no higher than 26° F. at a volumetric flow rate great enough to maintain the temperature of the pellets 28a during processing, e.g., particle-size reduction, by the pellet particle size reducer 62 at substantially the same temperature as the pellet entry temperature of the pellets 28a entering the pellet particle size reducer 62 such that the pellets 28a, reduced particle size pellets 28b, and even smaller sized fines 28c have an exit temperature upon exiting the particle size reducer 62 that is substantially the same as the pellet entry temperature. In the preferred embodiment of the pellet cooling and drying subsystem 34', the subsystem 34' preferably includes a particle size reducer pellet cooling arrangement 76 that includes a blower 78, such as a centrifugal fan or squirrel cage blower, which draws in ambient air outside of the extruder 22 and pellet particle size reducer 62 and discharges it inside the pellet particle size reducer 62 at or adjacent where the pellets 28a are being comminuted and/or particle size reduced under a high enough pressure and/or at a volumetric flow rate sufficiently great to at least maintain the temperature of the as extruded pellets 28a being particle size reduced by the reducer 62 and the temperature of the reduced sized particle pellets 28b and fines 28c formed by the reducer 62 during pellet particle size reduction as discussed hereinabove. In one preferred embodiment and method, operation of the particle size reducer cooling arrangement 76 directs a great enough volumetric flow rate of pellet cooling air into the pellet particle size reducer 62 such that the temperature of the as-extruded pellets 28a, particle size reduced pellets 28b, and fines 28c have a discharge temperature upon exiting the reducer 62 that is at least 1° F. and preferably at least 1° C. lower than the pellet entry temperature of the as extruded pellets 28a entering the reducer 62.

Where equipped with a coolant air conveying duct 74 that supplies ambient pellet cooling to the interior of the pellet particle size reducer 62, cold processing air cooling and convective air drying, preferably turbulently convective air drying, of the pellets 28a continues substantially uninterrupted during entry of the as-extruded pellets 28a into the pellet particle size reducer 62, during particle size reduction comminution of the as-extruded pellets 28a by the pellet particle size reducer 62, and preferably also as the pellets 28a and 28b and fines 28c exit the pellet particle size reducer 62. Depending upon the volumetric air flow rate and the sizing of the pellet conveying duct 68 of the pneumatic conveyor 58 extending downstream from the pellet particle size reducer 62, the pellet cooling air conveyed by or through the coolant air conveying duct 74 into the pellet particle size reducer 62 can also be used to pneumatically direct the pellets 28a and/or 28b and fines 28c being discharged from the pellet particle size reducer 62 into and through the pellet conveying duct 68 advantageously continuing to cold process air cool and air dry the pellets 28a and 28b and fines 28c all the way until they reach the end of the duct 68 and/or processing station 70.

With continued reference to FIG. 2, a preferred particle size reduction machine or pellet size reducer 62 is a rotating roll type pellet comminuting mill 65 having a pair of generally horizontal side-by-side elongate pellet-comminuting corrugated rolls 80 and 82, preferably LePage rolls 80 and 82, which can be and preferably are generally parallel to one another and which rotate toward one another with the differential in the rotational speeds and spacing between the counter-rotating rolls 80 and 82 determining the maximum pellet size or pellet size range to which extruded pellets are particle size reduced during post-extrusion pellet processing. One such preferred pellet or particle size reducer 62 is a LePage corrugated roll mill or LePage roll granulator 84 having a pair of such corrugated LePage rolls 80 and 82 that rotate toward one another during size reduction of extruded pellets 28a with one of the LePage rolls 80 being longitudinally corrugated having longitudinally extending corrugations, e.g., longitudinally formed or longitudinally cut corrugations, and the other one of the LePage rolls 82 being circumferentially corrugated having circumferentially spaced apart corrugations extending in a circumferential direction, e.g., circumferentially formed corrugations or circumferentially cut corrugations, with gap and rotational speed differential of the counter-rotating corrugated LePage rolls 80 and 82 comminuting oversized extruded pellets 28a in a manner that shears, severs or lops off outwardly extending or projecting portions of the oversized extruded pellets 28a without pulverizing, crushing, hammering, or otherwise compressing the oversized pellets 28a during particle size reduction. Such a corrugated LePage roll mill or roll granulator 84 constructed with such counterrotating horizontally and circumferentially corrugated rolls 80 and 82 cuts, abrades, severs, shears, shaves or otherwise comminutes outwardly projecting lobes, tendrils, fingers or other portions of oversized pellets 28a being particle sized reduced thereby that extend outwardly of the rest of the outer surface of the oversized pellets 28a with those outwardly extending portions of the oversized pellet 28a severed, lopped off, sheared off, shaved off or otherwise comminuted from the oversized pellet 28a produce the more finely sized fines 28c with the rest of what remains of the previously oversized pellet 28a being a particle size reduced pellet 28b in accordance with the present invention. Performing such non-compression induced particle size reduction using such a particle size reduction roller mill 65 that preferably is a LaPage corrugated roll mill or granulator 84 equipped with such horizontally and circumferentially corrugated LePage rollers 80 and 82 advantageously minimizes and preferably substantially completely prevents physical and thermal modification of the extruder-modified starches of extruded pellets contacting the counter-rotating rolls 80 and/or 82, being comminuted by the rolls 80 and/or 82, and/or being particle size reduced by the rolls 80 and/or 82 during particle size reduction operation of the LePage pellet size reduction machine 84.

At least one aspect of the present invention therefore is advantageously directed to a method, system and processing machine, preferably a pellet size reduction machine, like the pellet or particle size reduction machine 84 shown in FIG. 2, which performs particle size reduction of pellets extruded by an extruder from a starch-containing mixture, e.g., admixture, substantially as fast as pellets are extruded from the extruder in a manner that breaks each pellet that undergoes particle size reduction into two or more smaller sized particles all while prevent compression or compaction thereof during particle size reduction. Such a method, system and pellet or particle size reduction machine preferably reduces pellet particle size using non-compression particle size reduction thereby substantially completely preventing pellet and/or reduced size particle densification from occurring such that the bulk density of reduced size particles formed from extruded pellets undergoing particle size reduction is no greater than the bulk density of the extruded pellets undergoing particle size reduction. Such a method, system and pellet or particle size reduction machine preferably reduces pellet particle size via cold-processing pellet or particle size reduction whereby the temperature of each pellet undergoing non-compression particle size reduction does not substantially increase during non-compression particle size reduction such that the temperature of reduced size particles exiting the particle size reduction machine is no greater than four degrees Celsius hotter than the temperature of extruded pellets entering the particle size reduction machine.

In a preferred method of making extruded pellets well suited for use with the method, system and particle size reduction machine of the present invention, pellets preferably are extruded from a starch-containing admixture formed substantially completely of one or more cereal grains, which can also include cellulosic material, using an extruder in accordance with the method and arranged disclosed in United States Patent Application Publication No. 20150196005, and/or United States Patent Application Publication No. 20150145164, the entirety of each of which is expressly incorporated herein by reference. In one such preferred extruded pellet making method, pellets are extruded from an admixture composed substantially completely of corn, preferably cornmeal which can be de-germed cornmeal, which can include no more than 35% cellulosic material by admixture weight, which has an admixture moisture content no greater than 25% by admixture weight, which is gelatinized and extruded by a single screw extruder at an extrusion temperature at the extrusion die of at least 100 degrees Celsius, preferably at least 110 degrees Celsius, and more preferably at least 125 degrees Celsius, and at an extrusion pressure at the extrusion die of at least 1800 pounds per square inch, preferably at least 2000 pounds per square inch, and more preferably at least 2500 pounds per square inch. In another such preferred extruded pellet making method, pellets are extruded from an admixture composed substantially completely of sorghum, preferably whole grain sorghum which can be and preferably is de-germed, which can include no more than 35% cellulosic material by admixture weight, which has an admixture moisture content no greater than 20% by admixture weight, which is gelatinized and extruded by a single-screw extruder 38 at an extrusion temperature at the extrusion die of at least 100 degrees Celsius, preferably at least 120 degrees Celsius, and more preferably at least 135 degrees Celsius, and at an extrusion pressure at the extrusion die of at least 2000 pounds per square inch, preferably at least 2500 pounds per square inch, and more preferably at least 3000 pounds per square inch.

Pellets extruded from such an admixture in accordance with such preferred methods and extruder operating parameters each advantageously contain an amount of starch modified by or during extrusion into room temperature water soluble binder that preferably is cold water soluble binder and which more preferably is cold water-soluble physically modified amylopectin starch binder in an amount sufficient to cause at least a plurality of pairs of wetted pellets to clump together and form clumps when dried to a moisture content of no greater than 25% by dried clump weight that have a clump compressive strength of at least 300 pounds per square inch, preferably at least 400 pounds per square inch, and more preferably at least 700 pounds per square inch. Pellets extruded from such an admixture in accordance with such preferred methods and extruder operating parameters each advantageously contain an amount of starch modified by or during extrusion into room temperature water soluble binder that preferably is cold water soluble physically modified starch-based binder and which more preferably is cold water-soluble physically modified amylopectin starch binder sufficient to cause at least a plurality of pairs of wetted pellets to clump together define self-clumping pellets producing self-clumping granular sorbent that is well suited for use in animal, pet and cat litter applications as self-clumping litter. Such extruded granular sorbent 30, including when used as litter, preferably is all-natural, biodegradable, and toilet-flushable.

Pellets extruded from such an admixture in accordance with such preferred methods and extruder operating parameters each advantageously contain an amount of starch modified by or during extrusion into room temperature water soluble binder, preferably cold water soluble physically modified starch based binder, more preferably cold water soluble physically modified amylopectin starch binder sufficient to cause at least some of the water soluble binder in wetted pellets to become flowable and form a flowable adhesive binder that flows from wetted pellets around and between at least a plurality of pairs of adjacent pellets binding and clumping them together producing self-clumping extruded granular sorbent 30. Where used as litter, pellets extruded from such an admixture in accordance with such preferred methods and extruder operating parameters each advantageously contain an amount of starch modified by or during extrusion into room temperature water soluble binder, preferably cold water soluble physically modified starch-based binder, more preferably cold water soluble physically modified amylopectin starch binder, sufficient to cause at least some of the water soluble binder in wetted pellets to become flowable and form a flowable adhesive binder that flows from wetted pellets around and between at least a plurality of pairs of adjacent pellets binding and clumping them together producing self-clumping litter. Such extruded granular sorbent 30, including when used as litter, preferably is all-natural, biodegradable, and toilet-flushable.

Where used in its as-extruded form, even after particle size reduction in accordance with the present invention has been performed, extruded pellets of such self-clumping granular sorbent, including when used as self-clumping litter, each have at least 7.5% room temperature water soluble physically modified starch-based binder by extruded pellet weight that preferably is or includes cold water soluble physically modified amylopectin starch binder with at least some of an outer surface of each extruded pellet being composed of such cold water soluble physically modified starch-based binder. Where particle size reduction has been performed in accordance with the present invention, each size reduced particle formed from extruded pellets that undergo particle size reduction also possess at least 7.5% room temperature water soluble physically modified starch-based binder by extruded pellet weight that preferably is or includes cold water soluble physically modified amylopectin starch binder. In at least one granular sorbent embodiment, extruded pellets along with any reduced size particles formed of extruded pellets that underwent particle size reduction in accordance with the present invention contain at least 10% room temperature water soluble physically modified starch-based binder that is or includes cold water soluble physically modified amylopectin starch binder. In at least one other granular sorbent embodiment, extruded pellets along with any reduced size particles formed of extruded pellets that underwent particle size reduction in accordance with the present invention contain at least 15% cold water soluble binder. Such extruded granular sorbent 30, including when used as litter, preferably is all-natural, biodegradable, and toilet-flushable.

In a preferred extruded pellet making method pellets extruded from such admixture(s) in accordance with such preferred method(s) and extruder operating parameter(s) set forth above each advantageously contain an amount of starch physically modified by or during extrusion into room temperature water soluble physically modified starch-based binder that preferably is or includes cold water soluble physically modified amylopectin starch binder in an amount sufficient to cause at least a plurality of pairs of wetted pellets to clump together and form clumps having a clump compressive strength of at least 300 pounds per square inch, preferably at least 400 pounds per square inch, and more preferably at least 700 pounds per square inch when compression strength tested in accordance with the litter clump compression strength test procedure set forth below:

Clump Compression Strength Test Procedure

The following equipment was utilized in carrying out extruded granular sorbent (litter) clump compression strength testing:
(1) 15 mL centrifuge tubes with screw top caps, plastic
(2) 3.0 mL disposable pipettes, plastic
(3) Distilled water
(4) Force Gauge: Mark-10 Model M7-500 S/N 3674412
(5) Motorized test stand: Model ESM303 S/N 3979431
(6) Digital control panel: Mark-10 Model DC4060 S/N 3680222
(7) DREMEL hand held high speed rotary power tool with deep cutting wheel
(8) Samples of extruded granular sorbent material (extruded pellets) to be wetted to form clumps therefrom to be compression strength tested Using the above, the following methodology was utilized in performing extruded granular sorbent (litter) clump compressive strength testing:
(1) Saw off tapered end of a 15 mL test tube, and clean off burrs.
(2) Screw on cap of test tube and fill tube with sample material to be tested.
(3) Add distilled water to sample material in test tube (1:1 by weight) to wet sample material
(4) Wait 10 seconds
(5) Unscrew cap from test tube and gently push "cast" clump formed of wetted sample material out of test tube using bulbous end of a plastic pipette (snug fit).
(6) Let cast clump sit and dry for 5 days at ambient room temperature conditions.
(7) Using deep cutting wheel attached to a DREMEL high speed rotary tool at high speed greater than 10,000 RPM, cut cast clump into barrel-shaped sections each approximately 0.5 inches thick or long.
(8) Measure the diameter and length of each barrel shaped cast clump section.
(9) Place barrel shaped cast clump section on middle of compression test stand platform, with flat cut ends of barrel shaped cast clump section on top and bottom for compression testing by force gauge.
(10) Using a compression speed of 0.5 inches/minute, determine peak compression strength of barrel shaped cast clump section using force gauge.

In a preferred method, system and pellet size reduction machine, such as the LePage corrugated roller equipped particle size reduction machine 84 schematically depicted in FIG. 2, particle size reduction is produced by reducing the size of at least a plurality of pellets extruded by at least a plurality of extruders preferably doing so substantially simultaneously upon or right after pellet extrusion. In another preferred method, system and pellet size reduction machine, particle size reduction is substantially simultaneously performed on at least a plurality of pairs of pellets, i.e., at least three, extruded substantially simultaneously by or from at least a plurality of extruders and preferably at least a plurality of pairs of extruders, i.e., at least three extruders, preferably doing so substantially simultaneously upon or right after pellet extrusion and while each one of the extruders is operating (preferably while each is substantially simultaneously discharging at least a plurality of pairs of extruded pellets per second with the particle size reduction machine processing at least a plurality of pairs of extruded pellets from each one of the extruders feeding extruded pellets thereto during each second particle size reduction machine operation).

Particle size reduction is advantageously done in a manner that produces two or more smaller sized particles from each extruded pellet that undergoes particle size reduction where each smaller sized particle has a bulk density no greater than the bulk density of the extruded pellet from which the smaller sized particles were formed. In a preferred method, system and particle size reduction machine of the present invention, such as the LePage corrugated roller equipped particle size reduction machine 84 schematically depicted in FIG. 2, each pellet undergoing pellet or particle size reduction is particle size reduced by the particle size reduction machine in a manner that produces (a) a smaller reduced size particle that is smaller in size than the extruded pellet from which the smaller reduced size particle was formed, and (b) at least one finer sized particle or fine(s) produced from the same extruded pellet that is smaller in size than the smaller reduced size particle also produced from the same extruded pellet during particle size reduction thereof. In another preferred method, system and particle size reduction machine of the present invention, each pellet undergoing pellet or particle size reduction is particle size reduced by the particle size reduction machine in a manner that produces at least one smaller sized particle and at least a plurality of fines therefrom. In still another preferred method, system and particle size reduction machine of the present invention, each pellet undergoing pellet or particle size reduction is particle size reduced by the particle size reduction machine in a manner that produces at least one smaller sized particle and at least a plurality of pairs of fines, i.e., at least three fines, therefrom.

In carrying out a preferred method of extruded pellet particle size reduction using a system that preferably includes a non-compression inducing particle size reduction machine in accordance with the present invention, a particle size reduction setting of the particle size reduction machine is set to process extruded pellets larger in size than the particle size reduction setting by reducing pellet size in a manner that breaks up these larger sized pellets into (a) at least one smaller size particle of a size smaller than that of the larger sized pellet from which it was formed, and (b) at least one even smaller size fine of a size smaller than the at least one smaller size particle. In one such preferred method, system and particle size reduction machine embodiment, the particle size reduction machine is set at a particle size reduction setting that produces at least a plurality of fines, preferably at least a plurality of pairs of fines, from each larger size extruded pellet that undergoes particle size reduction by the particle size reduction machine. In such a preferred method, system and particle size reduction machine embodiment, each larger sized extruded pellet that undergoes particle size reduction also forms at least one smaller sized particle having a size larger than each one of the fines produced therefrom in addition to the fines produced thereby.

Changing the particle size reduction setting of the particle size reduction machine, e.g., machine 84, changes the minimum size at or above which extruded pellets and/or any other particle passing through the particle size reduction machine must possess in order to be actually processed by the particle size reduction machine in a manner that preferably reduces pellet size or incoming particle size by breaking off one or more pieces therefrom during particle size reduction. Pellets and any other particles passing through the particle size reduction machine of a size smaller than the particle size reduction setting of the particle size reduction machine preferably pass through the particle size reduction machine substantially completely untouched or unprocessed by the particle size reduction machine.

In a preferred particle size reduction machine embodiment, pellets and any other particles entering the particle size reduction machine pass through substantially untouched where their maximum extent, i.e., largest portion, whether it be the length, width, and/or thickness of the pellet or entering particle, is smaller than or less than the particle size reduction setting of the particle size reduction machine. In such a preferred particle size reduction machine embodiment, pellets and any other particles entering the particle size reduction machine having a maximum extent, i.e., largest portion, whether it be the length, width, and/or thickness of the pellet or entering particle, greater than or larger than the particle size reduction setting of the particle size reduction machine are processed by the particle size reduction machine reducing their particle size via non-compression induced particle size reduction. Such a preferred particle size reduction machine performs non-compression induced particle size reduction by shearing, tearing, cutting, slitting, twisting and/or pulling each larger sized pellet or other larger sized particle of a size greater than the particle size reduction setting of the particle size reduction machine such that the particle size reduction machine thereby shears off one or more pieces or portions therefrom, tears off one or more pieces or portions therefrom, cuts off one or more pieces or portions therefrom, slits one or more pieces or portions therefrom, twists off one or more pieces or portions therefrom, and/or pulls off one or more pieces or portions therefrom.

By reducing the size of pellets and/or other particles of a size greater than the particle size reduction setting of the particle size reduction machine via shearing, tearing, cutting, slitting, twisting and/or pulling particle size reduction is advantageously accomplished without compressing or compacting the larger sized pellet and/or larger sized particle undergoing particle size reduction such that densification does not occur, pores and internal voids remain open and substantially intact, and the matrix of each pellet and/or particle, including the smaller sized particles and fines formed therefrom during particle size reduction, remains substantially unaffected. In addition, because particle size reduction is accomplished through contact or engagement with larger sized pellets and/or larger sized particles that shears, tears, twists, cuts, slits, and/or pulls apart the larger sized pellets and/or larger sized particles undergoing particle size reduction, the bulk density of each smaller sized particle and each one of the fines formed by such particle size reduction has a bulk density no greater than and preferably less than the bulk density of the larger sized pellets and/or larger sized particles prior to undergoing particle size reduction. This shearing action, tearing action, twisting action, cutting action, slitting action and/or pulling apart action on each larger sized pellet and/or larger sized particle undergoing such non-compression induced particle size reduction in accordance with the present invention preferably not only reduces bulk density in the smaller sized particles and fines produced during particle size reduction, but also opens up the void filled interior of each larger sized pellet and/or larger sized particle and all reduced size particles and fines formed therefrom thereby advantageously not only improving and/or increasing absorption during granular sorbent use but also increasing and/or speeding the rate or speed at which absorption or liquid uptake occurs during granular sorbent use.

Such a preferred method, system and particle size reduction machine in accordance with the invention performs such non-compression induced or non-compression particle size reduction in a manner that requires less energy during particle size reduction advantageously minimizing and preferably substantially completely preventing heating of pellets and/or other particles passing through the particle size reduction machine in a manner that substantially changes or otherwise adversely affects or impacts the internal matrix, including starch matrix, of each pellet or particle being particle sized reduced and/or passing through. Heating preferably is minimized sufficiently enough to also prevent starch retrogradation from occurring, to also prevent any change in form or phase of starch from taking place, as well as to also prevent any other change or transition to starch from happening thereby preserving optimal sorbent performance so absorption capacity and/or absorption rate is at least as great in the size reduced particles as the absorption capacity and/or absorption rate of the pellets and/or particles entering the particle size reduction machine. In at least one method implementation, system and/or particle size reduction machine embodiment, such low energy non-compression induced or non-compression particle size reduction carried out by such a particle size reduction machine constructed in accordance with the present advantageously minimizes and preferably substantially completely prevents larger sized pellets and/or larger sized particles undergoing particle size reduction from heating and increasing their temperature by no more than four degrees Celsius, preferably no more than two degrees Celsius, and more preferably no more than one degree Celsius during particle size reduction.

In a preferred method implementation and embodiment, the present invention is directed to a method, system and pellet size reduction machine that preferably is or includes a roll granulator or granulating mill of non-compression induced particle size reduction construction that reduces the size of extruded pellets and/or other granular sorbent granules or particles passing by processing extruded pellets and/or other granular sorbent granules or particles in a manner that performs (a) tensile/tensile stress or force induced particle size reduction, (b) shear or shear stress or force induced particle size reduction, and/or (c) torsion or twisting stress or force induced particle size reduction thereby advantageously substantially completely preventing or avoiding formation of any compressed or compact regions on or in any reduced size particle produced in accordance with the present invention. In a preferred method and system, a preferred roll granulator or granulating mill 84 configured to perform such non-compression induced particle size reduction has a pair of spaced apart rolls, preferably LePage corrugated circle-chill rolls 80 and 82, which rotate during non-compression induced particle size reduction to perform particle size reduction in a manner that shears, pulls apart and/or twists apart pellets having a size wider and/or longer than a preset and preferably selectively variable space or spacing of a gap between the rolls. In a preferred method and embodiment, one of the rolls preferably rotates during particle size reduction at a rotational speed in revolutions per minute that is greater than a rotational speed of the other one of the rolls.

The gap spacing between the rolls can be selectively and preferably relatively precisely varied or set providing a particle size reduction setting of such a roll-type particle size reduction machine of non-compression inducing particle size reduction construction that can be selectively set and/or varied to determine a minimum pellet or particle size at or greater than which an extruded pellet or particle entering the particle size reduction machine must possess or be in order for non-compression induced particle size reduction to be performed by the particle size reduction machine. Varying the particle size reduction setting by selectively setting the space or spacing between the rolls can also be one, including dynamically during extruder and particle size reduction machine operation to relatively precisely control the size, amount and/or ratio of more finely sized particles produced from extruded pellets and other particle entering the particle size reduction machine having a length and/or width at least as great as and preferably greater than the particle size reduction setting. Increasing the particle size reduction setting by increasing the size of the gap between the rolls of the machine correspondingly and preferably proportionally increases the size of the fines produced while at the same time correspondingly and preferably decreasing the amount of fines produced during particle size reduction machine operation. Conversely, decreasing the particle size reduction setting by decreasing the size of the gap between the rolls of the machine correspondingly and preferably proportionally decreases the size of the fines produced while at the same time correspondingly and preferably increasing the amount of fines produced during particle size reduction machine operation.

In this manner, the particle size reduction setting of such a particle size reduction machine can be and preferably is set relative to the largest size of pellets being extruded by each extruder feeding the particle size reduction machine in order to increase or decrease the amount of fines produced from the extruded pellets. In this manner, the particle size reduction setting of such a particle size reduction machine inline with the discharge end of one or more extruders feeding extruded pellets to the particle size reduction machine can be and preferably is selectively varied to correspondingly increase (by decreasing the spacing or gap in changing the particle size reduction setting) the ratio or total amount of fines in the final granular sorbent product or correspondingly decrease (by increasing the spacing or gap in changing the particle size reduction setting) the ratio or total amount of fines in the final granular sorbent product to achieve a desired ratio or ratio range of fines in the final granular sorbent product. In a preferred method, system and particle size reduction machine, the fines ratio of the final granular sorbent product being produced during extruder and inline particle size reduction machine operation is monitored in real time and (a) the spacing or gap between the rolls is automatically adjusted to increase the spacing or gap to particle size reduce fewer pellets and hence produce fewer fines where less fines are needed to achieve the desired minimum fines ratio in the final granular sorbent product, and/or (b) the spacing or gap between the rolls is automatically adjusted to decrease the spacing or gap to particle size reduce more pellets and hence produce more fines where more fines are needed to achieve the desired minimum fines ratio in the final granular sorbent product.

In a preferred method, system and particle size reduction machine embodiment and configuration, the particle size reduction setting is set and/or varied in order to produce enough fines having a particle size no larger than 14 US sieve (and having a particle size between 14 US sieve and 60 US sieve or between 14 US sieve and 80 US sieve) during particle size reduction of extruded pellets of a size larger than the particle size reduction setting in order for the resultant final granular sorbent product, e.g., final granular sorbent blend or final granular sorbent mixture ready for packaging, shipment and sale, to contain at least 10% fines by total weight of the final granular sorbent product and no more than 50% fines by total weight of the final granular sorbent product. In one such preferred method, system and particle size reduction machine embodiment and configuration, the particle size reduction setting is set and/or varied in order to control the size of the gap or spacing between the rolls to produce enough fines having a particle size no larger than 14 US sieve (and having a particle size between 14 US sieve and 60 US sieve or between 14 US sieve and 80 US sieve) during particle size reduction of extruded pellets of a size (largest extent of pellet) larger than the gap size or roll spacing in order for the resultant final granular sorbent product, e.g., final granular sorbent blend or final granular sorbent mixture ready for packaging, shipment and sale, to contain at least 15% fines by total weight of the final granular sorbent product and no more than 40% fines by total weight of the final granular sorbent product. Where the final granular sorbent blend product is litter or intended for use as animal, pet or cat litter, such a preferred method, system and particle size reduction machine embodiment is operated in a manner where the size of the gap or spacing between rolls is set and preferably varied in real time during extruder operation to produce self-clumping cat litter in accordance with the present invention preferably having at least 15% fines by total weight of the final self-clumping litter product in order to prevent vertically extending clumps ("stalactite clumps") from forming in the litter box during urination by a cat during litter use and preferably having no more than 40% fines by total weight of the final litter product in order to prevent urine from pooling on top of the surface of litter in the litter box during cat urination during litter use.

In another such preferred method, system and particle size reduction machine embodiment and configuration, the particle size reduction setting is set and/or varied in order to control the size of the gap or spacing between the rolls to produce enough fines having a particle size no larger than 14 US sieve (and having a particle size between 14 US sieve and 60 US sieve or between 14 US sieve and 80 US sieve) during particle size reduction of extruded pellets of a size (largest extent of pellet) larger than the gap size or roll spacing in order for the resultant final granular sorbent product, e.g., final granular sorbent blend or final granular sorbent mixture ready for packaging, shipment and sale, to contain at least 20% fines by total weight of the final granular sorbent product and no more than 40% fines by total weight of the final granular sorbent product. Where the final granular sorbent blend product is litter or intended for use as animal, pet or cat litter, such a preferred method, system and particle size reduction machine embodiment is operated in a manner where the size of the gap or spacing between rolls is set and preferably varied in real time during extruder operation to produce self-clumping cat litter in accordance with the present invention preferably having a sufficient amount of fines in excess of the minimum 15% fines by total weight of the final self-clumping litter product needed for proper generally horizontal litter clumping, preferably having at least 20% fines (i.e. contain at least 5% excess fines), in order to prevent vertically extending clumps ("stalactite clumps") of urine wetted pellets, particles and fines from forming in the litter box during urination by a cat during litter use and to ensure any clumps of such urine wetted pellets, particles and fines properly form in the litter box during cat urination on top of the litter box and extend generally horizontally on top of the litter in the litter box. Controlling the particle size reduction setting, i.e., gap size or roll spacing, in order to ensure at least 5% excess fines are produced helps ensure there will be at least 15% fines by total litter product in the litter box when at least half of the litter in the litter box has been spent or used because fines are spent or used more rapidly in a greater amount than the extruded pellets and other larger size particles in the litter box having a size larger than the fines (preferably having a size larger than 14 US sieve and preferably no greater than 7 US sieve or 8 US sieve).

In still another such preferred method, system and particle size reduction machine embodiment and configuration, the particle size reduction setting is set and/or varied in order to control the size of the gap or spacing between the rolls to produce enough fines having a particle size no larger than 14 US sieve (and having a particle size between 14 US sieve and 60 US sieve or between 14 US sieve and 80 US sieve) during particle size reduction of extruded pellets of a size (largest extent of pellet) larger than the gap size or roll spacing in order for the resultant final granular sorbent product, e.g., final granular sorbent blend or final granular sorbent mixture ready for packaging, shipment and sale, to contain at least 25% fines by total weight of the final granular sorbent product and no more than 45% fines by total weight of the final granular sorbent product. Where the final granular sorbent blend product is litter or intended for use as animal, pet or cat litter, such a preferred method, system and particle size reduction machine embodiment is operated in a manner where the size of the gap or spacing between rolls is set and preferably varied in real time during extruder operation to produce self-clumping cat litter in accordance with the present invention preferably having a sufficient amount of fines in excess of the minimum 15% fines by total weight of the final self-clumping litter product needed for proper horizontal clumping, preferably having at least 25% fines (i.e. contain at least 10% excess fines), in order to prevent vertically extending clumps ("stalactite clumps") of urine wetted pellets, particles and fines from forming in the litter box during urination by a cat during litter use and to ensure any clumps of such urine wetted pellets, particles and fines properly form in the litter box during cat urination on top of the litter box and extend generally horizontally on top of the litter in the litter box. Controlling the particle size reduction setting, i.e., gap size or roll spacing, in order to ensure at least 10% excess fines are produced helps ensure there will be at least 15% fines by total litter product in the litter box when at least half of the litter in the litter box has been spent or used because fines are spent or used more rapidly in a greater amount than the extruded pellets and other larger size particles in the litter box having a size larger than the fines (preferably having a size larger than 14 US sieve and preferably no greater than 8 US sieve).

It is contemplated that a particle size reduction machine constructed and configured in accordance with the present invention is included in the extruded granular sorbent making and processing system and line shown and described in U.S. Patent Application Publication No. 20150145164, the entirety of which is expressly incorporated herein by reference. Such a method, system and particle size reduction machine of the present invention also facilitates cold post-extrusion processing of pellets extruded by one or more extruders that are processed in the manner shown and described in U.S. Patent Application Publication No. 20150145164 including during pneumatic conveyor transport. In a preferred extruded granular sorbent processing line, a particle size reduction machine constructed and configured in accordance with the present invention is disposed in line with the pneumatic conveyor, preferably located at the end of the conveyer, such that pellets extruded from each extruder feeding into the conveyor are ultimately transported to the particle size reduction machine for cold particle reduction processing of extruded pellets and other particles delivered thereto that have a size greater than the gap size or roll spacing particle size reduction setting. The rest of the pellets, other particles, and fines created during and after extrusion of a size smaller than the gap size or roll spacing particle size reduction setting preferably pass through the gap or spacing between the rotating rollers of the particle size reduction machine without being particle size reduced. After passing through the particle size reduction machine, the pellets, reduced size particles, other smaller sized particles, and fines preferably form a final granular sorbent mixture or blend product containing a suitably acceptable ratio or minimum product percentage of fines that is ready for packaging, shipment, sale and end use.

Figure 3:
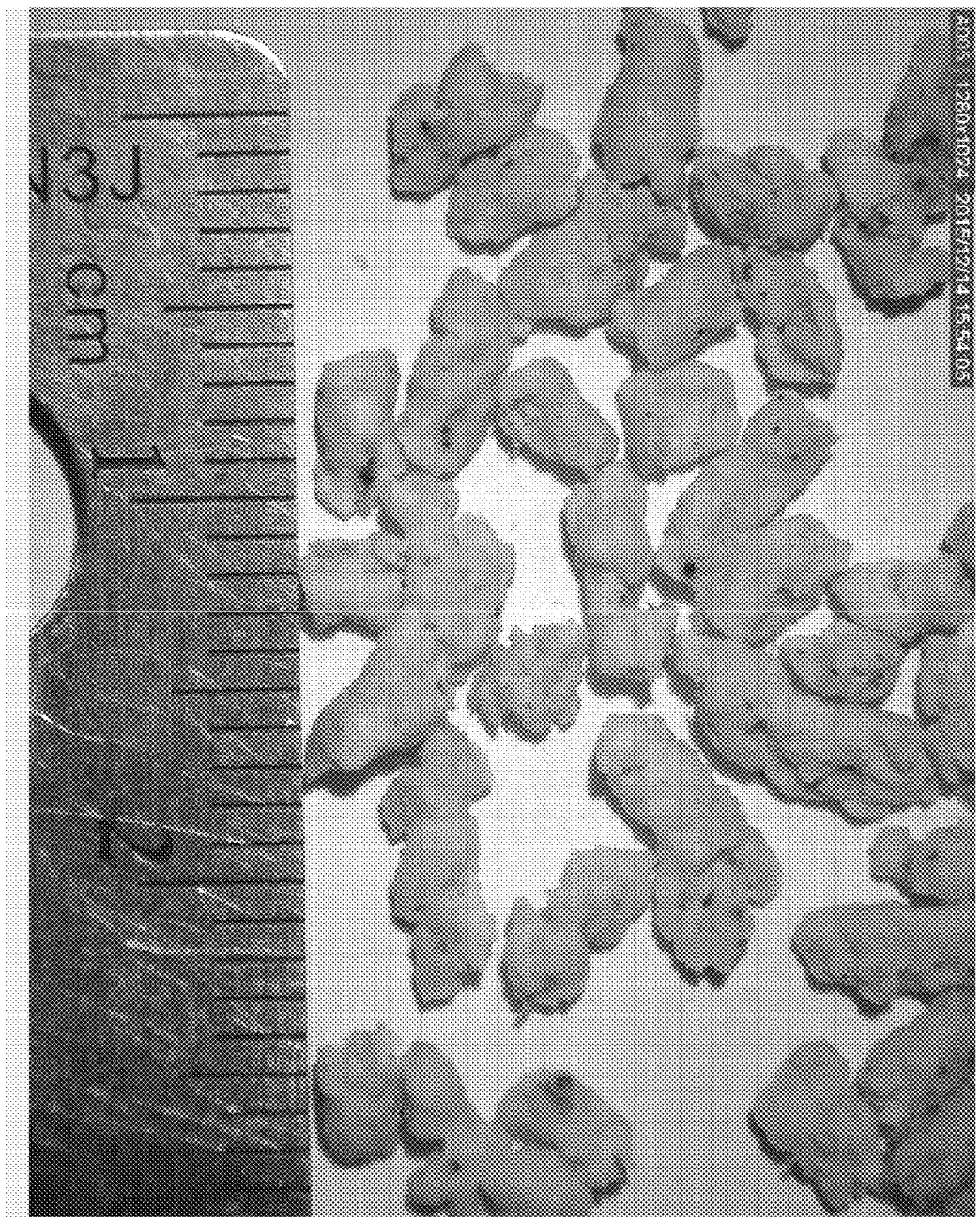
FIG. 3 is a microscope photo showing pellets of extruded granular absorbent in their as-extruded form and which have a size greater than 8 US Sieve prior to non-compression induced particle size reduction.

FIG. 3 illustrates extruded starch-containing pellets that are too large rejects in that each has a lengthwise extent or widthwise extent larger than a minimum acceptable size, in the present case larger in size than 8 US sieve, to be suitable for use in the final granular sorbent product—in this case each being too large for litter use. FIG. 4 illustrates carrying at a reject recovery step of a preferring implementation of such a particle size reduction method, system and machine of the present invention that not only reduces the size of such too large extruded pellet rejects to a smaller size small enough to be acceptable for final product use, in this case small enough to now be suitable for litter use, but which also forms one or more fines from one or more of the too large extruded pellet rejects during their particle size reduction. Where such a particle size reduction method, system and machine is configured for or otherwise used to carry out such a reject recovery step, extruded pellets of a size larger than reject size, in this case larger than 8 US sieve, are particle size reduced into smaller sized particles each having a size less than reject size, in this case smaller than 8 US sieve, making each smaller sized particle suitable for use in the final granular sorbent product—in this case making them suitable for litter use.

It is an advantage of the method, system and particle size reduction machine of the present invention in that putting the particle size reduction inline with one or more, preferably at least a plurality, and more preferably at least a plurality of pairs, of extruders enables the step of screening for too large size pellet rejects having a size greater than a predetermined reject size, preferably larger than 7 US sieve or more preferably larger than 8 US sieve, previously done to be eliminated because all extruded pellets which ordinarily would be too large to be suitable for use are automatically reduced in size into particles having a size smaller than reject size, in this case smaller than 7 US sieve and preferably smaller than 8 US sieve. With continued reference to FIG. 4, in order to ensure that all extruded pellets which would have been previously too large to be suitable for use by being larger than reject size are particle size reduced in accordance with the present method, system and particle size reduction machine in accordance with the present invention to be small enough to be suitable for use.

Figure 5:
FIG. 5 is still another microscope photo that includes extruded pellets same as or substantially the same as those shown in FIG. 3 where some but not all of the pellets have been particle-size reduced using a non-compression induced particle size reduction method and machine set to particle-size reduce pellets having a size greater than 0.030 inches.

FIG. 4 shows the too large extruded pellet rejects after particle size reduction that not only reduces the size of every rejected pellet into smaller sized particles each having a smaller size suitable for use but which also produces at least a plurality of pairs of fines each smaller in size than each one of the suitably sized smaller sized particles. FIG. 4 shows the rejected pellets after being particle size reduced through a roll type particle size reduction machine having an 0.047-inch gap size or roll spacing particle size reduction setting reducing the size of substantially all of the rejected pellets and producing some fines. FIG. 5 shows the rejected pellets after being particle size reduced through a roll type particle size reduction machine having an 0.030-inch gap size or roll spacing particle size reduction setting reducing the size of substantially all of the rejected pellets and producing more fines than in FIG. 4 due to the smaller gap or roll spacing used as the particle size reduction setting.

FIG. 6 shows a first batch of extruded pellets and smaller more finely sized "fines" produced from or during extrusion and/or during transport immediately after extrusion but before performing non-compression induced particle size reduction in accordance with the present invention. FIG. 7 depicts as-extruded pellets and smaller more finely sized "fines" from the first batch of FIG. 6 after performing non-compression induced particle size reduction with a non-compression induced particle size reduction machine having a 0.062-inch particle size reduction setting. FIG. 8 depicts as-extruded pellets and smaller more finely sized "fines" from the first batch of FIG. 6 after performing non-compression induced particle size reduction with a non-compression induced particle size reduction machine having a smaller 0.054-inch particle size reduction setting increasing the amount and ratio of fines produced as a result. FIG. 9 depicts as-extruded pellets and smaller more finely sized "fines" from the first batch of FIG. 6 after performing non-compression induced particle size reduction with a non-compression induced particle size reduction machine having an even smaller 0.049-inch particle size reduction setting further increasing the amount and ratio of fines produced as a result of decreasing the gap size or spacing between the rolls. FIG. 10 depicts as-extruded pellets and smaller more finely sized "fines" from the first batch of FIG. 6 after performing non-compression induced particle size reduction with a non-compression induced particle size reduction machine having an even smaller 0.045-inch particle size reduction setting even further increasing the ratio of fines produced as a result. FIG. 11 depicts as-extruded pellets and smaller more finely sized "fines" from the first batch of FIG. 6 after performing non-compression induced particle size reduction with a non-compression induced particle size reduction machine having a 0.039-inch particle size reduction setting increasing the amount and total ratio of fines produced as a result even more than that depicted in FIG. 10.

FIG. 12 shows an enlarged second batch of as-extruded pellets and smaller more finely sized "fines" produced from or during extrusion and/or during transport immediately after extrusion but before performing non-compression induced particle size reduction in accordance with the present invention. FIG. 13 depicts an increase in the amount and ratio of fines produced after performing non-compression induced particle size reduction in accordance with the present invention using a non-compression induced particle size reduction machine having a 0.030-inch particle size reduction setting on all of the as-extruded pellets and smaller more finely sized "fines" of the second batch of FIG. 12.

FIG. 14 depicts an enlarged portion of a third batch of as-extruded pellets and smaller more finely sized "fines" produced from or during extrusion and/or during transport immediately after extrusion but before performing non-compression induced particle size reduction in accordance with the present invention. FIG. 15 is a second microscope photo enlarged to show the third batch after all of the as-extruded pellets and smaller fines of the third batch of FIG. 14 have been particle size reduced in accordance with the present invention using non-compression induced particle size reduction with a non-compression induced particle size reduction machine having a 0.030-inch particle size reduction setting.

FIG. 16 depicts an enlarged portion of a fourth batch of as-extruded pellets and smaller more finely sized "fines" produced from or during extrusion and/or during transport immediately after extrusion but before performing non-compression induced particle size reduction. FIG. 17 is a second microscope photo enlarged to show the fourth batch after all of the as-extruded pellets and smaller fines of the fourth batch of FIG. 16 have been particle size reduced using non-compression induced particle size reduction in accordance with the present invention with a non-compression induced particle size reduction machine having a 0.030 particle size reduction setting FIG. 18 is a microscope photo depicting an enlarged portion of a fifth batch of as-extruded pellets and smaller more finely sized "fines" produced from or during extrusion and/or during transport immediately after extrusion but before performing non-compression induced particle size reduction. FIG. 19 is a second microscope photo enlarged to show the fifth batch after all of the as-extruded pellets and smaller fines of the fifth batch of FIG. 18 have been particle size reduced using non-compression induced particle size reduction in accordance with the present invention with a non-compression induced particle size reduction machine having a 0.030-inch particle size reduction setting.

FIG. 20 is a microscope photo depicting an enlarged sixth batch of as-extruded pellets and smaller more finely sized "fines" produced from or during extrusion and/or during transport immediately after extrusion but before performing non-compression induced particle size reduction. FIG. 21 is a second microscope photo enlarged to show the sixth batch after all of the as-extruded pellets and smaller fines of the sixth batch of FIG. 20 have been particle size reduced using non-compression induced particle size reduction in accordance with the present invention with a non-compression induced particle size reduction machine having a 0.030-inch particle size reduction setting.

While many attempts have been made in the past to produce granular sorbent through extrusion of starch-containing material for use as litter, virtually none of these attempts have met with any more than limited commercial success. While some of these attempts even appear quite compelling on paper, including one or more where extruded pellet size was reduced including by trying to break pellets into smaller sized particles, virtually all of these failed attempts have been the result of extruding starch-containing pellets that performed so poorly they were unsuitable for consumer or commercial use.

While such previous attempts at particle size reduction have sought to break extruded pellets into smaller sized particles in order to increase absorption and/or help prevent urine from leaching to the bottom of the litter container during use, these attempts also have met with limited, if any, commercial success. This is because most, if not all, of these past attempts have used compression-type deformation induced particle size reduction methods that employ equipment, like hammer mills and other types of equipment that perform size reduction by impacting, smashing, mashing or otherwise engaging extruded pellets undergoing size reduction in a manner that compresses or compacts them during size reduction. While these types of compression deformation-inducing methods and equipment were often employed to seek to break apart the pellets into smaller sized particles by impacting them, smashing them, mashing them, or even pulverizing them during size reduction, they many times instead simply compress, compact, crush or mash the pellet without breaking it up so its size is reduced because it occupies a smaller volume. Even where pellets are broken apart into two or more smaller sized particles, impacting them, crushing them, smashing them, mashing them, or even pulverizing them deforms one or more regions of each reduced size particle that results in a manner that compacts or compresses each region to a depth sufficient to adversely impact its performance, functionality and/or shelf-life.

Just as bad, if not worse, is that compression-inducing or pellet-compacting particle size reduction equipment frequently reduces the size of the extruded pellet without any breakup of the pellet occurring. In such instances, which are quite common when using compression-inducing or pellet-compacting particle size reduction equipment, particle size reduction is achieved solely through compression or compaction of the extruded pellet. In other words, when this happens, the extruded pellet is not broken up into smaller sized particles but rather the pellet is simply compressed or compacted into a smaller size during particle size reduction.

Achieving size reduction through hammering or smashing starch-containing extruded pellets into smaller sized particles using such pellet compressing or compacting equipment virtually always increases the bulk density of the resultant or final granular sorbent product made with the reduced-size particles. While one component of the bulk-density increase attributable to the increase in volume actually filled or occupied by granular sorbent due to newly-created smaller sized particles filling previously unfilled voids and gaps between larger sized particles is known and often times desired, there is a believed to be heretofore unknown or unappreciated densification component resulting from the reduced-size particles being compressed or compacted during their creation. compression or mashing of the reduced-size particles during their creation.

It has been discovered that performing particle-size reduction using such prior art compression deformation based and/or pellet compacting methods and equipment undesirably densifies one or more regions of each extruded pellet during such size reduction and/or each reduced size particle produced during such size reduction. It has been further discovered that such densification can not only adversely impact the density of the final granular sorbent product made with the reduced size particles, but that densification also adversely affects performance including be reducing absorption rates and/or absorption capacity.

Absorption performance is adversely impacted from being compressed or compacted during particle size reduction because open pores become closed and/or sealed off and internal voids collapsed during particle size reduction all of which adversely impacts absorption typically by reducing one or both absorption capacity and/or absorption rate. Depending on the amount and/or magnitude of compression or compaction that takes place during particle-size reduction, a starch matrix in each extruded pellet composed of modified starch formed by modifying starch in the starch-containing mixture during gelatinization and/or pellet extrusion can also be adversely affected adversely impacting reduced size particle sorbent performance. In addition, such impact-based and/or compression deformation inducing extruded pellet size reduction methods and types of equipment typically also cause the temperature of each extruded pellet undergoing such size reduction to heat up by at least four or five degrees Celsius which typically further adversely reduces sorbent performance.

What is needed is a method and system in which particle size reduction of sorbent pellets extruded from a starch-containing mixture is performed without adversely impacting the as-extruded starch matrix of each extruded pellet undergoing particle size reduction during particle size reduction. What is needed is a method and system in which particle size reduction of sorbent pellets extruded from a starch-containing mixture is performed without adversely impacting the as-extruded starch matrix of each extruded pellet undergoing particle size reduction during particle size reduction in a manner that reduces or otherwise adversely affects granular sorbent/cat litter performance (including absorption capacity and rate of liquid uptake/absorption). What is also needed is such a method and system in which particle size reduction is performed in a manner that compacts or compresses each extruded pellet less than those using compression-inducing or pellet-compacting size reduction equipment. What preferably is also needed is such a method and system in which particle size reduction is performed in a manner that compacts or compresses each extruded pellet sufficiently less than those using compression-inducing or pellet-compacting size reduction equipment that granular sorbent/cat litter performance is not adversely affected.

What is needed is a method, system and/or equipment in which particle size reduction is performed in a manner that does not compact or compress each extruded pellet undergoing particle size reduction and which preferably does not compact, compress or otherwise densify any region of each extruded pellet undergoing particle size reduction. What also is needed is a method, system and/or equipment where particle size reduction is achieved by inducing tensile or shear deformation in each starch-containing extruded pellet undergoing such size reduction thereby reducing and preferably substantially completely eliminating occurrence of any compressed, compacted and/or otherwise densified regions in any resultant reduced size particle produced.

What is needed is a method and/or system, which preferably also includes equipment, which reduces the size of pellets extruded from starch-containing material without significantly compressing or compacting them during size reduction. What also is needed is a method and/or system, which preferably also includes equipment, which reduces the size of such extruded pellets in a manner that breaks them up into smaller sized particles without adversely impacting their performance. What also is needed is a method and/or system, which preferably also includes equipment, which reduces the size of such extruded pellets in a manner without substantially affecting or otherwise significantly impacting any aspect of any starch matrix previously formed during extrusion in any of the extruded pellets undergoing size reduction.

The present invention is directed to a method and system that preferably also includes equipment that enables particle size reduction of sorbent pellets extruded from a starch-containing mixture to be performed without adversely impacting the as-extruded starch matrix of each extruded pellet undergoing particle size reduction during particle size reduction. The present invention is directed to a method and system that preferably also includes equipment that enables particle size reduction of sorbent pellets extruded from a starch-containing mixture to be performed without adversely impacting the as-extruded starch matrix of each extruded pellet undergoing particle size reduction during particle size reduction in a manner that reduces or otherwise adversely affects granular sorbent/cat litter performance (including in a manner that does not adversely affect absorption capacity and rate of liquid uptake/absorption and which preferably actually improves absorption capacity and rate of liquid uptake/absorption).

The present invention can be directed to such a method and system that preferably also includes equipment where particle size reduction is performed in a manner that compacts or compresses each extruded pellet less than the aforementioned prior art that employs compression-inducing or pellet-compacting methods and size reduction equipment and which preferably does not perform any compacting or compression during size reduction. Where any compaction or compression does occur or might occur, the present invention also is directed to a method and system that preferably also includes equipment where particle size reduction is performed in a manner that compacts or compresses each extruded pellet sufficiently less than in the prior art that use compression-inducing or pellet-compacting size reduction equipment such that granular sorbent/cat litter performance is not adversely affected.

The present invention most preferably is directed to a method, system and/or equipment in which particle size reduction is performed in a manner that does not compact or compress extruded pellets undergoing particle size reduction and which preferably does not compact, compress or otherwise densify any region of any extruded pellet undergoing particle size reduction. The present invention is directed to a method, system and/or equipment where particle size reduction is achieved by inducing tensile or shear deformation in each starch-containing extruded pellet undergoing size reduction thereby reducing and preferably substantially completely eliminating the creation of any compressed, compacted and/or otherwise densified regions in any resultant reduced size particle produced. The present invention preferably is thereby directed to a method and system, including at least some equipment, configured to perform such tensile or shear induced particle size reduction in a manner that breaks apart each extruded pellet undergoing size reduction into two or more smaller sized particles.

The present invention is directed to a method, system and equipment that reduces the size of pellets extruded from starch-containing material using tensile-induced, shear-induced or shear-induced and tensile-induced particle size reduction to reduce particle size using tensile and shear forces applied to each starch-containing pellet undergoing particle size reduction during particle size reduction thereby cutting, tearing and/or shearing each pellet undergoing size reduction into at least a plurality of particles smaller in size than the pellet that underwent particle size reduction. The present invention is directed to a method, system and equipment that reduces the size of extruded pellets by using tensile-induced, shear-induced or shear-induced and tensile-induced particle size reduction to reduce particle size using tensile/tension, torsion and/or shear forces applied to each starch-containing pellet undergoing particle size reduction during particle size reduction forming a plurality of smaller size particles from each pellet undergoing size reduction without significantly compressing or compacting the extruded pellet nor each reduced size particle produced therefrom during size reduction.

Such a preferred method, system and equipment therefore does so in a manner that not only produces more finely sized "fines" from such extruded pellets during such non-compression induced particle size reduction using one or more of tensile/tension force induced particle size reduction, torsion/torsion force induced particle size reduction, and/or shear/shear-force induced particle size reduction but which also enables or otherwise facilitates control of the rate, ratio, amount and/or volume of fines produced as part of a method, system and equipment for producing granular sorbent/cat litter, blends and/or formulations having clump shape, size, depth, clump compression and/or crush strength and/or retention rate within a desired acceptable and/or optimal range. Such a preferred method, system and equipment preferably also does so in a manner that not only produces more finely sized "fines" from such extruded pellets during such non-compression induced particle size reduction using one or more of tensile/tension force induced particle size reduction, torsion/torsion force induced particle size reduction, and/or shear/shear-force induced particle size reduction but preferably does so dynamically in real time during operation of one or more extruders extruding pellets that shortly thereafter, preferably substantially thereafter, undergo such non-compression induced particle size reduction.

One or more method(s), system(s) and/or equipment for carrying out the present invention are well suited for use with one or more of the granular sorbent methods, embodiments, formulations, and/or blends disclosed in one or more of U.S. application Ser. Nos. 13/842,534, 13/868,073, 13/868,084, 14/426,483, 14/605,045, 14/656,086, 14/656,692, and/or 14/668,975, respectively published as U.S. Patent Application Publication Nos. US20140069344, US20140069345, US20140069346, US20150238931, US20150145164, US20150181832, US20150181834, and/or US20150196005, which each share common inventorship and ownership with the present application, in reducing the size of pellets extruded in accordance therewith including to produce more smaller more finely sized particles or "fines" to not only improve granular sorbent performance, provide granular sorbent density control, and/or provide clump size, shape, and/or depth control (particularly where used as cat litter), but also to turn oversized rejected pellets and/or sorbent particles into acceptably smaller sized particles suitable for granular sorbent/litter use. It should be noted that the granular sorbent methods, embodiments, formulations, and/or blends disclosed in U.S. application Ser. Nos. 13/842,534, 13/868,073, 13/868,084, 14/426,483, 14/605,045, 14/656,086, 14/656,692, and 14/668,975, respectively published as U.S. Patent Application Publication Nos. US20140069344, US20140069345, US20140069346, US20150238931, US20150145164, US20150181832, US20150181834, and US20150196005 are well suited for use as litter, e.g., animal litter, pet litter, and/or cat litter, including self-clumping cat litter. As such, each of U.S. application Ser. Nos. 13/842,534, 13/868,073, 13/868,084, 14/426,483, 14/605,045, 14/656,086, 14/656,692, and 14/668,975, respectively published as U.S. Patent Application Publication Nos. US20140069344, US20140069345, US20140069346, US20150238931, US20150145164, US20150181832, US20150181834, and US20150196005 are hereby expressly incorporated herein by reference.

The present invention is directed to a method and system that preferably also includes equipment for processing extruded granular sorbent after extrusion of the granular sorbent in a manner that not only provides non-compression induced particle size reduction of extruded sorbent pellets and other particles of extruded granular sorbent 30, but which also does so in a manner that is capable of providing control over (a) the size(s) and/or range of size(s) of reduced-size particles produced, (b) the amount of reduced-size particles produced, and/or (c) the ratio of reduced-size particles in the final granular sorbent product that gets packaged for sale and/or sold. The present invention is directed to a preferred method and system for doing so in a manner that performs substantially continuous non-compression induced particle size reduction control in real time during extrusion of sorbent pellets from at least one and preferably at least a plurality of extruders, including substantially simultaneously during extrusion of sorbent pellets from each extruder whose extruded pellets are undergoing particle size reduction.

In a particularly preferred particle size reduction method and system, particle size reduction processing of extruded pellets and/or other extruded granular sorbent particles is carried out in a cold-processing particle size reduction method, system and/or step of the present invention where the temperature of extruded pellets and any other extruded granular sorbent particles undergoing particle size reduction rises no more than two degrees Celsius during particle size reduction, preferably rises no more than one degree Celsius during particle size reduction, and more preferably rises no more than one-half of a degree Celsius during particle size reduction. Where the method and system is or includes such cold-processing particle size reduction, non-compression induced cold-processed particle size reduction is performed such that the temperature of any extruded pellets and/or other extruded granular sorbent particles rises no more than two degrees Celsius during particle size reduction, preferably rises no more than one degree Celsius during particle size reduction, and more preferably rises no more than one-half of a degree Celsius during particle size reduction.

The method(s) and system(s) of the present invention, including any equipment for performing non-compression induced pellet and other extruded granular sorbent particle size reduction is well suited for use with and/or in making (a) water-absorbing granular sorbent (and finished/final water-absorbing granular sorbent product), (b) oil-absorbing granular sorbent (and finished/final oil-sorbent granular sorbent product), (c) granular sorbent well suited for use in oil-absorbing and water-absorbing applications including in its finished/final oil and water absorbing granular sorbent finished product, and/or (d) animal, pet and/or cat litter including finished/final litter product composed of such non-compression induced particle size reduced pellets.

Understandably, the present invention has been described above in terms of one or more preferred embodiments and methods. It is recognized that various alternatives and modifications may be made to these embodiments and methods that are within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

The invention claimed is:

1. A method of making extruded granular sorbent comprising:
 (a) providing a single screw extruder and a starch-containing admixture comprised of at least 40% starch and having a moisture content of no greater than about 25% by weight;
 (b) extruding the starch-containing admixture by (i) subjecting the starch-containing admixture in the single screw extruder to an extrusion pressure of at least 2000 PSI at an extrusion temperature of at least 100° C. for a residency time of no greater than twenty seconds gelatinizing at least some of the starch in the starch-containing admixture in the single screw extruder, at least some of the starch in the starch-containing admixture in the single screw extruder modified into a room-temperature water soluble binder, and (ii) discharging the starch-containing admixture from the single screw extruder as sorbent extrudate comprised of the room-temperature water soluble binder;

(c) cold-processing the sorbent extrudate immediately upon being discharged from the single screw extruder by cooling the sorbent extrudate using air having (i) a temperature less than an initial temperature of the sorbent extrudate when discharged from the extruder, and (ii) a flow rate sufficient to cool the sorbent extrudate immediately upon being discharged from the extruder at a cooling rate of at least 5° C. per second for at least two seconds after discharge of the pellets of the sorbent extrudate from the extruder; and wherein, after the cold-processing step, the extruded granular sorbent is comprised of at least a plurality of pairs of pellets of the sorbent extrudate that form an agglutinated mass thereof within five seconds of being wetted with water, the agglutinated mass comprising a clump that is scoopable from a box of pellets within one minute of wetting the at least the plurality of pairs of pellets with water.

2. The method of claim 1, wherein the starch-containing admixture is comprised of one or more cereal grains, is comprised of at least 45% starch by weight, and has a moisture content of no more than about 20%.

3. The method of claim 1, wherein no moisture is added to the starch-containing admixture while the starch-containing admixture is in the extruder.

4. The method of claim 1, wherein the starch-containing admixture remains within the single screw extruder for a residency time of between eight seconds and twenty seconds before being discharged as sorbent extrudate from the extruder.

5. The method of claim 4, wherein the starch-containing admixture is subjected to an extrusion pressure of at least 2500 PSI within the single screw extruder during the extruding step.

6. The method of claim 5, wherein no moisture is added to the starch-containing admixture while the starch-containing admixture is in the single screw extruder during the extruding step.

7. The method of claim 1, wherein the starch-containing admixture is subjected to an extrusion pressure of at least 3000 PSI within the extruder during the extruding step.

8. The method of claim 7, wherein the sorbent extrudate comprises at least 5% by weight of the room-temperature water soluble binder, the room temperature water soluble binder comprised of a physically modified starch physically modified during the extruding step.

9. The method of claim 1, wherein the sorbent extrudate comprises at least 10% by weight of the room-temperature water soluble binder.

10. The method of claim 1, wherein the sorbent extrudate comprises at least 15% by weight of the room-temperature water soluble binder.

11. The method of claim 1, wherein the clump has a clump compressive crush strength of at least 500 PSI and a clump retention rate of at least 95% when the clump is dried to a moisture content of no greater than 12% by clump weight.

12. The method of claim 1, further comprising the step of providing a rotating cutter configured to cut the sorbent extrudate into pellets and cutting the sorbent extrudate into pellets during the extruding substep of discharging the sorbent extrudate from the extruder.

13. The method of claim 1, wherein the clump formed of the agglutinated mass of wetted extruded sorbent pellets has a crush strength of at least 400 PSI when the clump is dried to a moisture content of no greater than 12%.

14. The method of claim 1, wherein the clump formed of the agglutinated mass of wetted extruded sorbent pellets has a clump retention rate of at least 95%.

15. The method of claim 1, wherein the pellets of the sorbent extrudate has a water sorption capacity of at least five times pellet weight.

16. The method of claim 1, wherein the at least some of the other starch in the starch-containing admixture in the single screw extruder is modified during the extruding step into an enhanced liquid sorbent starch such that the pellets of sorbent extrudate have a water sorption capacity of at least four times pellet weight and sorb at least four times pellet weight in water within 30 seconds of being wetted with water.

17. The method of claim 1, further comprising the step of (1) providing a pneumatic conveyor in air-flow communication with (i) the single-screw extruder, and (ii) a pellet or particle size separating or classifying station, and (2) pneumatically transporting pellets of sorbent extrudate through the pneumatic conveyor to the pellet or particle size separating or classifying station.

18. The method of claim 1, wherein during the cold-processing step, air having a temperature of no higher than 37° C. is used to cool the sorbent extrudate immediately upon being discharged from the extruder.

19. The method of claim 18, wherein during the cold-processing step, air having a temperature of at least 37° C. less than the initial temperature of the sorbent extrudate is used to cool the sorbent extrudate immediately upon being discharged from the extruder and no heat is applied to the sorbent extrudate.

20. The method of claim 1, wherein during the cold-processing step, (i) the flow rate of the air is sufficient to cause the air to turbulently convectively cool the sorbent extrudate at a cooling rate of at least 10° C. per second for at least two seconds of the cold-processing step, (ii) both cooling and drying of the sorbent extrudate occurs, and (iii) the moisture content of the sorbent extrudate becomes less than 14% by weight.

21. The method of claim 20, wherein during the cold-processing step, (i) the flow rate of the air cooling the sorbent extrudate is at least 250 CFM, and (ii) the moisture content of the cooled and dried sorbent extrudate becomes less than 12% by sorbent extrudate weight.

22. The method of claim 21, wherein during the cold-processing step, (i) the flow rate of the air cooling the sorbent extrudate is at least 500 CFM, and (ii) the moisture content of the cooled and dried sorbent extrudate becomes less than about 10% by sorbent extrudate weight.

23. The method of claim 1, wherein the sorbent extrudate is configured to pick up and retain at least one times the weight of the sorbent extrudate of an aliphatic, hydrocarbon or petroleum-based liquid.

24. The method of claim 23, wherein the sorbent extrudate is configured to pick up and retain at least two times the weight of the sorbent extrudate of an aliphatic, hydrocarbon or petroleum-based liquid.

25. The method of claim 23, wherein the sorbent extrudate is further comprised of a starch modified during the extruding step that is a water-insoluble aliphatic, hydrocarbon or petroleum liquid sorbent starch.

26. The method of claim 25, wherein the water-insoluble aliphatic, hydrocarbon or petroleum liquid sorbent starch is comprised of a physically modified starch physically modified during the extruding step.

27. The method of claim 1, wherein the sorbent extrudate is comprised of at least a plurality of pairs of extruded sorbent pellets that pick up and retain at least one times extruded sorbent pellet weight of water within at least fifteen seconds of being wetted with the water, at least two times extruded sorbent pellet weight of water within at least twenty seconds of wetting, and at least four times extruded sorbent pellet weight of water within at least thirty seconds of wetting.

28. The method of claim 27, wherein the extruded sorbent pellets form a scoopable agglutinated mass having a clump retention rate of at least 90% within two minutes of wetting with water.

29. The method of claim 28, wherein the cold-processing step substantially completely freezes the state and structure of the modified starch in the sorbent extrudate.

30. The method of claim 1, wherein after the cold-processing step, the sorbent extrudate will not retrograde at room temperature.

31. The method of claim 1, wherein during the cold processing step, the sorbent extrudate reaches a temperature that is at least 40° Celsius less than the initial temperature of the sorbent extrudate when discharged from the extruder.

32. The method of claim 31, wherein during the cold processing step, the sorbent extrudate reaches a temperature that is at least 70° Celsius less than the initial temperature of the sorbent extrudate when discharged from the extruder.

33. The method of claim 32, wherein during the cold processing step, the sorbent extrudate reaches a moisture content of less than about 12% by sorbent extrudate weight.

34. The method of claim 1, comprising the further step of providing a pellet comminution machine configured for reducing a size of a plurality of the plurality of pairs of the pellets of sorbent extrudate after the cold processing step has been performed without pulverizing, crushing or compressing the pellets undergoing size reduction during the size reduction step and reducing the size of a plurality of the plurality of pairs of the pellets of sorbent extrudate without pulverizing, crushing or compressing the pellets undergoing size reduction.

35. The method of claim 34, wherein the pellet comminution machine comprises one of a jet mill, cone mill, vibration mill, or a roll granulator.

36. A method of making extruded granular sorbent comprising:
(a) providing an extruder and a starch-containing admixture comprised of at least 40% starch and having a moisture content of no greater than about 25% by weight;
(b) extruding the starch-containing admixture by (i) subjecting the starch-containing admixture in the extruder to an extrusion pressure of at least 2000 PSI at an extrusion pressure of at least 100° C. gelatinizing at least some of the starch in the starch-containing admixture in the extruder, at least some of the starch in the starch-containing admixture in the extruder modified into a room-temperature water soluble binder, and at least some of the other starch in the starch-containing admixture in the extruder is modified during the extruding step into an enhanced liquid sorbent starch, and (ii) discharging the starch-containing admixture from the extruder as sorbent extrudate comprised of extruded sorbent pellets containing the room-temperature water soluble binder and the enhanced liquid sorbent starch; and
(c) cold-processing the extruded sorbent pellets by cooling the extruded pellets immediately upon extrusion from the extruder using air having a temperature of no higher than 37° C. flowing at a flow rate of at least 500 CFM that convectively cools the extruded sorbent pellets immediately upon discharge from the extruder at a pellet cooling rate of at least 7° C. per second for at least two seconds after discharge of the extruded sorbent pellets from the extruder; and
wherein, after the cold-processing step, the extruded granular sorbent is comprised of at least a plurality of pairs of the extruded sorbent pellets that have a water sorption capacity of at least four times pellet weight and sorb at least four times pellet weight in water within 30 seconds of being wetted with water and form an agglutinated mass thereof comprising a clump that is scoopable from a box of the extruded sorbent pellets within two minutes of wetting the at least the plurality of pairs of extruded sorbent pellets with water and which has a clump compressive crush strength of at least 500 PSI and a clump retention rate of at least 95% when the clump is dried to a moisture content of no greater than about 12% by clump weight.

37. The method of claim 36, wherein cooling and drying of the extruded sorbent pellets during the cold-processing step is done without applying any heat to the extruded sorbent pellets during the cold-processing step and without heating the air that cools and dries the extruded sorbent pellets during the cold-processing step.

38. The method of claim 36, wherein cooling and drying of the extruded sorbent pellets during the cold-processing step substantially freezes at least one of the state, structure, phase, and matrix of one or more of the starches in the extruded sorbent pellets.

39. The method of claim 38, wherein cooling and drying of the extruded sorbent pellets during the cold-processing step substantially freezes at least one of the state, structure, phase, and matrix of the room-temperature water soluble binder in each of the extruded sorbent pellets.

40. The method of claim 36, wherein the moisture content of the extruded sorbent pellets is less than 14% by pellet weight from carrying out the cold-processing step.

41. The method of claim 36, wherein the moisture content of the extruded sorbent pellets comprises less than about 10% by pellet weight from carrying out the cold-processing step.

42. The method of claim 36, further comprising a pneumatic conveyor in communication with the extruder and configured to transport extruded sorbent pellets during the cold-processing step away from the extruder, and wherein the stream of air flows through the pneumatic conveyor during the cold-processing step transporting the extruded sorbent pellets away from the extruder while cooling and drying the extruded sorbent pellets.

43. The method of claim 42, further comprising a post-extrusion pellet processing device or station located downstream of the pneumatic conveyor, the post-extrusion pellet processing device or station comprising one of (i) a pellet size reduction machine configured for reducing the size of extruded sorbent pellets processed thereby, and (ii) a pellet or particle size separating or classifying station configured to separate or classify pellets or particles by size.

44. The method of claim 36, wherein the starch-containing admixture is subjected to an extrusion pressure of at least 3000 PSI during the extruding step, the cold-processing step substantially completely freezes the state and the structure of modified starch in the extruded sorbent pellets modified during the extruding step, and wetting of at least a plurality of pairs of the extruded sorbent pellets forms a clump thereof having a clump retention rate of at least 95%.

45. A method of making extruded granular sorbent comprising:
(a) providing a single screw extruder and a starch-containing admixture comprised of at least 40% starch and having a moisture content of no greater than about 25% by weight;
(b) extruding the starch-containing admixture by (i) subjecting the starch-containing admixture in the single screw extruder to an extrusion pressure of at least 2000 PSI at an extrusion pressure of at least 100° C. for a residency time of no more than twenty seconds gelatinizing at least some of the starch in the starch-containing admixture in the extruder, at least some of the starch in the starch-containing admixture in the extruder physically modified into a room-temperature water soluble binder, and at least some of the other starch in the starch-containing admixture in the extruder is modified during the extruding step into an enhanced liquid sorbent starch, and (ii) discharging the starch-containing admixture from the extruder as sorbent extrudate comprised of extruded sorbent pellets containing the enhanced liquid sorbent starch and at least 5% of the room-temperature water soluble binder by pellet weight; and
(c) cold-processing the extruded sorbent pellets by cooling and drying the extruded pellets immediately upon extrusion from the single screw extruder using a stream of air having (i) a temperature of at least 37° C. less than an initial temperature of the extruded sorbent pellets at the time of being discharged from the extruder, and (ii) a flow rate of at least 250 CFM that turbulently convectively cools the extruded sorbent pellets immediately upon discharge from the extruder at a pellet cooling rate of at least 5° C. per second for at least two seconds after discharge of the extruded sorbent pellets from the extruder; and
wherein, after the cold-processing step, the extruded granular sorbent is comprised of at least a plurality of pairs of the extruded sorbent pellets that have a water sorption capacity of at least four times pellet weight and sorb at least four times pellet weight in water within 30 seconds of being wetted with water and form an agglutinated mass thereof comprising a clump that is scoopable from a box of the extruded sorbent pellets within two minutes of wetting the at least the plurality of pairs of extruded sorbent pellets with water and which has a clump compressive crush strength of at least 500 PSI and a clump retention rate of at least 95% when the clump is dried to a moisture content of no greater than about 12% by clump weight.

46. The method of claim 45, wherein cooling and drying of the extruded sorbent pellets during the cold-processing step is done without applying any heat to the extruded sorbent pellets during the cold-processing step.

47. The method of claim 45, wherein cooling and drying of the extruded sorbent pellets during the cold-processing step prevents (i) retrogradation of starch in the extruded sorbent pellets, and (ii) post-extrusion shrinkage of the extruded sorbent pellets.

48. The method of claim 45, wherein the starch-containing admixture is comprised of at least 45% starch, no water is added to the starch-containing admixture during the extruding step, the starch-containing admixture remains within the single screw extruder for a residency time of no longer than 18 seconds during the extruding step, the starch-containing admixture is subjected to an extrusion pressure of at least 2500 PSI during the extruding step, the extruded sorbent pellets are cooled at a rate of at least 10° C. per second during the cold-processing step for at least two seconds immediately upon discharge of the extruded sorbent pellets from the extruder, and the extruded sorbent pellets each contain at least 10% of the room-temperature water soluble binder by pellet weight.

49. The method of claim 45, wherein cooling and drying of the extruded sorbent pellets during the cold-processing step is performed substantially simultaneously during the cold-processing step.

50. The method of claim 45, wherein the starch-containing admixture is subjected to an extrusion pressure of at least 3000 PSI during the extruding step, the cold-processing step substantially completely freezes the state and the structure of modified starch in the extruded sorbent pellets modified during the extruding step, and wetting of at least a plurality of pairs of the extruded sorbent pellets forms a clump thereof having a clump retention rate of at least 95%.

51. The method of claim 45, wherein after the cold-processing step, the step further comprising performing particle size reduction of a plurality of pairs of the extruded sorbent pellets without one or more regions of compression or compaction being formed or otherwise induced in any of the plurality of pairs of the extruded sorbent pellets whose size is reduced by or during particle size reduction.

52. The method of claim 51, wherein the particle size reduction step is performed using a particle size reduction machine comprised of a plurality of counterrotating rollers.

53. The method of claim 45, wherein during the cold processing step, (i) the extruded sorbent pellets are cooled at a rate of at least 10° C. per second for at least two seconds after discharge of the extruded sorbent pellets from the extruder, (ii) the extruded sorbent pellets reach a temperature that is at least 40° Celsius less than the initial temperature of the extruded sorbent pellets when discharged from the extruder, and (iii) the moisture content of the extruded sorbent pellets is less than 14%.

54. The method of claim 53, wherein the extruded sorbent pellets are cooled immediately upon being discharged from the extruder using a stream of air having a temperature of no more than 37° C. having a flow rate of at least 500 CFM.

55. The method of claim 45, wherein the extruded sorbent pellets (a) sorb one of an aliphatic, hydrocarbon and petroleum-based liquid, and (b) sorb (i) at least one time extruded sorbent pellet weight of water within at least fifteen seconds of being wetted with the water, (ii) at least two times extruded sorbent pellet weight of water within at least twenty seconds of being wetted with water, and (iii) at least four times extruded sorbent pellet weight of water within at least thirty seconds of being wetted with water.

* * * * *